United States Patent [19]

Ingenito et al.

[11] Patent Number: 4,915,635
[45] Date of Patent: Apr. 10, 1990

[54] COMPACT INTERACTIVE TRAINING MANIKIN SYSTEM

[75] Inventors: Michael Ingenito; Eve J. Ingenito; Michael P. Ingenito, White Plains, N.Y.

[73] Assignee: Michael Ingenito, White Plains, N.Y.

[21] Appl. No.: 298,212

[22] Filed: Jan. 13, 1989

Related U.S. Application Data

[62] Division of Ser. No. 28,593, Mar. 20, 1987, Pat. No. 4,828,501.

[51] Int. Cl.$^4$ ............................................. G09B 250/00
[52] U.S. Cl. ..................................... 434/396; 434/262; 434/265; 434/365; 434/369
[58] Field of Search ............... 434/262, 265, 266, 267, 434/257, 396, 365, 369, 374; 273/1 GE

[56] References Cited

U.S. PATENT DOCUMENTS 4,588,383 5/1986 Parker et al. ....................... 434/265

Primary Examiner—Richard J. Apley
Assistant Examiner—Joe H. Cheng
Attorney, Agent, or Firm—Laff, Whitesel, Conte & Saret

[57] ABSTRACT

A manikin and control system is provided for use by a student practicing a procedure normally applied to the human body, such as cardiopulmonary resuscitation. The system includes a manikin that has an artificial lung into which the student can blow to expand the lung, and a resilient chest which the student can compress. Sensors are provided in the manikin to accurately detect the instantaneous amount of lung expansion and chest compression. An A/D converter converts the sensor signals to digital signals and inputs them to a compact controller based on an inexpensive microcomputer chip which also stores the control program in ROM. Pushbuttons on the controller's front panel enable the student to select any one of a variety of teaching routines prestored in the microcomputer's ROM. The microcomputer then uses lamps on the panel and a speech synthesizer having prerecorded human speech stored in external ROM chips to issue instructions and advice to the student. These are contingent on his preformance of the selected routine as detected by the sensors. However, a prestored interrupt routine always enables the student to switch from the current routine to any other, or to get an immediate repeat of the last message from the system. Transducers are provided for simulating a carotid pulse and shallow breathing in the manikin, and these can be activated by an instructor via remote control using a wireless transmitter and receiver pair.

4 Claims, 26 Drawing Sheets

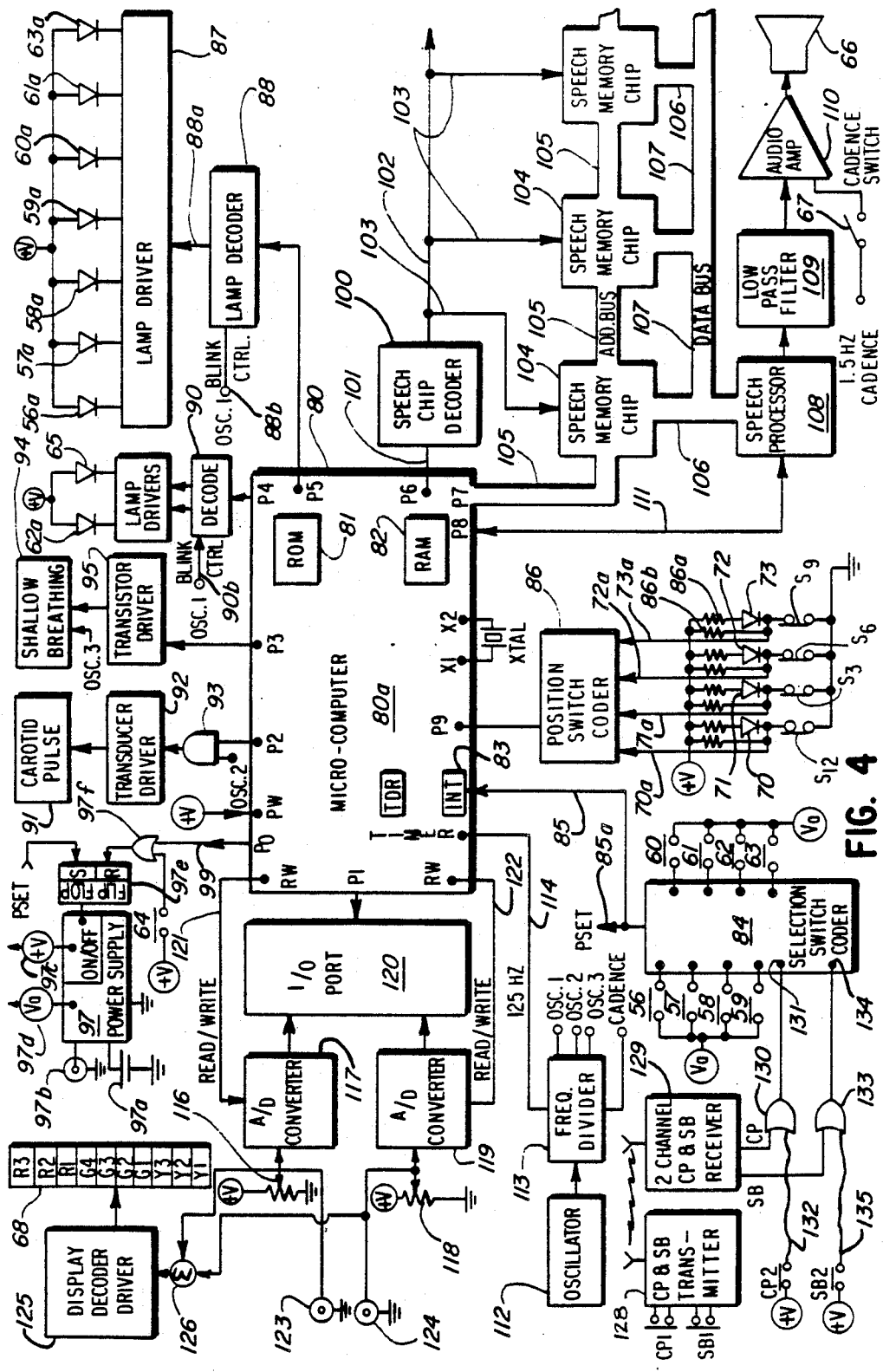

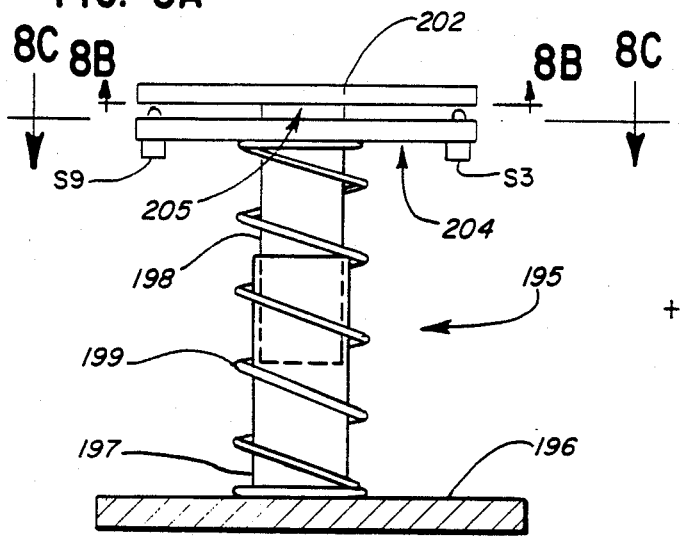
FIG. 8A
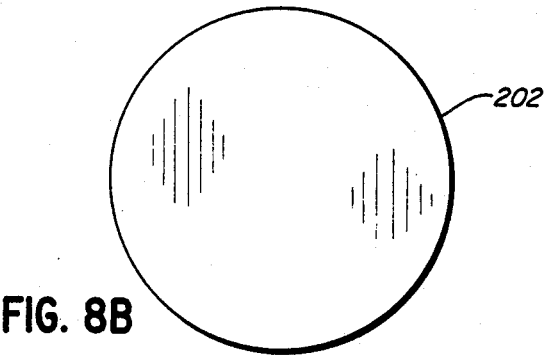
FIG. 8B
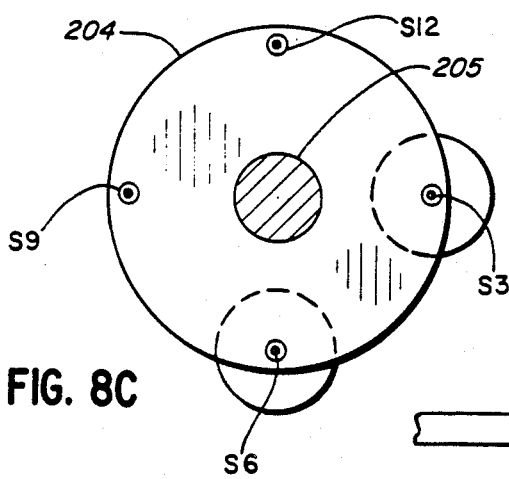
FIG. 8C
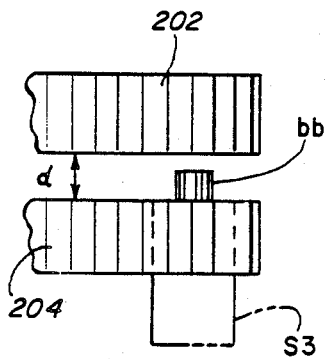
FIG. 8E
FIG. 8F
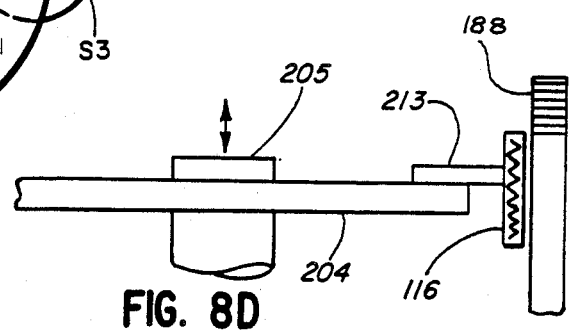
FIG. 8D

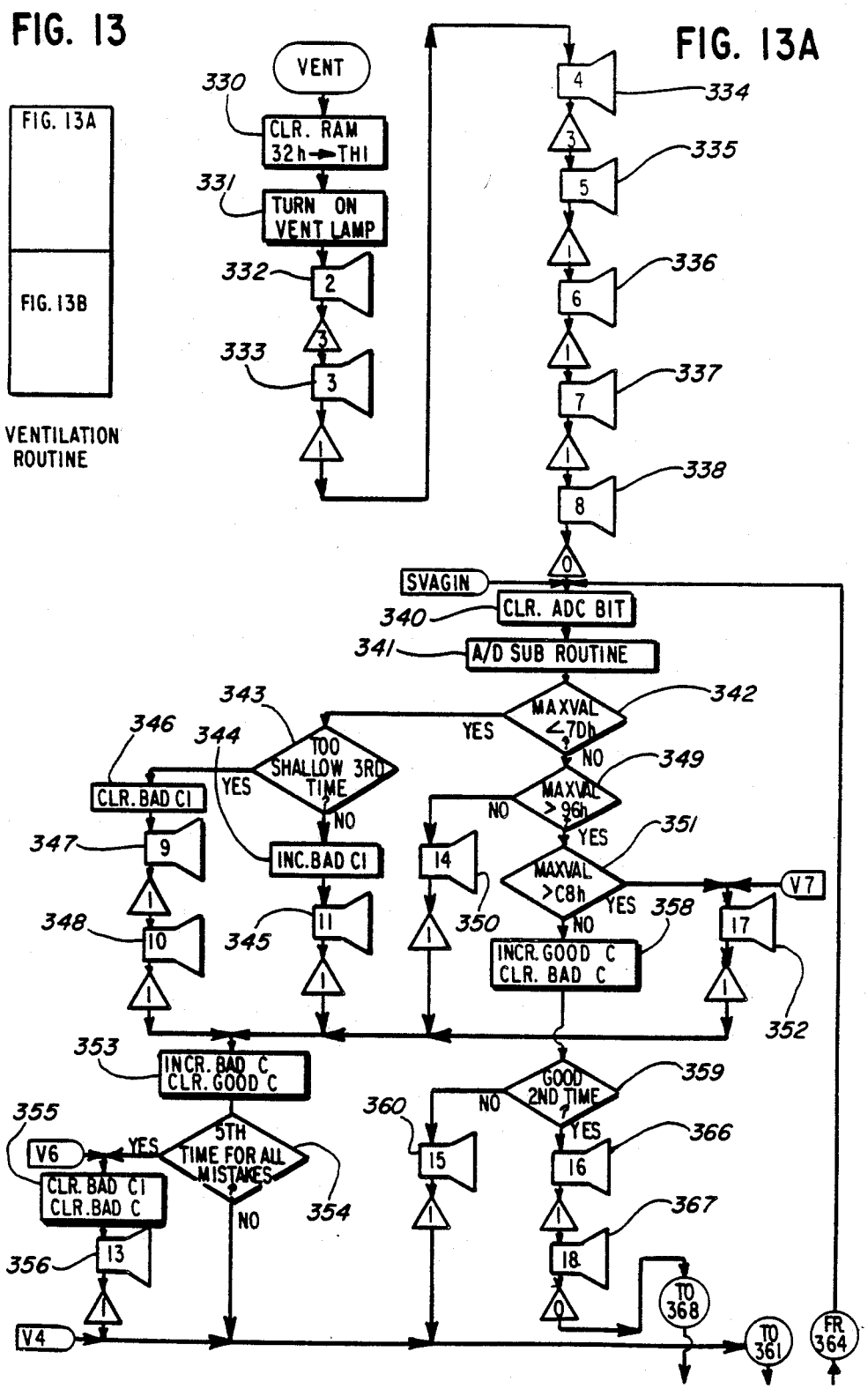

SINGLE CHEST COMPRESSION SEQUENCE

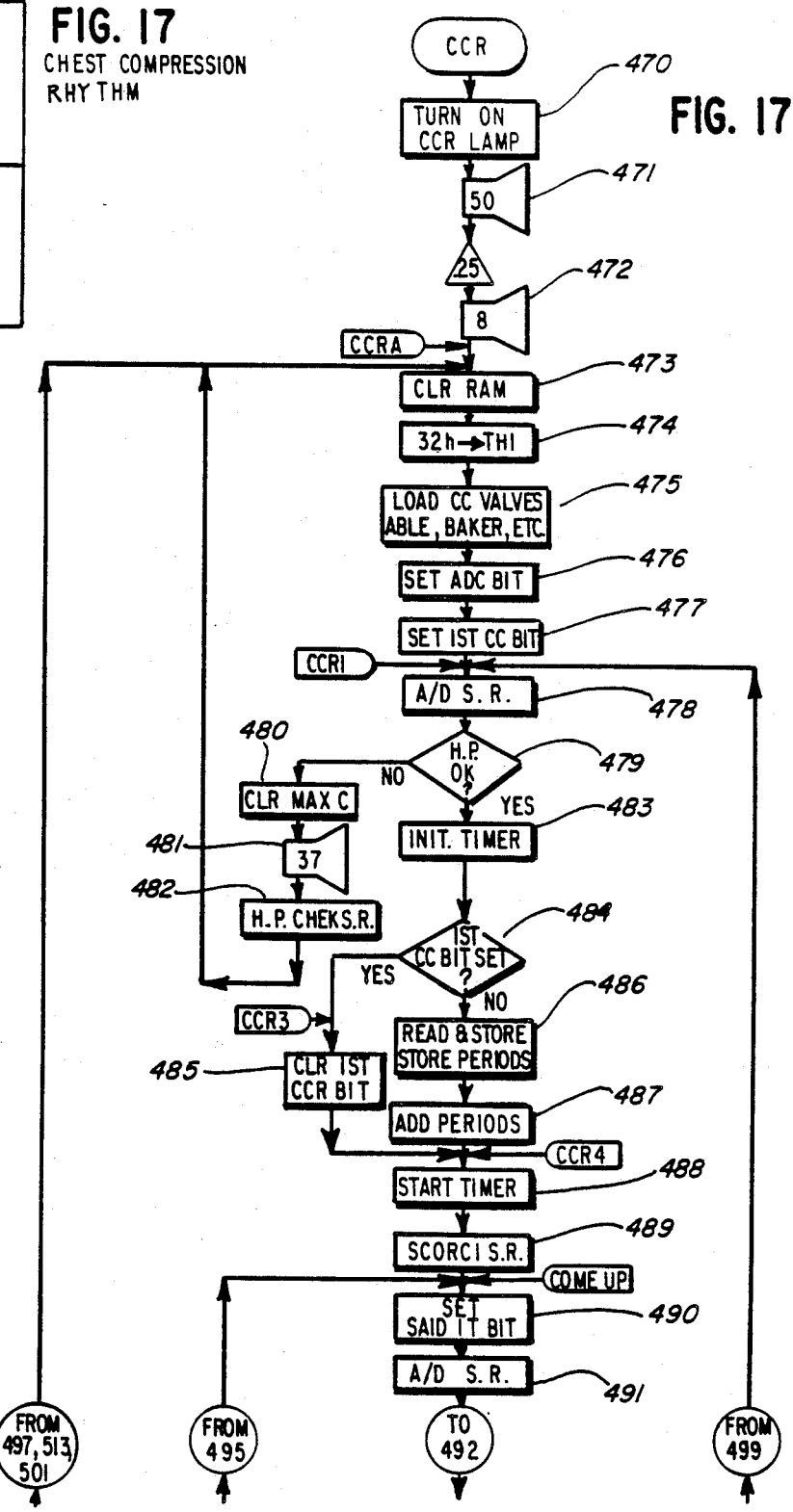

COMPACT INTERACTIVE TRAINING MANIKIN SYSTEM

This application is a division of prior application Ser. No. 07/028,593, filed 03/20/87, now U.S. Pat. No. 4,828,501.

This invention relates to training manikins, and more particularly to a training manikin system having a very compact controller with a prerecorded human voice interface for coaching the user.

BACKGROUND

Manikins Used With Live Instructors

Models of the human body called manikins are used in teaching many skills. In the medical and safety fields, manikins are a common and important aid in teaching Cardiopulmonary Resuscitation (hereafter "CPR"), a combination of artificial respiration and heart massage.

Traditionally a class of students is first taught the CPR procedure by a live instructor, after which the instructor divides the class into teams to practice on a manikin. During practice the instructor goes from team to team, commenting, correcting and coaching. The students use the manikin to practice mouth-to-mouth breathing, chest compressions for restoring circulation, and first aid procedures for choking.

Prior art training manikins for CPR have generally been equipped with an electronic signal box the front panel of which has lamps that give some feedback to the student. For example, in a typical arrangement the panel has three different colored lamps to signal the following:

Green lamp: Lights up when 800 cc of air enters the manikin's lungs. Is off when less than this amount is in the lungs.

Yellow lamp: Lights up when the chest is compressed 1½-inches. Is off when the chest is compressed less than this amount.

Red lamp: Lights up as a warning when an incorrect hand position is used during chest compressions.

Also, an electronic metronome has been provided which emits an audible "tick".

In addition to the above-mentioned lights, the higher cost manikins have been equipped with strip charts that record the student's performance as he practices. This enables an instructor to come by, read the chart, and discuss the results with the student. The instructor may also show the student how to read the chart himself.

Some CPR training manikins have been equipped with other internal and external devices that allow for some degree of measurement, recording, and visual indication of the student's efforts when he or she is practicing various procedures. But even the most sophisticated of these have many shortcomings and limitations. Also, most conventional training manikins, except for very expensive systems, are designed for use in training courses having a live instructor.

Instructorless Systems

Systems that do not require a live instructor have advantages, since there is a shortage of trained, highly motivated persons with the required time and temperament for the very repetitive, vocalized teaching required. Another benefit is standardization of instruction.

Until now, however, complete elimination of the instructor has required an elaborate, complex, and cumbersome array of electronic hardware. In one such system, the manikin is internally fitted with sensors and coupled via an electrical cable to a system consisting of a computer, keyboard and light pen, two television monitors, a video disc machine, and a computer controlled audio machine. All of this is cabled together and powered by the AC line.

Such systems are not easily portable, and are also very expensive (in the neighborhood of $25,000). Their maintenance entails additional cost and requires highly skilled personnel. A principal objective of the present invention is therefore to equal or at least approach the performance of such a system at a far more reasonable cost, with a far less complex, much more compact, rugged and portable product.

SUMMARY OF THE INVENTION

This invention provides an improved teaching manikin system having an interactive teaching system with voice coaching which is expected to sell for about $1,000. The electronic controller for this system, in addition to being inexpensive, is compact enough to fit in a space about the size of a textbook.

This system enables one-on-one training and interaction with the student via sensors in the manikin, input buttons on a touch panel, and immediate voice feedback. The sensing means in the manikin are proportional in nature rather than simple on/off limit switches.

The system monitors the student and gives him or her instant coaching feedback by means of a natural-sounding prerecorded voice. It also allows the student to select the particular phase of training he or she wishes to practice.

The invention also provides a means of simulating shallow breathing and a carotid pulse in the manikin at times preselected or secretly chosen by an instructor so that the student has a more realistic opportunity to learn to recognize these faint signs of revival and adjust his or her actions accordingly.

Thus, in keeping with one aspect of the invention, a simulation manikin system is provided for use by a student attempting to practice a procedure normally applied to the human body, such as cardiopulmonary resuscitation. The system includes a manikin that has an artificial lung into which the student can blow to expand the lung, and a resilient chest which the student can compress.

Sensors are provided in the manikin to accurately detect the instantaneous amount of lung expansion and chest compression. An A/D converter converts the analog sensor output signals to digital codes, and inputs them to a compact controller based on an inexpensive microcomputer chip governed by a control program stored in a ROM.

Pushbuttons on the controller's front panel enable the student to select any one of a variety of teaching routines prestored in the microcomputer's ROM. The microcomputer then uses lamps on the panel and a speech synthesizer having prerecorded human speech stored in ROM chips to issue instructions and advice to the student. These are contingent on his performance of the selected routine as detected by the sensors. However, a prestored interrupt routine always enables the student to switch from the current routine to any other or to get an immediate repeat of the last message from the system.

Transducers are provided for simulating a carotid pulse and shallow breathing in the manikin which can be activated by remote control using a wireless transmitter and receiver pair.

The invention is suitable for use in retrofitting "dumb" manikins which are already out in the field, as well for incorporation into new manikin-controller assemblies; a fact which should be taken into account in interpreting the appended claims.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 4 is a functional block diagram of the control unit shown in FIG. 1;

FIG. 8A is a simplified cross-section of a combined hand position and chest compression sensor for use with the manikin of FIGS. 7A and 7B;

FIG. 8B is a plan view of the lower face of a handplate of the combined sensor along the line C—C of FIG. 8A;

FIG. 8C is a plan view of the upper face of a switchplate of the combined sensor along the line C—C of FIG. 8A;

FIG. 8D is an enlarged view of the switchplate of FIG. 8A, showing its cooperation with a potentiometer for detecting its position;

FIG. 8E is a circuit diagram of an analog detection circuit used with the detecting potentiometer of FIG. 8D;

FIG. 8F is an enlarged cross-section of a top portion of the combined sensor of FIG. 8A near the edge;

DETAILED DESCRIPTION

A. System Construction

1. General Construction

Figure 1:
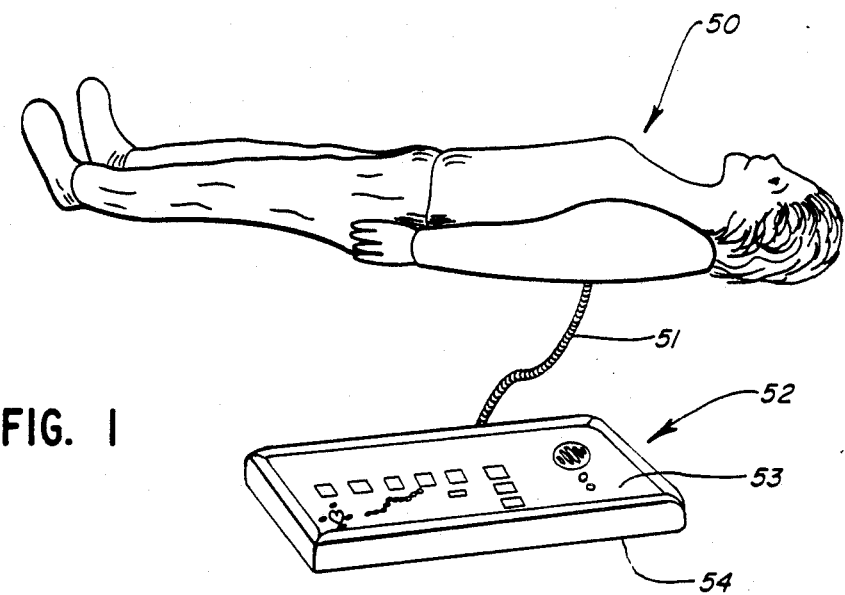
FIG. 1 is a perspective view of an interactive CPR training system including a simulation manikin and a control unit incorporating the principles of the invention.

As shown in FIG. 1, an interactive CPR training system constructed in accordance with the teachings of this invention comprises a simulation manikin 50 coupled by a cable 51 to a control unit 52 comprising a box 54 incorporating a control panel 53. Although control unit 52 is shown separated from the manikin 50, if desired the two may be combined into a single unit. For example, control unit 52 may be mounted in an otherwise unused lower portion of the manikin. Similarly, the electronics for the system may be distributed in any convenient manner between the control unit's box 54 and otherwise unused internal portions of the manikin.

2. Control Panel

Figure 2:
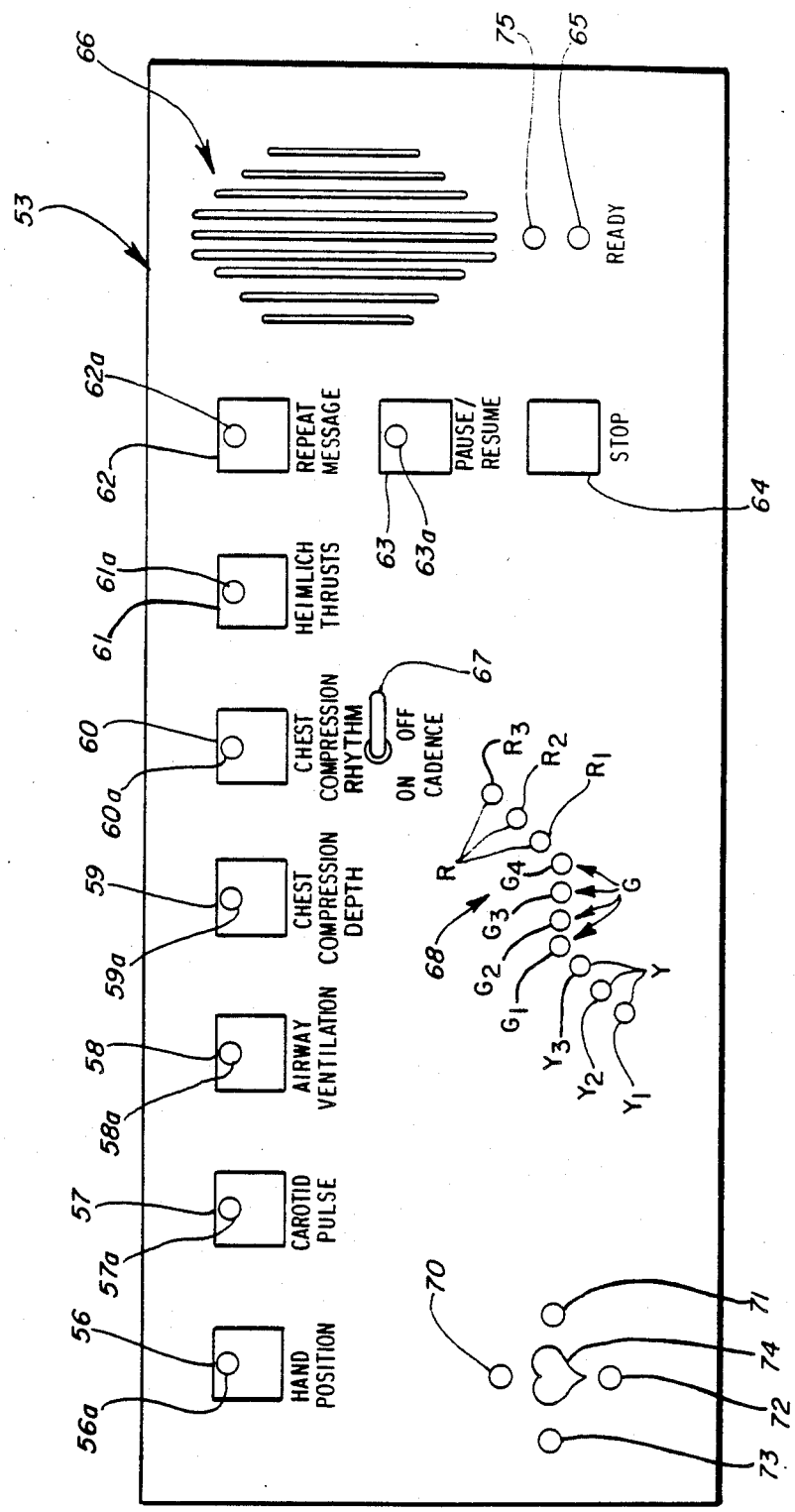
FIG. 2 is a top plan view of a control panel for the training system of FIG. 1.

FIG. 2 shows the control panel 53 in greater detail. The various resuscitation routines taught by the system in conjunction with simulation manikin 50 are chosen by the student, using selection buttons 56 for Hand Position, 57 for Carotid Pulse, 58 for Airway Ventilation, 59 for Chest Compression Depth, 60 for Chest Compression Rhythm, and 61 for Heimlich (Abdominal) Thrusts. An important feature of our invention is that the system is always ready to repeat the most recent message to the student if he or she presses the Repeat Message button 62.

Control panel 53 also includes a Pause/Resume button 63. Pressed once, this button causes the system to pause; pressed again this button causes the system to resume where it left off. If button 63 is pressed once for "Pause", the system will wait a predetermined period, for example four minutes, for the button to be pressed again for "Resume". If the second pressing does not occur within the predetermined period, the system abandons the routine that was "Paused" and resets itself to its standby low power state.

The selection buttons 56-61 for the teaching routines and the Repeat Message 62 and Pause/Resume 63 buttons have corresponding lamps 56a-63a, which may be light-emitting diodes (LED's). A Stop Button 64 causes the current routine being executed to halt and resets the system to its standby low power state.

At certain points in the various operating routines, the system is unable to accept inputs from the student. When the system is ready for student input, it blinks a ready lamp 65 on the control panel 53 of FIG. 2.

The system gives oral advice and coaching to the student via a speaker 66, using prestored messages chosen in context in response to various inputs from the user.

As visual feedback during the ventilation and chest compression training routines, an array 68 of colored LED's indicates the results of the student's efforts to breathe air into the manikin's "lungs" or to "restore circulation" by compressing the manikin's chest. This array consists of three yellow lamps Y1, Y2, Y3 for low readings, four green lamps G1, G2, G3, G4 for medium readings, and three red lamps R1, R2, R3 for high readings. The smallest effort above a certain threshold causes the lowest lamp Y1 to light, and successively larger signals light additional lamps in the order Y2, Y3, G1, G2, G3, G4, R1, R2, R3 until all the lamps are lit.

In the teaching routines this colored lamp array provides important visual feedback to the student: An effort (artificial respiration or chest compression) lighting only the yellow lamps is too low. An effort lighting one or more of the green lamps but none of the red lamps is good, an acceptable performance. But an effort that lights one or more of the red lamps is too much, indicating danger to the victim represented by the manikin.

During efforts to compress the manikin's chest, the student's hand position must be in a critical location corresponding to the lower half of the victim's sternum. As visual feedback, a set of lamps 70, 71, 72, 73 arranged around a stylized heart symbol 74 all remain lit if the hand position during compression is correct. If a lamp goes off, it indicates the hand position on the manikin is too far in a direction indicated by the turned off lamp relative to the center of the heart symbol. This allows the student to note his error and correct his hand position accordingly until all lamps are lit during compression.

In cardiopulmonary resuscitation it is important for the rescuer to periodically check to determine if the victim's breathing or heartbeat has resumed. Button 57 enables a training routine in which the student can practice locating and detecting a carotid pulse in the neck area of the manikin. As a more realistic simulation, the system provides for an instructor to secretly turn on in the manikin a simulation of shallow breathing or carotid pulse or both by means of an wireless signal to the control unit 52. With this objective in mind, the control panel 53 can also include a receiver sensor 75 in a convenient location, such as adjacent the Ready lamp 65. If, for example, an infrared beam is used for the wireless signal from the instructor, sensor 75 will be an infrared detector.

Control panel 53 also includes a cadence switch 67 to turn on a 1.5 Hz audible cadence beat to guide the student in performing a rhythmic series of chest compressions to restore blood circulation.

3. General Teaching Sequence

Figure 3:
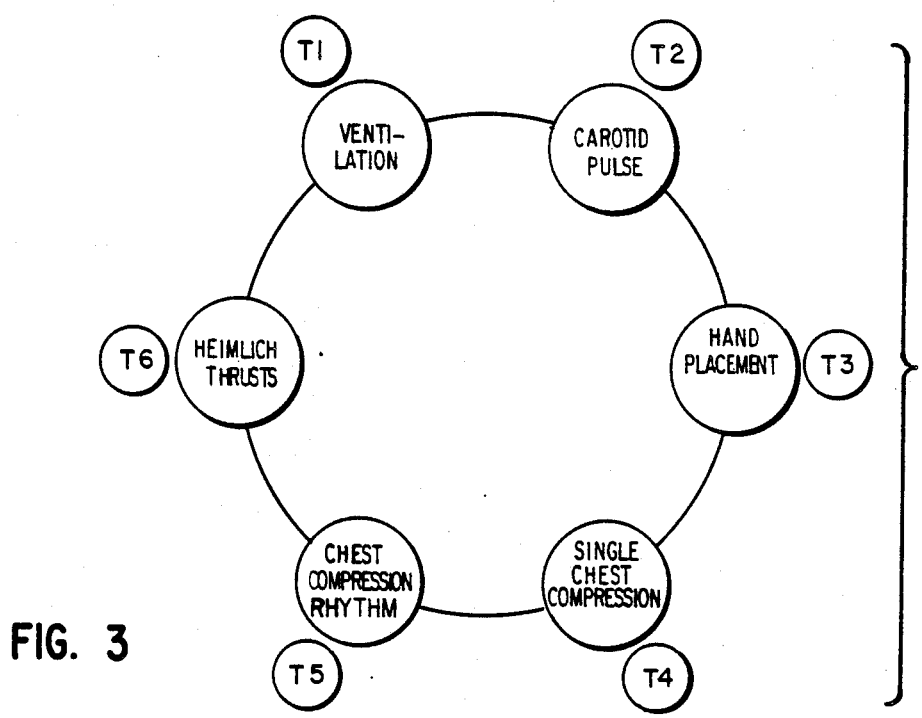
FIG. 3 is a flow diagram of a typical training sequence achieved by the training system of FIG. 1.

FIG. 3 shows a flow diagram of a typical training sequence enabled by the training system of FIG. 1, in which the student can proceed in the following sequence: Ventilation of the Airway (T1), Carotid Pulse Detection (T2), Hand Placement for Chest Compression (T3), Single Chest Compressions (T4), Chest Compressions in Rhythm (T5), and Heimlich Abdominal Thrusts to Remove Airway Obstructions (T6).

The system does not force the student to pursue the training in this sequence. Instead, the student is permitted to select any training routine at a time using the selection buttons 56-61 on the control panel of FIG. 2. However, like a good coach, as the student completes one training routine (e.g. Ventilation), the system vocally suggests the next appropriate sequence (Carotid Pulse), and for a brief interval even blinks the corresponding selection button for the suggested sequence. For example, at the close of the ventilation training the system plays the stored message "Excellent ventilation. If you feel confident, you should now practice checking the carotid pulse. If you don't, try giving two breaths again," and blinks the selection button lamp 57a of FIG. 2 located on the carotid pulse selection button 57.

4. Control Unit

FIG. 4 shows a functional block diagram of control unit 52 of FIG. 1. At the heart of control unit 52 is a microcontroller 80. It is a feature of our invention that while the monitoring, feedback, and vocal coaching of the student is a sophisticated simulation of a human coach, all this can be accomplished with relatively modest computational power, cost and size. While control unit 52 could be implemented by a suitably programmed personal computer or a minicomputer or the like, the necessary associated input/output circuits alone would be at least as complicated and expensive as our microcontroller-based system. Instead, our invention can be satisfactorily realized based on a much simpler single-chip microcomputer For example, microcontroller 80 be can a single chip microcomputer 80a such as the 8 bit HD637B05V0C microcomputer unit (MCU) available from Hitachi America, Ltd. of San Jose, California. Such a microcomputer 80a has a 4 kilobyte ROM (read only memory) 81 for holding a prestored control program and its associated prestored data. It also has a 192-byte RAM (random access memory) 82 which can be used as a scratchpad memory. The microcomputer's basic clock frequency can be set at a convenient frequency, such as 8.0 MHz (megahertz) by a suitable external crystal XTAL attached to terminals X1 and X2. To enable battery operation, the microcomputer unit is made with complementary metal-oxide semiconductor (CMOS) integrated circuits which have low power consumption.

FIG. 4 shows a number of peripheral chips used with microcomputer chip 80a, primarily as interface (input-/output) chips. It is feasible, however, to use a more powerful microcomputer Chip that will incorporate many of the functions of these external circuits. For example, Hitachi America, Ltd. also makes the HD63705ZO microcomputer unit that incorporates 8 channels with built-in A/D converters of 8-bit accuracy.

To enable it to respond to external control inputs, such as the selection buttons 56–63 on the control panel 53 of FIG. 2, microcomputer 80a has an interrupt port (INT) 83 for an external hardware interrupt. These selection buttons 56–63 provide inputs to a switch coder 84. Each time a selection button is pushed, switch coder 84 sends a coded interrupt signal on line 85 to interrupt port 83. The coded interrupt indicates which of the selection buttons has been pushed. The microcomputer 80a then interrupts its current task, storing internal register information in a stack (not shown) so it can return to it later. The microcomputer 80a responds to the interrupt by means of an Interrupt Routine (FIG. 12) that implements the function corresponding to the button pushed.

Microcomputer 80a has an eight-bit timer on board which can be configured to use an external timer clock input received at a TIMER input. The on-board timer in microcomputer 80a includes an eight-bit timer data register TDR, which contains the current value of the on-board timer.

Microcomputer 80a also has various ports P1–P8 which it uses for input/output of data or control signals to external circuits and devices. A coded signal output at port P5 is used to control the indicator lamps on control panel 53 of FIG. 2. A lamp decoder circuit 88 receives the coded output of port P5 and uses it to determine which lamps are to be lit. Lamp decoder circuit 88 sends control signals to a lamp driver circuit 87 via line 88a to switch on or off LED's 56a (HAND POSITION), 57a (CAROTID PULSE), 58a (AIRWAY VENTILATION), 59a (CHEST COMPRESSION DEPTH), 60a (CHEST COMPRESSION RHYTHM), 61a (HEIMLICH THRUSTS), and 63a (PAUSE/RESUME) on control panel 53. To provide for blinking of the lamps, an oscillator signal OSC1 is fed to lamp decoder 88 via blink control line 88b.

In a similar manner, the output at port P4 is used to control the panel lamps 62a (REPEAT MESSAGE) and 65 (READY) via a lamp decoder 90 and a lamp driver 89. To provide for blinking of the lamps 62a and 65, the oscillator signal OSC1 is also fed to lamp decoder 90 via blink control line 90b.

A port P2 is used to control a carotid pulse transducer 91 for simulating a carotid pulse in the manikin's neck. The two inputs of an AND gate 93 receive respectively the output of port P2 and a digital oscillator signal OSC2 of about 1 pulse per second (simulating the carotid pulse rate). The output of AND gate 93 is inputted as a control signal to a transducer driver circuit 92 whose output drives carotid pulse transducer 91.

Similarly, a port P3 is used to control a shallow breathing transducer 94 to enable the manikin to simulate a victim's shallow breathing. The output of port P3 is input as a control signal to a transistor driver 95 which drives shallow breathing transducer 94. An oscillator signal OSC3 having a period of about 4 seconds (simulating a breath every four seconds) is also input to shallow breathing transducer 94.

Electrical power for operating the system is provided by a power supply 97 that outputs supply voltage +V at 97c. It is an important feature of the invention that its circuits and auxiliary devices are small and efficient enough that a compact low-voltage battery 97a, such as six "D" size 1.5 volt dry cells, can provide the necessary electrical energy for the power supply. This permits the manikin to be conveniently portable. However, the power supply can also include an input jack 97b for an external DC supply voltage, such as can be provided by a conventional AC adapter (not shown) that depends on a 110 V. AC line cord for power.

Power supply 97 outputs standby voltage $V_a$ at 97d and a main voltage +V at 97c. Standby voltage $V_a$ is always available if battery 97a is connected or there is a DC voltage input at 97b from an AC adapter. Standby voltage $V_a$ powers those few circuits which must always be able to respond to the pressing of a selection button , such as switch coder 84 and a power supply control flip-flop 97e.

The main voltage +V is turned on to run the teaching routines and turned off for power saving. The output of flip-flop 97e is inputted to power supply 97 so that the state of flip-flop 97e controls whether main voltage +V is on or off.

When the output of flip-flop 97e is a logical 1 (high), main voltage +V is turned on. This is done by inputting a signal that is a logical 1 to the S (SET) input of flip-flop 97e. Pressing any of program switches 56–63 causes selection switch coder 84 to output a power up PSET signal that is a logical 1 on line 85a to input S of flip-flop 97e. This puts flip-flop 97e in its 1 state, turning on main voltage +V for microcomputer 80a and its peripheral circuits. Pressing any of selector switches 56–63 also causes selection switch coder 84 to send an interrupt signal on line 85 to microcomputer 80a.

Once provided with the main voltage +V, microcomputer 80a automatically initializes itself and then services the interrupt signal from selection switch coder 84 to provide the teaching routine corresponding to the switch (56–63) which has been pressed.

Inputting a signal that is a logical 1 to the R (RESET) input of flip-flop 97e cause to output a logical 0 (low), turning off main voltage +V. The R input of flip-flop 97e is fed by the output of an OR gate 97f having two inputs, one from a power off port P0 of microcomputer 80a and the other from the STOP button 64 on control panel 53 of FIG. 2. If either of these two inputs is a logical 1, OR gate 97f outputs a logical 1, resetting flip-flop 97e to turn off main voltage +V, putting the system in its standby low power state.

Thus pressing the STOP button 64 on control panel 53 stops the system by turning off the main voltage but leaves it in the standby state. Normally, pressing the PAUSE/RESUME button on control panel 53 once causes the system to temporarily halt its present routine and wait a preset period for the button to be pressed again for RESUME. However, if the preset period, for example four minutes, is exceeded, microcomputer 80a outputs a logical 1 via power-off port P0, line 99, and OR gate 97f to turn off the main voltage +V.

Ports P6, P7 and P8 are used to provide a simulated speech output including coaching instructions to the student. As will be explained in more detail below, all messages to the student are composed of short, prestored phrases. Therefore, a message is reproduced by sequentially synthesizing each of the prestored phrases making up the message. The real voice sounds which make up the phrases sampled, and sample numbers from which the phrases can be synthesized by a speech processor 108 have been stored as bytes in speech memory chips.

To reproduce a prestored phrase, port P6 is used to output a signal on line 101 to a speech chip decoder 100 that sends an enable signal to the speech memory chip 104 which holds the sample numbers for that phrase. Then port P7 is used to output an address on address bus 105. The contents at that address in the enabled speech chip are read out via a data bus 107 to speech processor 108. After synthesizing the corresponding sound from contents of that address, speech processor 108 sends a signal to port P8 of microcomputer 80a via line 111 to indicate that it is ready to receive the next sample number. The microcomputer 80a responds by outputting the next address on address bus 105. This process is repeated until all stored sounds of the phrase have been synthesized.

The synthesized output of speech processor 108 is smoothed by a low-pass filter 109 having a high frequency cutoff of about 4 kHz. The smooth audio output of low-pass filter 109 is amplified by audio amplifier 110, which drives the output speaker 66 on control panel 53 of FIG. 2

To assist the student in developing the proper rhythm for chest compressions, a cadence beat is provided by a 1.5 Hz cadence signal. A cadence switch 67 on the control panel 53 connects this signal to audio amplifier 110 for audio output by speaker 66.

An external oscillator 112 is provided to generate a reference clock for the relatively low frequency signals. The output frequency of this oscillator is divided by frequency divider circuit 113. That circuit 113 has outputs for the various reference input signals OSC1 (indicator lamp flashing), OSC2 (carotid pulse), OSC3 (shallow breathing), as well as the 1.5 Hz cadence beat, and a 125 Hz timer clock signal that is inputted to microcomputer 80a at a TIMER terminal.

The normally closed switches S12, S3, S6, S9 shown in FIG. 4 are located on the manikin's chest to detect of the student's hand position during chest compression exercises. As will be discussed below in more detail in connection with FIGS. 8A-8F, a misplaced hand will open one or more of these switches. Each of the switches has one side connected to ground and the other side connected to a corresponding LED 70, 71, 72, 73 on the control panel 53 of FIG. 2. Each of the LED's is connected to the supply voltage +V via a respective load limiting resistor 86a. As visual feedback to the student, when a switch S12, S3, S6, S9 is closed, its corresponding LED 70, 71, 72, 73 will be ON, and when the switch is open, the corresponding LED will be OFF.

The non-grounded side of each of the switches S12, S3, S6, S9 has a respective output line 70a, 71a, 72a, 73a connected to a position switch coder 86 and through a respective load resistor 86b to the supply voltage. When a switch S12, S3, S6, S9 is closed, the voltage on the corresponding output line 70a, 71a, 72a, 73a will be a logical 0 (ground), and when the switch is open the output line voltage will be a logical 1 (high). Position switch coder 86 encodes the state of each of the switches and inputs the coded information to microcomputer 80a via port P9.

The manikin is fitted with position sensors for measuring the student's efforts to compress the manikin's chest and to ventilate the manikin's artificial lungs. In FIG. 4 a chest compression sensor 116 is shown as a potentiometer whose main resistive element is connected between ground and supply voltage +V, and whose output slider is mechanically linked to move as the chest is compressed. The output slider voltage is inputted to an A/D (analog to digital) converter 117 when a suitable READ pulse is received on READ/WRITE line 121. The digitized output of A/D converter 117 is inputted to port P1 of microcomputer 80a via a multiplexing I/O port 120.

Similarly, a ventilation sensor 118 is shown as a potentiometer whose main resistive element is connected between ground and supply voltage +V, and whose output slider is mechanically linked to move as air is blown into the manikin's artificial lungs via a mouth opening of the manikin.

The output slider voltage is inputted to a corresponding A/D converter 119 when a suitable READ pulse is received on READ/WRITE line 122. The digitized output of A/D converter 119 is inputted to multiplexing I/O port 120. By sending suitable control signals to the multiplexing I/O port via port P1, microcomputer 80a can read in either the digitized signal from the chest compression sensor 116 or the digitized signal from the ventilation sensor 118.

The slider outputs of the chest compression sensor and ventilation sensor are also outputted as analog signals to output jacks 123 and 124 respectively, which can be used to attach a strip chart recorder or other device for recording or monitoring the student's efforts.

During ventilation and chest compression training routines the LED array 68 on the control panel 53 of FIG. 2 provides visual feedback to the student of the magnitude of his or her efforts. This LED array consists of three yellow lamps Y1, Y2, Y3 for the lowest readings (student's efforts too weak or shallow to be effective), four green lamps G1, G2, G3, G4 for the medium readings (student's efforts acceptable), and three red lamps R1, R2, R3 for the high readings (student's efforts too strong, i.e. dangerous to victim). The smallest effort above a threshold causes the lowest lamp Y1 to light, and successively larger signals light additional lamps in the order Y2, Y3, G1, G2, G3, G4, R1, R2, R3 until all the lamps are lit. LED array 68 can be driven by a commercially available display decoder driver circuit used in a bar mode that increases the number of LED'S lit in proportion to the magnitude of the signal input received by it. For example, National Semiconductor's LED dot/bar generator chip LM3914 can be used for this circuit.

Because the student will not be attempting to compress the manikin's chest and ventilate the manikin's lungs simultaneously, the outputs of the chest compression and ventilation sensors may be visually displayed with a single LE array 68.

The chest compression sensor 116 and the ventilation sensor 118 are each adjusted to give a zero output in the "inactive or default position" corresponding to no activity by the student. The analog signals from chest compression sensor 116 and ventilation sensor 118 are added together by an adder circuit 126. The output (sum) signal of adder 126 is proportional to the magnitude of the active sensor, there being substantially no output contribution from the inactive sensor. The output of adder 126 is inputted to the display decoder driver 125 to drive the common LED array 68.

A rescuer giving cardiopulmonary resuscitation must regularly check for and be alert to whether the victim exhibits a carotid pulse or shallow breathing. The control panel 53 provides a selection button to practice sensing the carotid pulse in the manikin's neck. But an important element of realism is added by enabling the instructor to surreptitiously switch the carotid pulse and shallow breathing transducers on and off by remote control without warning. Additional control inputs 131 (to activate the carotid pulse transducer 91) and 134 (to activate the shallow breathing transducer 94) are provided on selection switch coder 84 for this purpose. Selection switch coder 84 treats control inputs 131 and 134 as if they were additional selector switch inputs for sending a coded interrupt to microcomputer 80a to enable the carotid pulse and shallow breathing transducers. If input 131 or 134 is a logical 1 (voltage high), the corresponding transducer is enabled by microcomputer 80a via the corresponding port P2 or P3. If input 131 Or 134 is a logical 0 (voltage low), the corresponding transducer is not enabled.

The remote control can be by means of a two-channel wireless transmitter 128 that can signal to a matching receiver 129 the logical state desired for two receiver outputs, SB (shallow breathing) and CP (carotid pulse). Device controllers in the form of matching sets of transmitter and receiver circuits that work with infrared or ultrasonic emitters and detectors are commercially available for this purpose.

For example, Motorola Semiconductor Products of Schaumburg, Illinois makes a transmitter (MC14457) and receiver (MC14458) pair of CMOS chips designed for either infrared or ultrasonic ON/OFF remote control of up to 16 channels. If infrared signals are used, the transmitter circuit 128 receives the instructor's selection of the carotid pulse or shallow breathing transducers by means of corresponding selection buttons CP1 and SB1. Transmitter circuit 128 then encodes these choices and transmits them by modulating an output LED that emits an infrared beam. The matching receiver is provided with a receiving photodiode detector sensitive to infrared, whose detected signal is demodulated to determine the desired state of corresponding outputs CP and SB. Similarly, if ultrasonic signals are used, transmitter circuit 128 modulates an ultrasonic output transducer and matching receiver circuit 129 demodulates the output signal of an ultrasonic microphone detector.

The remote control can also be by means of control wires 132 and 135 to remote locations where the instructor can actuate corresponding pushbuttons CP2 and SB2 to send logical 1 signals for the carotid pulse or shallow breathing routines respectively.

In FIG. 4 both wireless and direct wire remote control are provided for. The two inputs of an OR gate 130 respectively receive the output CP of receiver 129 and the signal on wire 132 from pushbutton CP2. The output of OR gate 130 is inputted as a carotid pulse transducer control signal to input 131 of selection switch coder 84. Thus, if wireless output CP or signal wire 132 is a logical 1, OR gate 130 will output a logical 1. to input 131 to signal microcomputer 80a to activate the carotid pulse transducer 91.

Similarly, the inputs of an OR gate 133 receive the outputs SB of receiver 129 and the signal on wire 135 from pushbutton SB2. If wireless output SB or signal wire 135 is a logical 1, OR gate 133 will output a logical 1 to input 134 to signal microcomputer 80a to activate the shallow breathing transducer 94.

5. Shallow Breathing Simulator

Figure 5:
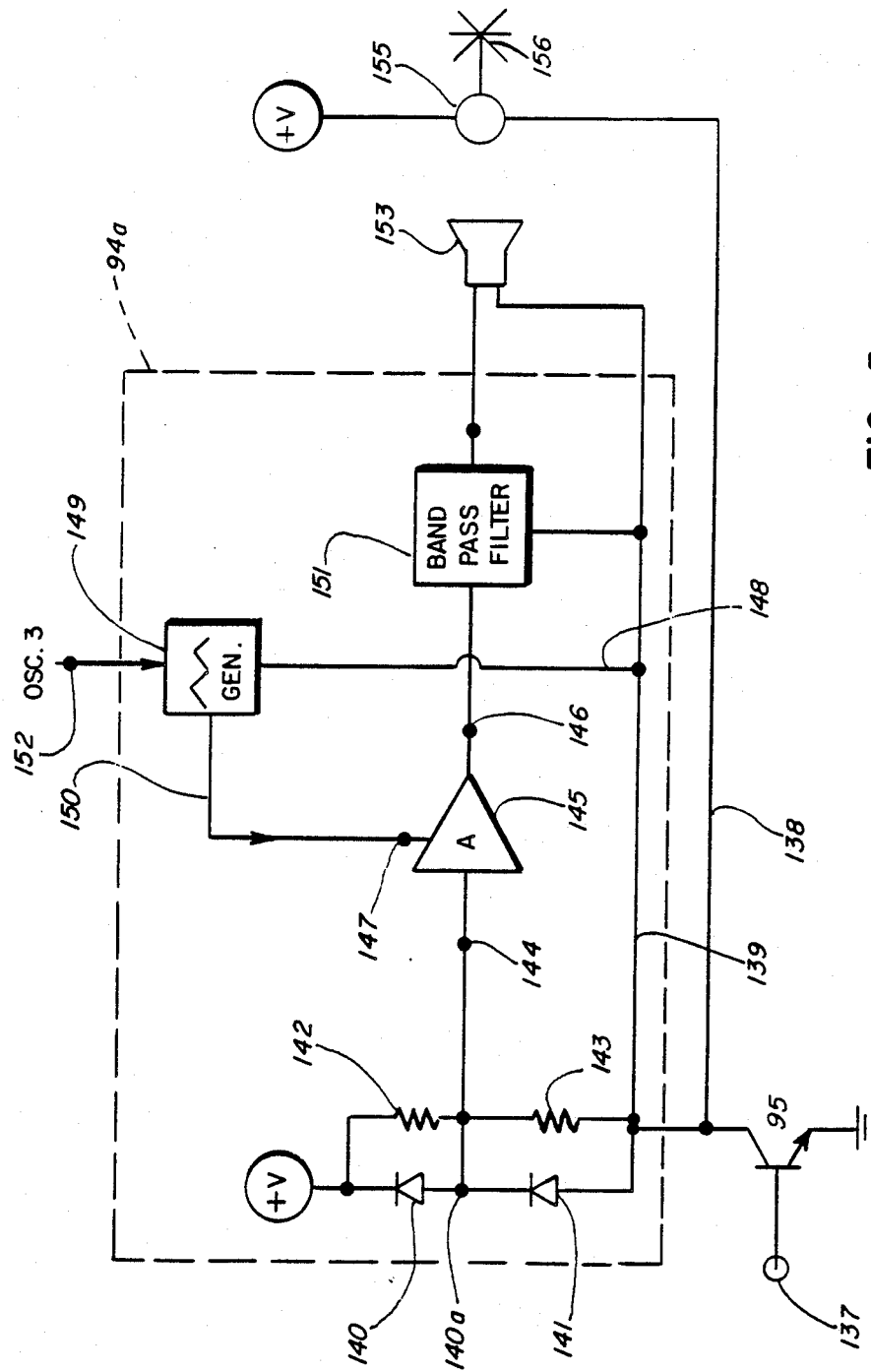
FIG. 5 is a simplified schematic of a shallow breathing simulator for use in the system of FIG. 1.

FIG. 5 shows a detailed example of the shallow breathing transducer 94 and transistor driver 95 of FIG. 4. Transistor driver 95 is a switching transistor having its emitter connected to ground receives at its base input 137 an enabling high signal (logical 1) from port P3 of the microcomputer whenever the operating program determines that the shallow breathing simulation is needed or has been requested (e.g., by instructor intervention). This switches transistor 95 ON, so that a circuit line 139 of a transducer driving circuit 94a is essentially at ground, enabling the driving circuit. Driving circuit 94a is adapted to simulate a "breathing" waveform to drive a miniature output speaker 153 located in the manikin's throat area.

Driving circuit 94a produces an amplitude-modulated random or white noise signal having an amplitude envelope that is a periodic triangular shaped wave with a period of about four seconds (one shallow breath every four seconds). To generate random noise, two reverse-biased diodes 140 and 141 are connected in series between the main voltage +V and grounded line 139 to create random "shot noise" at their connection point 140a. This random noise is input at 144 to an operational transconductance amplifier 145, such as LM 13600 made by National Semiconductor, which provides for a voltage controlled gain input 147. The output of the amplifier at 146 is passed through a bandpass filter 151, such as National Semiconductor's MF5CN100 filter, having a bandpass of about 1 to 5 kHz, and then drives miniature speaker 153.

The gain of amplifier 145 is modulated at gain input 147 by a voltage output at 150 from a triangular waveform generator 149 having a period of 4 seconds. In the functional block diagram of FIG. 4, frequency divider 113 provides a suitable 0.25 Hz low-frequency clock signal OSC3 which can be inputted to triangular waveform generator 149 at 152 to regulate its 4-second triangular periodic waveform.

Each new four-second period of shallow breathing simulation begins with the gain of amplifier 145 set to zero, after which the gain is increased steadily to raise the volume of the white noise. The volume peaks after two seconds, and then the gain of amplifier 145 is steadily reduced to zero in the remaining two seconds of the period, causing the white noise sound to fade away. Thus, the volume of the white noise passed to speaker 153 via bandpass filter 151 rises and falls during the four second period of the triangular waveform, simulating the sound of breathing.

If desired, the movement of air from the mouth and nose during breathing can be simulated by providing a small fan 156 powered by a miniature DC fan motor 155 in the manikin's airway passage area. One terminal of DC motor 155 is attached to the main supply voltage +V and the other terminal is attached to a line 138 wired to the collector of switching transistor 95. Whenever transistor 95 is turned ON by the input at base 137, line 138 is essentially grounded, turning on motor 155 to drive fan 156.

6. Carotid Pulse Simulator

A person performing cardiopulmonary resuscitation must initially determine if the victim's heart has stopped (cardiac arrest), and during the procedure to restore circulation by chest compressions must periodically check for a return of the heart function. This is done by checking the victim's pulse, preferably the carotid pulse in one of the arteries found on either side of the neck. This is done by placing the tips of the index and middle fingers at the correct pulse location at the side of the victim's neck.

Figure 6A:
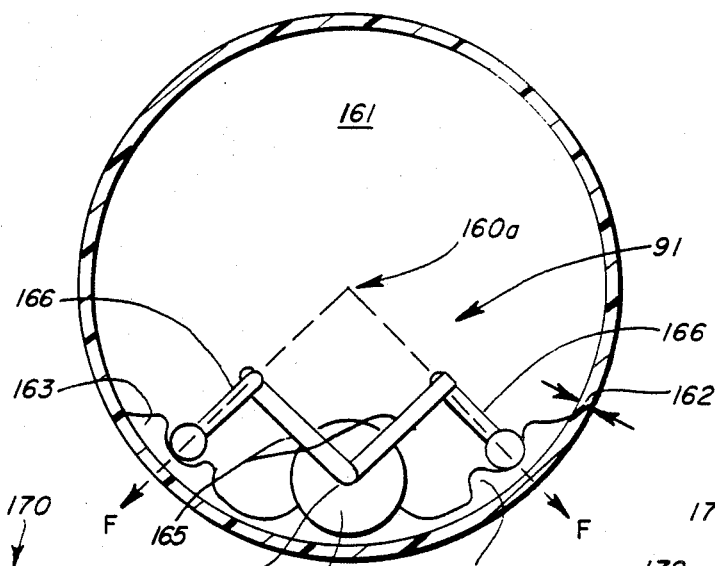
FIG. 6A is a cross-section of a first embodiment of a carotid pulse simulator installed in the neck of the manikin of FIG. 1.

FIG. 6A shows a first embodiment of a carotid pulse simulator 91 that can be suitably located in the hollow area 161 of the manikin's neck 160. The neck is a tubular structure enclosed by a cylindrical wall 162 of plastic "skin". A layer of resilient material 163, such as foam rubber, is attached, by adhesive or the like, to the inside face of neck wall 162. A small DC motor 164 is then axially mounted to the front of neck wall 162 with its drive shaft 164a parallel to the axis 160a of the manikin's neck. The resilient material 163 is used to provide a cushion between motor 164 and neck wall 162. For example, the motor can be attached to the resilient material by a suitable adhesive.

A pair of linkages 165 are symmetrically mounted at approximately a right angle to each other on the motor shaft 164a, and are driven by it. Mounted to each linkage at approximately a right angle is an outwardly directed radial beater arm 166 that rests against the resilient material. Each time DC motor 164 is driven in a clockwise direction, the beater arm 166 on the right impinges on resilient material 163 lining the manikin's neck wall 162. This delivers an impulse of force F to the neck wall in the "carotid" region that can be felt by the student's fingers as a simulated beat of a carotid pulse on that side of the neck. Similarly, when motor 164 is driven counterclockwise, beater arm 166 on the left impinges on material 163, delivering an impulse F to simulate one beat of a carotid pulse on the left side The resilient material 163 is stretched during the impulse. When the impulse ends, the resilient material's restoring force returns the beater arm to its initial position.

Figure 6B:
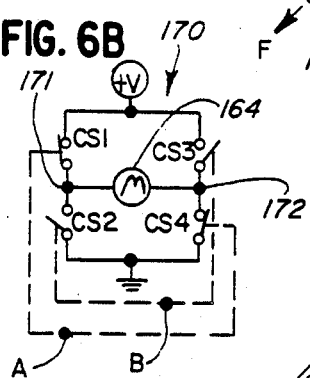
FIG. 6B shows a circuit for providing a bipolar driving voltage waveform for activating the motor of the carotid pulse simulator of FIG. 6A.

FIG. 6B shows a bridge circuit 170 which provides a bipolar driving voltage waveform for activating the motor of the carotid pulse simulator of FIG. 6A. On one side of the bridge circuit, electronically controlled normally open, single-pole, double-throw switches CS1 and CS2, which preferably are switching transistors, are connected in series between the main voltage +V and ground. Similar electronically controlled switches CS3 and CS4 are connected in series between the main voltage +V and ground on the other side of the bridge circuit. The DC motor 164 for simulating the carotid pulse is wired between a first terminal 171 joining switches CS1 and CS2 and a second terminal 172 joining CS3 and CS4.

To turn DC motor 164 in the clockwise direction, only switches CS1 and CS4 are closed by a drive voltage on terminals A just long enough to activate the motor to simulate a carotid pulse on one side of the neck. Then drive voltage A terminates, so that switches CS1 and CS4 are allowed to open, and only switches CS2 and CS3 are closed by a drive voltage on terminals B just long enough make the motor turn counterclockwise to simulate a carotid pulse on the other side. In the functional block diagram of FIG. 4, frequency divider 113 provides a suitable low-frequency bipolar clock signal OSC2 of about 0.65–0.85 Hz which can be used as a clock for controlling the switch pairs CS1 and CS4 on the one side, and CS3 and CS4 on the other.

Figure 6D:
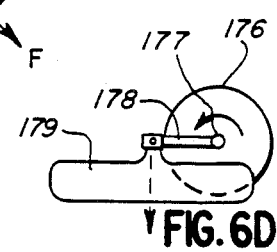
FIG. 6D is a side elevational view of the carotid pulse simulator of FIG. 6C.
Figure 6C:
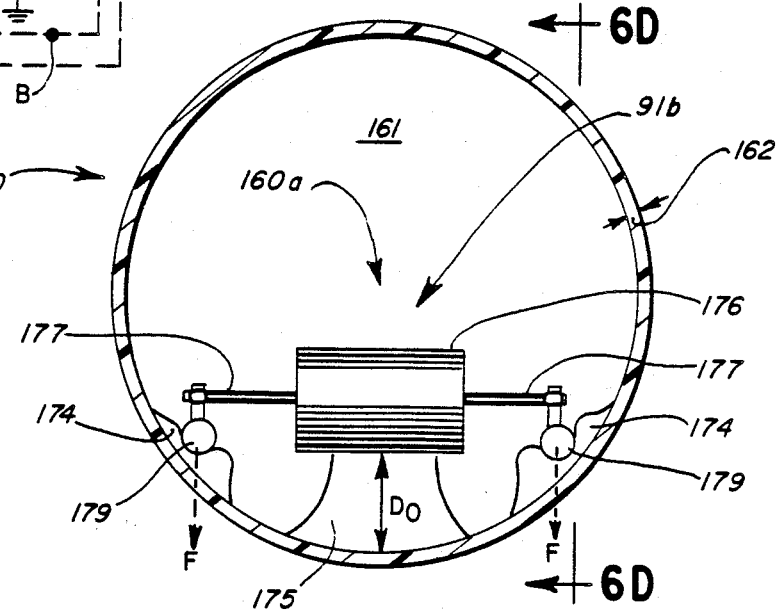
FIG. 6C is a cross-section of a second embodiment of a carotid pulse simulator for use in the manikin of FIG. 1.

FIGS. 6C and 6D show a second embodiment of a carotid pulse simulator 91b that can be transversely mounted in the manikin's neck 160 and driven by voltage pulses of a single polarity. As in the first embodiment of FIG. 6A, the neck wall 162 is lined with a resilient material 174, but only in the regions where the pulses are to be simulated. A motor 176 is transversely affixed at an offset $D_O$ to the neck wall 162 by a base support 175, which may also be of resilient material. Motor 176 is traversed by a rotatable shaft 177 that supports a perpendicular leg 178 at each end. The other end of each leg 178 is joined to an elongated beater foot 179 whose long axis is substantially parallel to the axis 160a of the manikin's neck. Each foot 179 nestles in the resilient material 174.

As can be seen in FIG. 6D, when the motor is pulsed in a single direction (counterclockwise, as indicated by the circular arrow C) each beater foot 179 delivers an impulse of force F to its adjacent area of the neck wall 160. Therefore, with this embodiment a bipolar driving voltage waveform is unnecessary, and the bridge circuit 170 of FIG. 6B need not be used. Instead, the transducer driver 92 shown in FIG. 4 can be a relatively simple switching transistor turned ON and OFF by the output of AND gate 93 to drive motor 176 whenever a beat of the carotid pulse is called for. The other input of AND gate 93 is the 0.65–0.85 Hz clock signal OSC2 from frequency divider 113 to provide the beat of the pulse. The resilient material 174 restores the beater feet 179 to their initial positions during the interval between pulses.

7. Ventilation Sensor

Figure 7A:
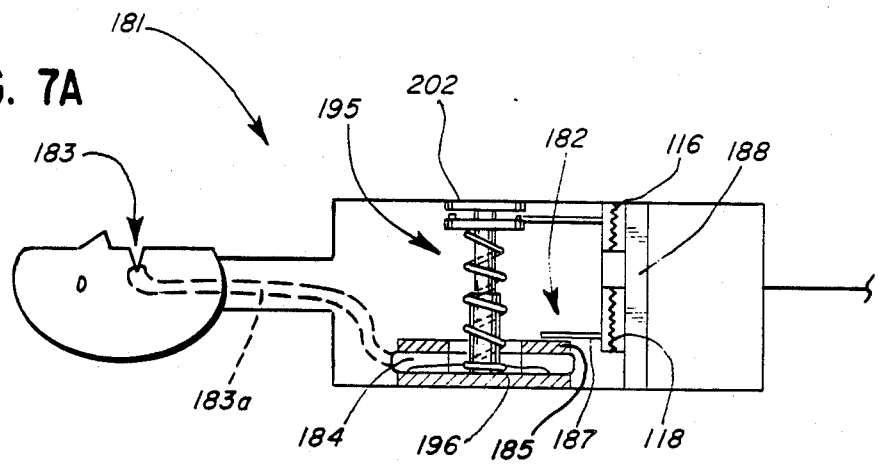
FIG. 7A is a simplified cross-section of a manikin fitted with a ventilation sensor and a combined hand position and chest compression sensor, seen at a time when there is little air in the ventilation sensor.

FIG. 7A shows a simplified cross-section of a manikin 181 fitted with a ventilation sensor 182 and a combined hand position and chest compression sensor 195, seen at a time when the manikin's artificial lungs are deflated. Ventilation sensor 182 has an opening at the manikin's mouth 183 into which the student can blow to inflate the manikin's artificial lungs. The air blown in at the mouth 183 is conveyed by an airway tube 183a, which may be made of plastic, to an inner-tube shaped resilient sac or artificial lung 184 which inflates (compare FIG. 7A with FIG. 7B) as air is forced into it via tube 183a. Artificial lung 184 can be made of rubber or flexible plastic and is toroidally shaped to provide a central passageway 184a for components of chest compression sensor 195 which will be described in more detail below.

Artificial lung 184 is sandwiched between a base plate 196 and a flat lung plate 185 which is attached to the top of plastic lung 184. Plates 196 and 185 are made of plastic or other suitable rigid material. Lung plate 185 also has a central opening 186 to provide for passage of components of the chest compression sensor. As air blown into the manikin's mouth 183 causes lung 184 to inflate, it pushes up against lung plate 185.

Figure 7B:
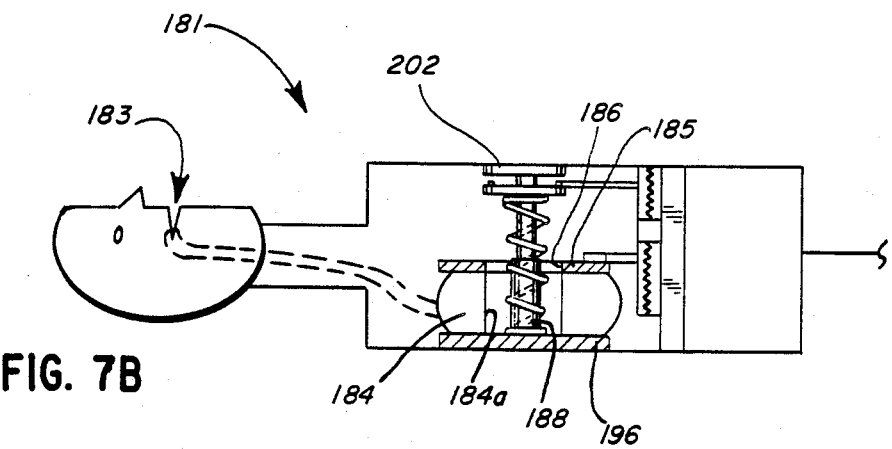
FIG. 7B is a simplified cross-section of the manikin of FIG. 7A seen at a time when air has been blown into the ventilation sensor.
Figure 7C:
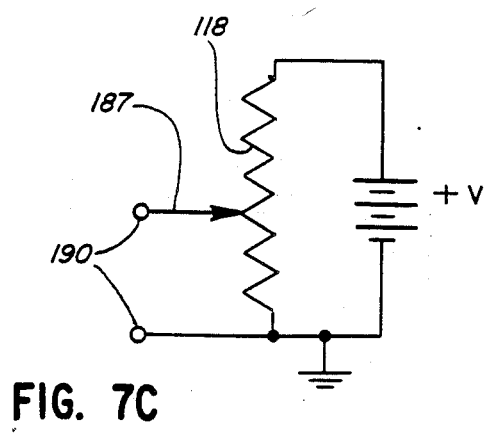
FIG. 7C is a circuit diagram of an analog detection circuit used with the ventilation sensor or chest compression depth sensor shown in FIGS. 7A and 7B.

Adjacent the lung 184 is a vertical support 188 on which is mounted a potentiometer 118 for measuring the excursion of lung plate 185 to determine how much air has been blown into lung 184. Slide potentiometer 118 has a wiper arm 187 mechanically fixed to lung plate 185 to move with the plate. FIG. 7C shows a circuit diagram of an analog detection circuit used with the ventilation sensor of FIGS. 7A and 7B. Potentiometer 118 is connected between the main voltage +V and ground, and its wiper arm 187 provides an output voltage at 190 proportional to the relative position of wiper arm 187 in its stroke along the resistor of the potentiometer. Thus, inflation of the manikin's lungs causes a change in position of lung plate 185 that is reflected in the output of potentiometer 118, providing a means by which the amount of air in artificial lung 184 can be determined.

The purpose of potentiometer 118 is to sense the position of lungplate 185. With suitable adjustments some other type of position sensor, such as a Hall effect sensor, can be substituted for potentiometer 118. Such a substitution can also be made for potentiometer 116 which is used to sense position in chest compression sensor 195, as discussed below.

8. Hand Position and Chest Compression Sensor

In performing cardiopulmonary resuscitation, if a carotid pulse check indicates that the victim's heart has stopped, circulation is restored by external cardiac compression, i.e. rhythmically pressing on the victim's chest. FIGS. 7A, 7B and 8A show a simplified view of a combined hand position and chest compression sensor 195 for installation in the chest area of the manikin. Sensor 195 has a base plate 196 that supports a lower guide tube 197 into which is slidably telescoped an upper guide tube 198 carrying a circular switchplate 204 at its upper end. A coil compression spring 199 is fitted around upper and lower guide tubes 197, 198, the spring's expansion being constrained by the inner opposing faces of base plate 196 and switchplate 204. Resting on a raised circular protrusion 205 in the center of the upper face of switchplate 204 is a circular handplate 202 which may be attached to the inside surface of the plastic skin of the manikin's chest (see FIG. 7A). Handplate 202 and switchplate 204 are each formed of a suitable rigid material, such as plastic or metal, about 4 inches in diameter and a quarter of an inch thick, and are concentrically aligned with guide tubes 197, 198. Circular protrusion 205 is about one inch in diameter and protrudes about one eighth of an inch above the upper face of switchplate 204.

When there is no external downward force on handplate 202, spring 199 pushes switchplate 204 (and its handplate 202) upward until it rests against a stop (not shown). Pushing down on handplate 202 forces upper guide tube 198 into lower guide tube 197 while compressing spring 199 between plates 196 and 204. This simulates the resilient resistance the student would feel when pressing on a real victim's chest. By measuring the excursion of switchplate 204 from its rest position, the amount of compression applied to manikin's chest by the student at any time may be determined. For this measurement a potentiometer 116 is mounted in the manikin on a vertical support 188 and a wiper arm of potentiometer 116 is mechanically fixed to switchplate 204 (see FIGS. 7A and 8D) to move with the switchplate.

FIG. 8E shows a circuit diagram of an analog detection circuit used with the compression sensor of FIGS. 8A–8D. Potentiometer 116 is connected between the main voltage +V and ground, and its wiper arm 213 provides an output voltage at 215 proportional to the relative position of wiper arm 213 in its stroke along the resistor of the potentiometer. Thus, pressing down on the manikin's chest pushes down handplate 202, causing a change in position of switchplate 204. The current position of switchplate 185 is reflected in the output of potentiometer 116, providing a means by which the amount of compression of the manikin's chest can be determined.

As the position of the student's hand on the manikin's chest is critical, handplate 202 and switchplate 204 cooperate to detect any error in hand position. The circular raised portion 205 on the upper face of switchplate 204 supports handplate 202 at distance d when handplate 202 is parallel to switchplate 204. The circular raised area 205 acts as a pivot about which handplate 202 can tilt if the student's hand is pressing off center, but only if it is sufficiently far off center to be outside the periphery of the upper surface of the raised portion 205.

Switchplate 204 carries a number of normally closed microswitches S3, S6, S9, S12 respectively mounted at the 3, 6, 9, and 12 o'clock positions near the plate's edge with their activating buttons bb protruding beyond the upper face of switchplate 204 as shown in FIG. 8F. The interplate distance d (when handplate 202 is parallel to switchplate 204) is chosen to provide enough clearance between the lower face of handplate 202 and the activating buttons of microswitches S3, S6, S9, S12 so that the microswitches remain open. However, if the student's hand position is not correct, handplate 202 will rock about the pivot protrusion 205, pushing down the activating buttons of one or more of the microswitches.

For example, if the student presses the handplate 202 at the relative position indicated by a circle on switchplate 204 in FIG. 8C, handplate 202 will push down the activating buttons of switches S3 and S6. This causes normally closed switches S3 and S6 to open. The area of that upper surface of boss 205, however, defines a circle of hand position tolerance, within which the student's hand can be a little bit off center but not far enough to tilt the plate 202, and therefore will not actuate any of the microswitches S3, S6, S9, S12.

As can be seen in the control unit block diagram of FIG. 4, the opening of switches S3 and S6 will break the circuits providing current to LED's 71 and 72, turning off those LED's, which are physically located on control panel 53 of FIG. 2. Normally all four LED's surrounding the stylized heart symbol on control panel 53 of FIG. 2 are lit, but LED's 71 and 72 will now be off, indicating to the student the general direction (between 3 and 6 o'clock) of his hand placement error.

The opening of switches S3 and S6 will also change the corresponding voltage on inputs 71a and 72a to Position Switch Coder 86 from low (ground) to high, enabling coder 86 to report the presence of a hand position error to microcomputer 80a via port P9. This makes it possible to incorporate feedback coaching messages about the hand position in the teaching routines.

9. A/D Converters

Figures 9A, 9B:
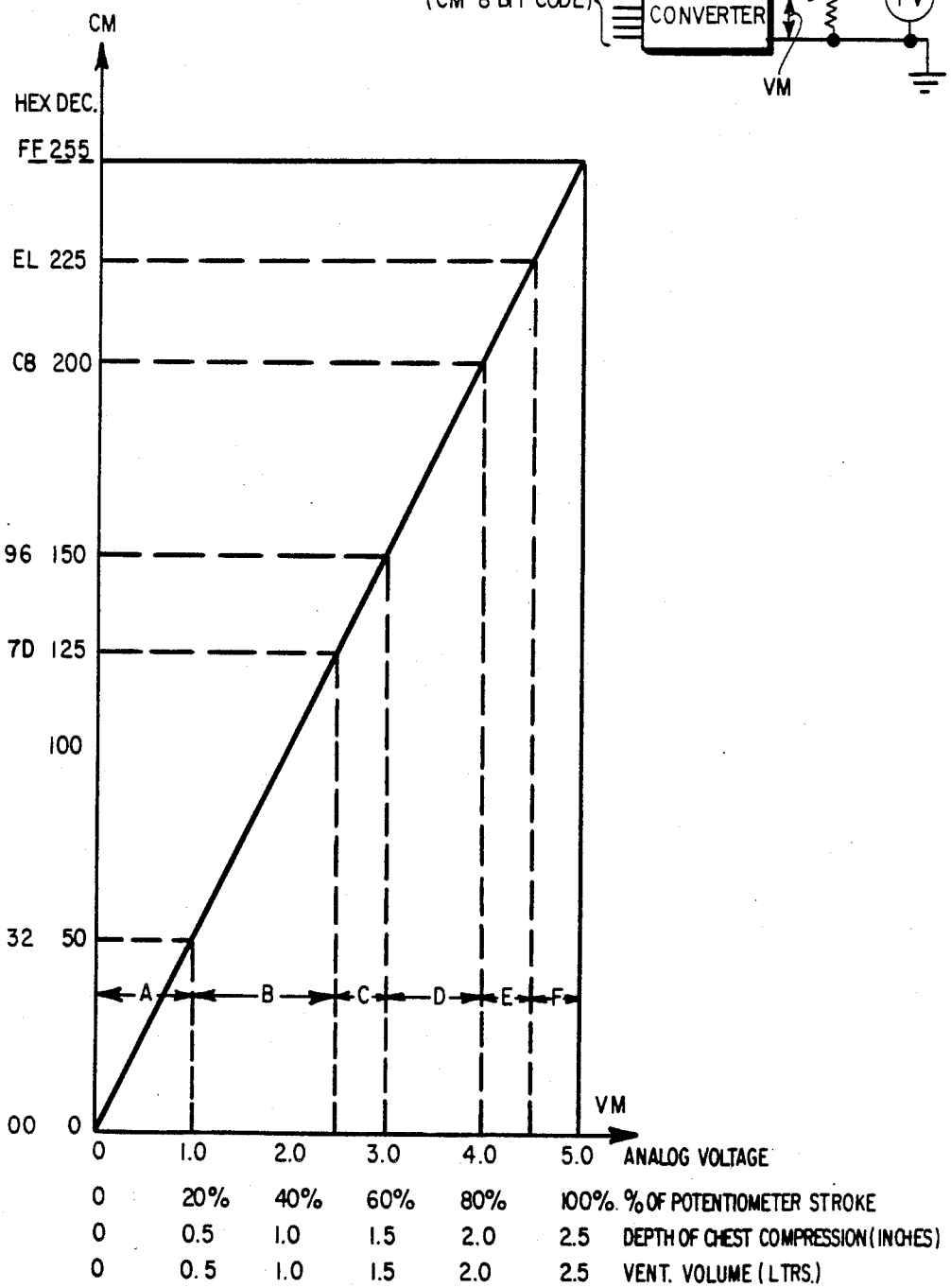
FIG. 9A is a simplified schematic of a conversion circuit which converts measurements of the student's efforts to an eight bit digital code.
FIG. 9B is a curve showing the relationship between an input analog voltage measurement and an output digital code of the measurement.

To enable microcomputer 80a to digitally process the analog voltage signals from the ventilation sensor 182 and chest compression sensor 195, the voltage outputs from the corresponding measurement potentiometers 118 and 116 must be converted from analog voltage signals to an eight-bit digital code by respective A/D converters 119 and 117. FIG. 9A shows a typical conversion circuit in which measuring potentiometer 116 or 118 is connected between the main voltage +V and ground. The potentiometer's wiper arm 221 delivers an output voltage VM that represents the measured value of the ventilation or chest compression.

The output voltage VM is inputted to a suitable A/D converter integrated circuit 222. For example, National Semiconductor Corporation of Santa Clara makes a 5-volt input, 8-bit digital code A/D integrated circuit chip ADC 0803 that can be used for converter circuit 222. Each time A/D converter 222 converts the input VM to digital, the output is an eight-bit digital number whose value can range from decimal 0 ({hex, i.e. hexadecimal, 0) to decimal 255 (hex FF) and is proportional to voltage VM.

The curve of FIG. 9B shows the relationship between the input analog voltage measurement VM and the output digital code measurement CM. Although the 255 levels of an eight-bit code enable the input signal VM to be quantized in steps finer than 1%, in judging the student's performance it is generally sufficient if the quantized signal is categorized into one of the six ranges A-F shown in FIG. 9B. For convenience in working with the microcomputer, integer values of the digital code CM are chosen for the boundaries between ranges rather than integral percentages. Thus, for example, range A, which represents the lowest values, is about the lowest 20% of the total range. However, for convenience this range A ends when the code measurement CM reaches the decimal value 50 (out of a maximum value of 255). Consequently, in terms of percent, range A covers from 0 to 19.2% of the maximum (0 to 0.96 volts). Table 1, which is more accurate than FIG. 9B, gives a detailed listing of the conversion values and the ranges A-F.

TABLE 1

| | A/D CONVERSION & RANGES | | | |
|---|---|---|---|---|
| RANGE | INPUT VOLTS VM | INPUT PERCENT | HEX OUTPUT CM | (DECIMAL VALUE) |
| A | 0.00-0.96 | 0.0-19.2 | 0-31 | 0-49 |
| B | 0.98-2.43 | 19.6-48.6 | 32-7C | 50-124 |
| C | 2.45-2.90 | 49.0-58.4 | 7D-95 | 125-149 |
| D | 2.94-3.92 | 58.8-78.4 | 96-C8 | 150-200 |
| E | 3.94-4.41 | 78.8-88.2 | C9-E1 | 201-225 |
| F | 4.43-5.00 | 88.6-100.0 | E2-FF | 226-255 |

Ventilation sensor 182 is calibrated to measure the volume of air in liters blown by the student into the manikin's artificial lung 184; a 100% reading (5 volts) is 2.5 liters. Chest compression sensor 195 is calibrated to measure the depth of the student's compression of the manikin's chest (at handplate 202) in inches; a 100% reading (5 volts) is a 2.5 inch compression. Table 2 shows how the ranges A-F are defined in terms of the measured quantities.

TABLE 2

| | CALIBRATION OF RANGES | | | |
|---|---|---|---|---|
| RANGE | INPUT AIR VOLUME (LITERS) | INPUT CHEST COMPRESSION (INCHES) | INPUT PERCENT | HEX OUTPUT CM |
| A | 0.00-0.48 | 0.00-0.48 | 0.0-19.2 | 0-31 |
| B | 0.49-1.22 | 0.49-1.22 | 19.6-48.6 | 32-7C |
| C | 1.23-1.46 | 1.23-1.46 | 49.0-58.4 | 7D-95 |
| D | 1.47-1.96 | 1.47-1.96 | 58.8-78.4 | 96-C8 |
| E | 1.97-2.21 | 1.97-2.21 | 78.8-88.2 | C9-E1 |
| F | 2.22-2.50 | 2.22-2.50 | 88.6-100.0 | E2-FF |

The ranges are defined by FIG. 9B and Tables 1 and 2 are generally interpreted as follows in measuring the student's performance. Values in range A are below a minimum set to avoid erroneous readings. Values in range B are much too weak or shallow (too little air, too little chest compression); consequently the student is typically given the verbal feedback "MORE!" (where the exclamation mark indicates special emphasis in the tone of voice in which the message is delivered). Values in range C are close but still too weak or shallow; the verbal feedback is typically "MORE". Range D is the ideal range, so the verbal feedback is typically "GREAT". Values in range E are close but a bit too much; the verbal feedback is typically "LESS". Values in range F are much too strong, endangering the victim; therefore the verbal feedback is typically "LESS!".

10. Instructor Intervention System

Figure 10:
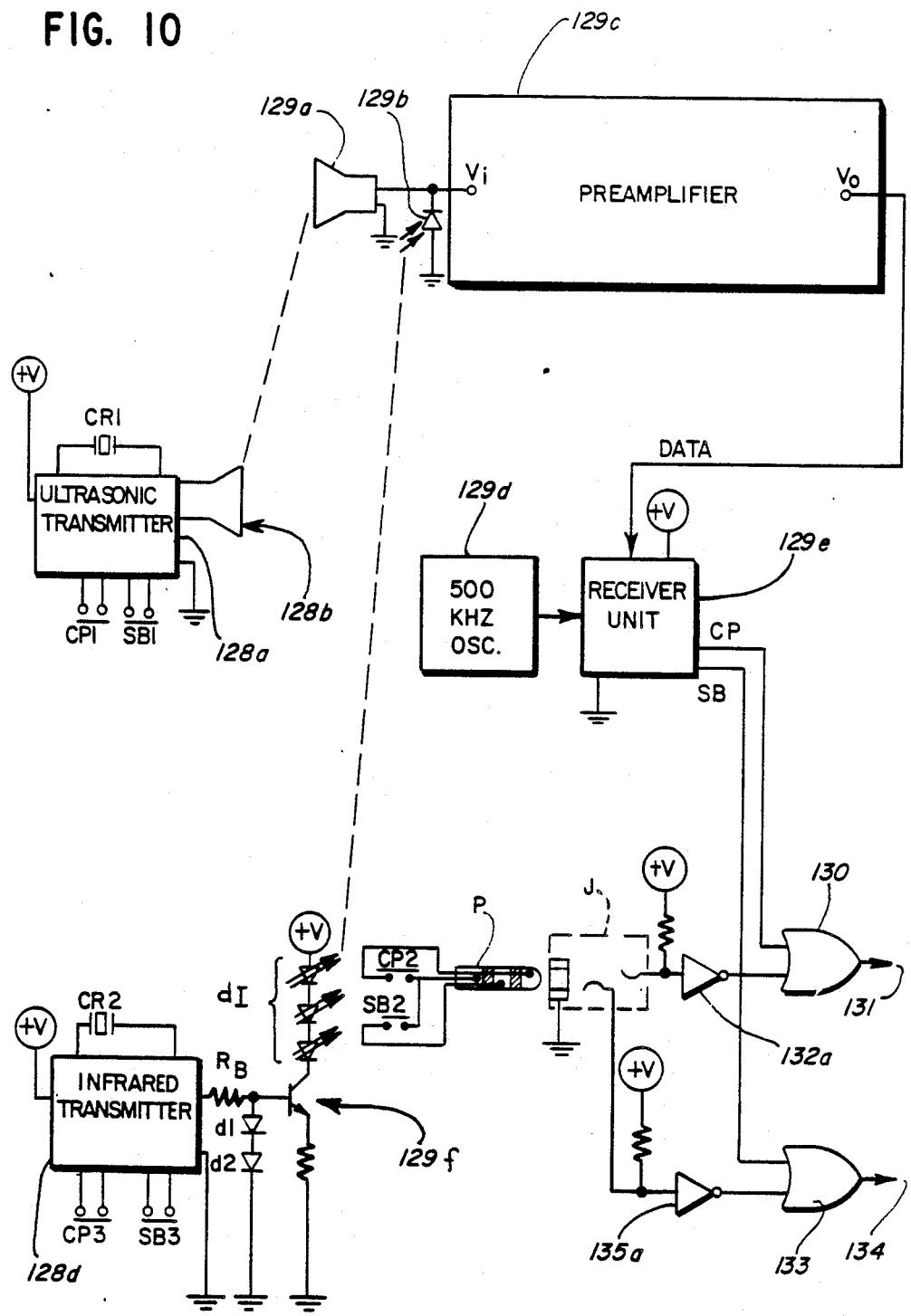
FIG. 10 is a detailed schematic of a remote-controlled instructor intervention system used with the control unit of FIG. 4.

FIG. 10 shows a more detailed schematic of the remote controlled instructor intervention system used with the control unit of FIG. 4. For wireless control, a two-channel ultrasonic transmitter 128a having control pushbuttons SB1 (shallow breathing) and CP1 (carotid pulse) is provided for the instructor. The transmitter sends an ultrasonic signal to a matching receiver 129e to indicate the logical state desired for two corresponding receiver outputs, SB and CP. It can be built from an integrated circuit chip of the type commercially available for ultrasonic control of TV receivers, games, etc, such as Motorola's CMOS monolithic transmitter chip MC14457.

The Motorola chip has an amplifier for driving a miniature ultrasonic ceramic microphone with a frequency-modulated biphase signal. A ceramic resonator CR1 is attached to provide a 500 kHz clock signal that is divided down to yield a high-frequency output of 41.67 kHz and a low-frequency output of 38.46 kHz. To transmit a logical 0, the microphone is driven for 256 periods of the low frequency, followed by 256 periods of the high frequency. For a logical 1, the order of the two frequencies is reversed. Circuitry in the transmitter chip incorporates these frequency-coded signals into a 7-bit data word format having a fixed two-bit start pattern and five data bits, not all of which are used by this invention.

At the receiver end, a ceramic mike 129a is provided to detect the modulated ultrasonic signals and convert them to an electrical signal that is inputted to a preamplifier 129c. The preamplifier receives the detected signal at an input $V_i$ and amplifies and limits it in a conventional manner to shape it into a digital square wave DATA signal, which is then outputted at a terminal $V_o$.

The DATA signal from preamplifier 129c is inputted to a suitable receiver chip 129e matched to decode the modulated signals from the transmitter. For example, Motorola Semiconductor Products sells a matched receiver MC14458 chip for decoding signals modulated by its MC14457 transmitter chip. To match the clock in the transmitter, a 500 kHz oscillator 129d is provided to input a basic clock pulse to the receiver chip. The receiver chip 129e then decodes the DATA signal to detect which of the selection buttons, CP1 or SB1, was pushed at the transmitter. A corresponding output CP or SB of receiver 129e is then set to 1.

The remote control signal sent by the instructor can also be conveyed by means of control wires. FIG. 10 shows selection buttons CP2 and SB2 for the instructor that are carried by a suitable 3-wire cord to a three-wire plug P A matching three-wire jack J on the control unit 52 receives the plug P. By means of the wire, plug and jack, pressing selection button CP2 results in the grounding of the input to an inverter 132a, causing the inverter to output a logical 1 whenever the instructor pushes button CP2. Similarly, pressing button SB2 grounds the input of an inverter 135a, which then outputs a logical 1.

The two inputs of OR gate 130 respectively receive the output CP of receiver 129e and the signal from inverter 132a. The output of OR gate 130 is inputted as a carotid pulse transducer control signal to input 131 of selection switch coder 84. Thus, if wireless output CP or the output of inverter 132a is a logical 1, OR gate 130 will output a logical 1 to input 131 to signal microcomputer 80a to activate the carotid pulse transducer 91.

Similarly, the inputs of OR gate 133 receive the output SB of receiver 129e and the signal from inverter 135a. If wireless output SB or the output of inverter 135a is a logical 1, OR gate 133 will output a logical 1 to input 134 to signal microcomputer 80a to activate the shallow breathing transducer 94.

Alternatively, the instructor can be provided with a wireless transmitter 128d that sends infrared signals to indicate which of two buttons, CP3 (carotid pulse) or SB3 (shallow breathing) has been pressed. The modulation scheme can be similar to that used for the ultrasonic signals.

The previously mentioned Motorola MC14457 transmitter chip can alternatively be wired to modulate the output of LED diodes $d_I$ that emit an infrared beam. As before, a ceramic resonator CR2 is attached to form a 500 kHz clock signal used to provide the high- and low-frequency modulation signals. The frequency-modulated biphase signal formed by the transmitter chip is inputted through a base resistor RB and clipping diodes $d_1$ and $d_2$ to the base of a driving transistor 129f. Transistor 129e modulates the infrared beam by switching on and off the current through the LED diodes $d_I$, which are wired in series between the collector of transistor 129f and the main voltage +V.

At the receiver end, a suitable infrared photodiode 129b is provided at input $V_i$ of preamplifier 129c for detection of the modulated infrared beam. Otherwise, the receiver circuitry and signal processing remains unchanged from that used for the ultrasonic signals.

System Operation

1. Start Up

Until a selection button is pressed, the system remains in a low-power standby mode in which the main voltage +V is off and microcomputer 80a is not operating. Only a standby voltage $V_a$ powers those few circuits which must always be able to respond to the pressing of a selection button, such as selection switch coder 84. However, as explained above in connection with the control unit 52 of FIG. 4, pressing any program switch 56–63 causes the standby circuits to turn on the main voltage +V and also causes selection switch coder 84 to send a hardware interrupt signal on line 85 to microcomputer 80a.

Figure 11:
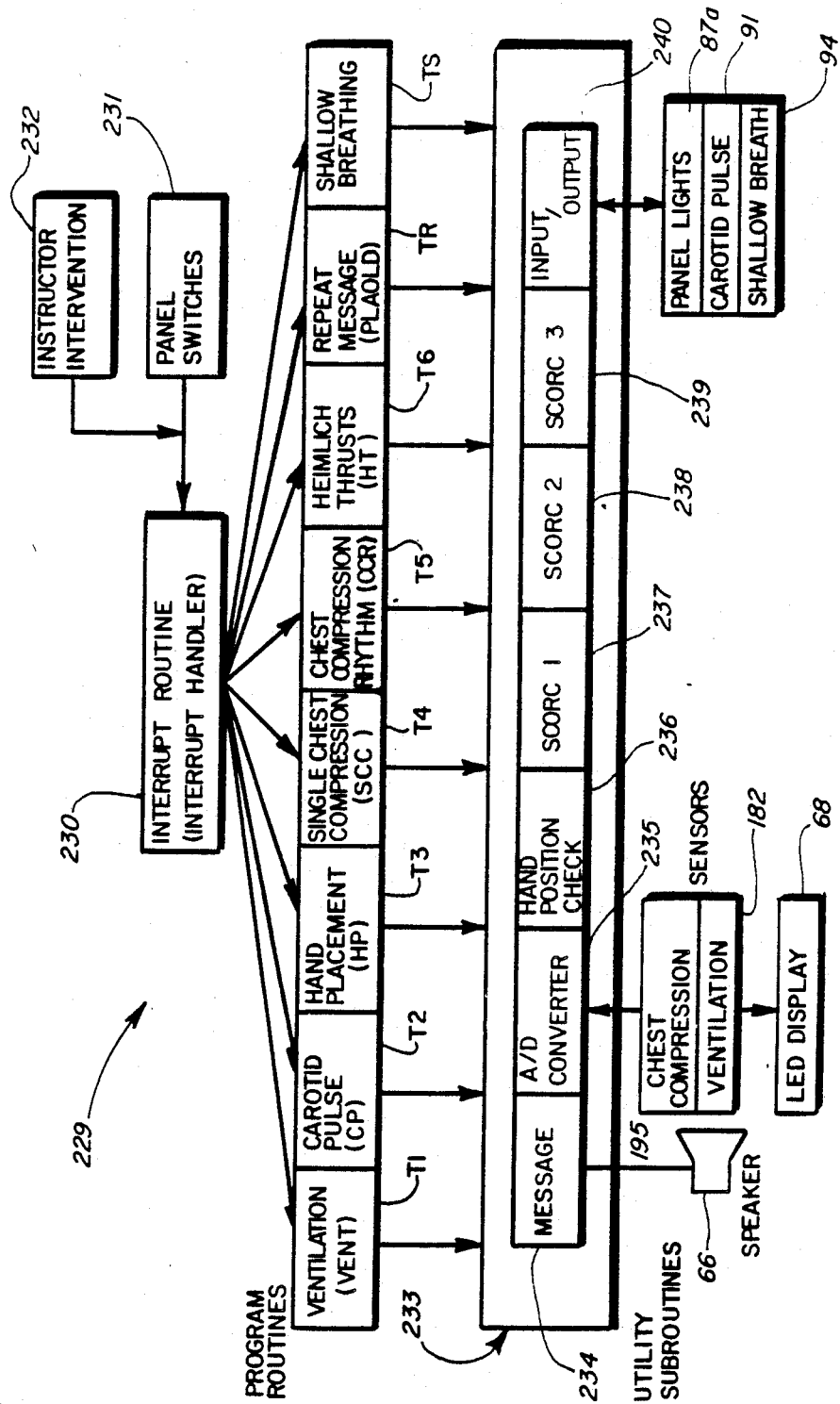
FIG. 11 is a block diagram of an embodiment of a Control Program for use with the control unit of FIG. 4.

Once provided with main voltage +V, microcomputer 80a automatically initializes itself and then transfers control to an Control Program 229 represented in FIG. 11. All of the instructions enabling the microcomputer 80a to implement the Control Program are prestored in the four-kilobyte ROM 81 on board the microcomputer chip 80a, with the exception of speech sounds prestored in the speech memory chips 104.

The complete Control Program is listed in assembly language in Appendix II filed with this patent application.

2. Interrupt Routine

Control Program 229 begins with an Interrupt Routine 230 to service the interrupt signal from selection switch coder 84 to provide a particular program routine corresponding to whichever one of the panel switches 231 has been pressed. If the instructor makes a remote-controlled request for a carotid pulse or shallow breathing, this instructor intervention 232 also sends a hardware interrupt to microcomputer 80a which is immediately serviced by Interrupt Routine 230.

Interrupt Routine 230 gets its name from the fact that an interrupt signal on the microcomputer's line 85 causes microcomputer 80a to stop whatever routine it is currently processing and jump to the instructions of the Interrupt Routine 230 in order to respond to the interrupt signal. To permit a subsequent return to the routine that was interrupted, if desired, the contents of the working registers and the address of the next instruction for the interrupted routine are pushed onto the microcomputer's stack, a last-in-first-out (LIFO) storage area of RAM 82. After the interrupt is processed, the information on the stack can be retrieved to resume processing of the interrupted routine.

The interrupt signals sent to microcomputer 80a on line 85 by selection switch coder 84 are coded to indicate the particular program routine selected. As can be seen in FIG. 11, the program routines available are Ventilation T1, Carotid Pulse T2, Hand Placement T3, Single Chest Compression T4, Chest Compression Rhythm T5, Heimlich Thrusts T6, Repeat Message TR, and Shallow Breathing TS. Also available, but not shown in FIG. 11, is a Pause Routine incorporated into Interrupt Routine 230.

To carry out their functions, the program routines can invoke Utility Subroutines 233. These utility routines are Message 234, A/D Conversion 235, Hand Position Check 236, scoring routines SCORC1 237, SCORC2 238 and SCORC3 239, and Input/Output 240. Message subroutine 234 outputs a message of a designated number via speaker 66 for voice feedback. A/D Conversion subroutine 235 takes readings from ventilation sensor 182 and compression sensor 195 and converts them to an eight-bit digital code (FIGS. 9A and 9B). Hand Position Check routine 236 gives corrective comments on the student's hand position for chest compressions.

The utility routines include three scoring subroutines: SCORC1 subroutine 237 scores and tallies the amount of each ventilation of the manikin's artificial lung or the depth of each chest compression, interjecting an immediate single brief (about ½ second) word of praise or criticism to the student via message subroutine 234. The SCORC2 subroutine 238 vocalizes the tally of the student's efforts for 15 successive chest compressions. The SCORC3 subroutine 239 voices a criticism of the rhythm of the student's 15 chest compressions.

The Input/Output subroutine 240 enables control of the panel lights 87a, carotid pulse transducer 91, and shallow breathing transducer 94.

Figure 12A:
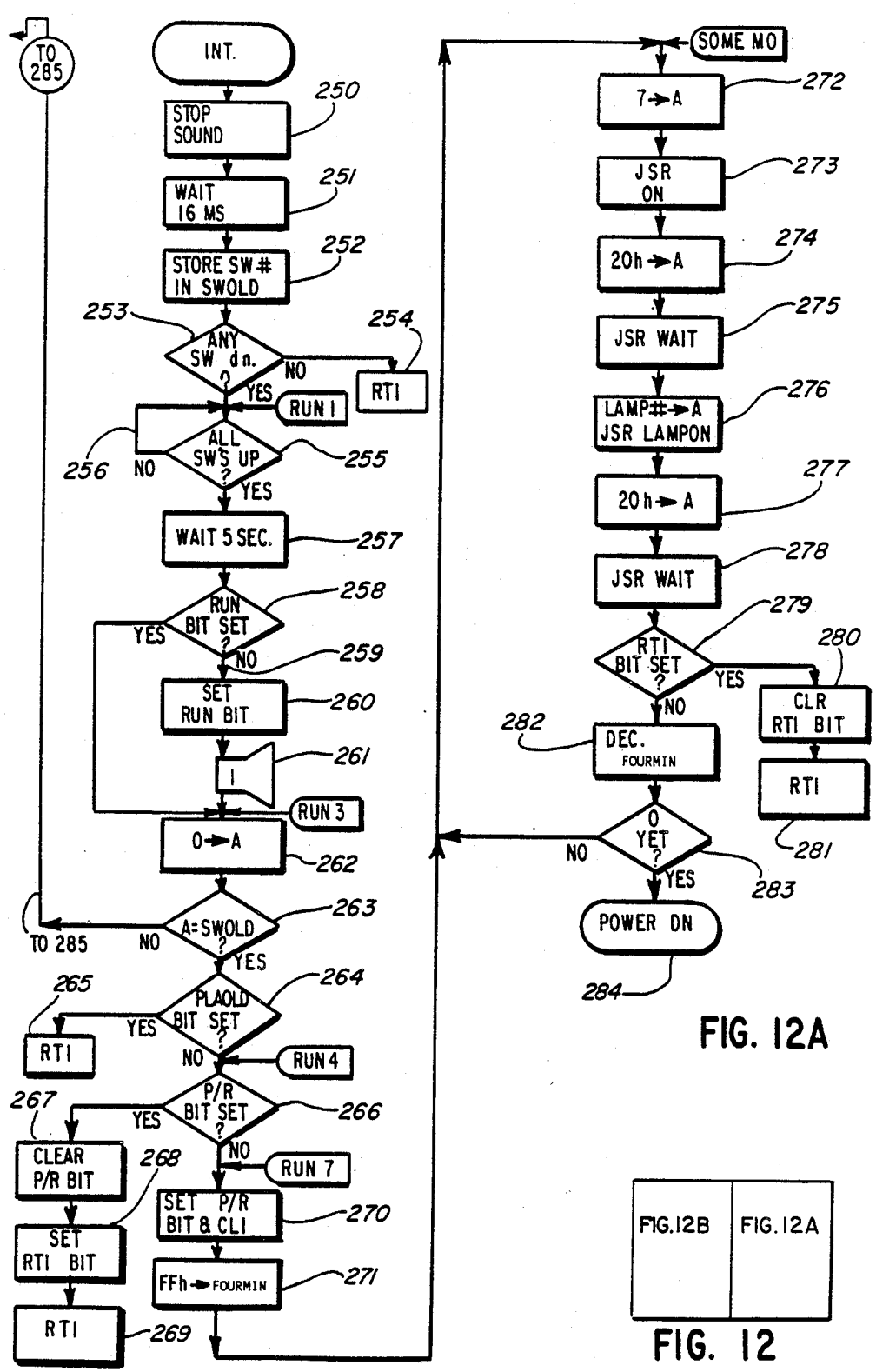
FIG. 12 is a flow chart for an embodiment of the Interrupt Routine incorporated in the Control Program of FIG. 11 and includes the Repeat Message Subroutine of FIG. 11.
Figure 12:
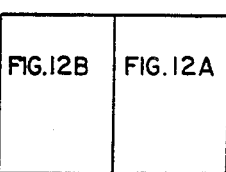
Figure 12B:
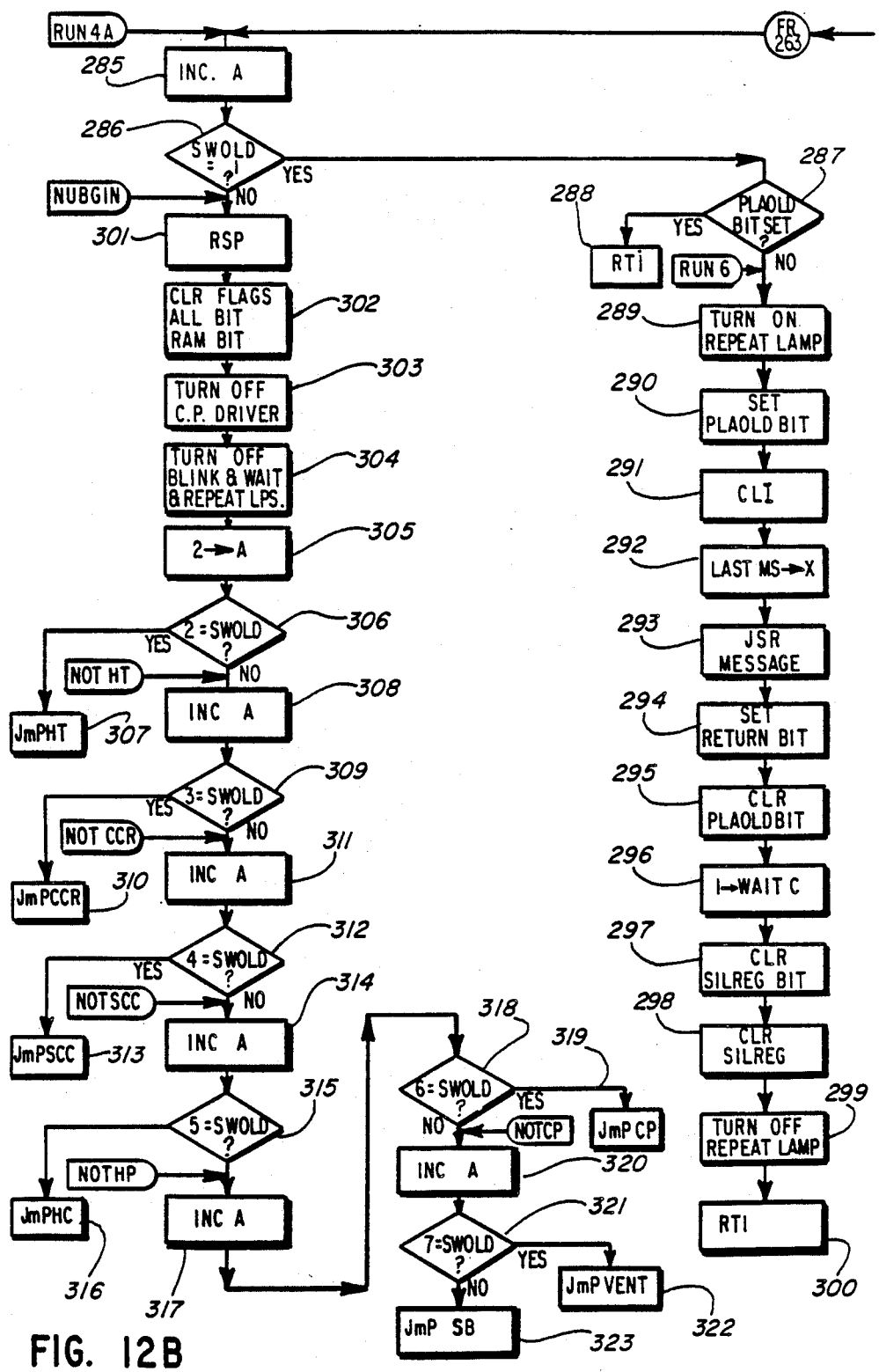

A flow chart for an embodiment of the interrupt routine is shown in FIG. 12. For convenience in programming the routine in assembly language, mnemonic labels have been added at certain key steps (e.g. see the label RUN1 at STEP 255). However, the description of this and other routines that follows ignores these occasional mnemonic labels and instead uses appended reference numbers.

Microcomputer 80a interrupts whatever program code it is processing and jumps to this routine whenever selection switch coder 84 sends a coded interrupt. As microcomputer 80*a* might have been in the middle of playing a message, a control signal is sent to stop the sound to speaker 66 (STEP 250). A short 16 ms wait is introduced (STEP 251) to block out any effects of bouncing of the switch contacts of selection switches 56-63. Switch coder 84 sends a coded interrupt giving the number of the selection switch that was pressed; this number is stored as SWOLD (switch old) (STEP 252). To rule out the possibility of a brief noise transient causing the interrupt signal, a check is made to see if some selection switch is still down, that is, is the interrupt signal still present on line 85 (STEP 253). If no switch is down, a false interrupt by a noise transient is assumed, and a return from interrupt (RTI) is made to resume the interrupted routine (254).

If a switch is down at STEP 253, a further check of the interrupt line is made at STEP 256 to see if all switches are now up (interrupt no longer present). If some switch remains down, the program loops back (STEP 256) until all switches are up. Before proceeding, a half-second delay is introduced to avoid the problems of too quick a response (STEP 257).

If the interrupt routine is running for the first time since the main voltage +V was turned on, the memory will be clear and a bit called RUN BIT will not be 1 (it will be 0). A check of BIT is made (STEP 258). If RUN BIT is not 1, it is set to 1, and a welcoming Message 1 (see Appendix I) is voiced via the Message subroutine (STEP 261).

Now the interpretation of switch number SWOLD begins. The selection switches use the following code:

| SWOLD | SWITCH NAME | PART NUMBER |
|---|---|---|
| 0 | PAUSE/RESUME | 63 |
| 1 | REPEAT MESSAGE | 62 |
| 2 | HEIMLICH THRUSTS | 61 |
| 3 | CHEST COMPRESSION RHYTHM | 60 |
| 4 | SINGLE CHEST COMPRESSION | 59 |
| 5 | HAND POSITION | 56 |
| 6 | CAROTID PULSE | 57 or 131 |
| 7 | VENTILATION | 58 |
| 8 | SHALLOW BREATHING | 134 |

A zero is loaded in the accumulator A (STEP 262) so SWOLD can be compared with 0 (STEP 263). If the P/R bit is not set to 1 (is 0), a PAUSE is desired, and the P/R bit is now set (STEP 270). An operation called CLI, Clear Interrupt Mask bit, is performed so that the PAUSE itself can be interrupted by the later pressing of a selection key, either the PAUSE/RESUME key or another selection key.

The PAUSE routine is designed to wait as long as 4 minutes for the PAUSE/RESUME button to be pressed again for RESUME. As a counter, the variable FOURMIN is set to hex FF (decimal 255).

While in the pause mode, the PAUSE/RESUME lamp 63*a* on control panel 53 (FIG. 2) and the lamp of the routine that was in progress before the PAUSE are alternately flashed. The accumulator A is set the code number (7) of the PAUSE/RESUME lamp 63*a*, and a service routine ON is called to turn on the lamp whose code is in accumulator A. A half second delay (512 ms) is introduced by setting A to hex 20 (decimal 32) in STEP 274 and calling a service subroutine WAIT (STEP 275) that introduces a delay of 16 ms times the number in Accumulator A.

The lamp number of the interrupted routine, found as the current value of a variable LAMP, is then loaded in the accumulator A and service routine ON called to light the indicated lamp (STEP 276) for a half second (STEPS 277 & 278).

If at STEP 279 a bit called RTI is found to have been set to 1 (by a method to be explained shortly), the PAUSE is ended by clearing the RTI bit to 0 and executing a RETURN FROM INTERRUPT (RTI) to resume the routine interrupted by the PAUSE. On the other hand, if the RTI bit is not yet set, the variable FOURMIN is decremented by 1 (STEP 282) and if it is not yet 0 (STEP 283) the program loops back to STEP 272 to blink the lamps again. If FOURMIN does get decremented to zero, four minutes have elapsed since the PAUSE button was pressed and the system enters the lower power standby mode by turning off the main voltage +V.

If at STEP 266 the bit called P/R is found to be a 1, a PAUSE is already in progress and the current pressing of PAUSE/RESUME indicates that a RESUME is desired. The P/R bit is cleared to 0, the bit called RTI is set to 1 to indicate that the PAUSE should be ended the next time STEP 279 is passed. Next a return from interrupt (RTI) is made (STEP 281) that transfers control back to the loop of steps between STEPS 272 and 283 used to implement the PAUSE. In other words, the way to end the PAUSE is to interrupt it for a brief interval by pressing the PAUSE/RESUME key again: this enables the RTI bit to be set to 1 at STEP 269, so that when the PAUSE is resumed it will terminate via STEPS 279, 280 and 281.

Returning to STEP 263, if SWOLD is not a 0, Accumulator A is incremented from 0 to 1 (STEP 285) and a check is made to see if SWOLD is a 1 (STEP 286), which would indicate that the REPEAT (last) MESSAGE button 62 was pressed. If it was, a check is made to see if a bit called PLAOLD is set (STEP 287). If it is not, a repeat of the last message played can be executed. The REPEAT MESSAGE lamp 62 on panel 53 is turned on (STEP 289), and to indicate to later interrupts that a REPEAT MESSAGE is in progress, the PLAOLD bit is set to 1 (STEP 290). The operation called CLI, Clear Interrupt Mask bit, is performed (STEP 291) so that the REPEAT MESSAGE itself can be interrupted by the later pressing of a selection key.

The message number of the last message is found from the current value of the variable LASTMS (last message), which is loaded in register X (STEP 292) and the subroutine Message is called to play the message whose number is in register X.

A bit called the RETURN bit is set (STEP 294) so that should the interrupt end with control resuming in the playing of message, that message will be aborted (having already been replayed by the REPEAT MESSAGE button). Since the message desired has been fully repeated, the PLAOLD bit is now cleared (STEP 295).

If the REPEAT MESSAGE button was pressed while a WAIT subroutine was being executed, the WAIT should be preferably aborted when control is passed back to it, so the student can act on the repeated message. Such an abort or quick return is enabled by setting a variable WAITC to 1 (STEP 296). Similarly, a bit called SILREG (silence register) bit and a variable called SILREG (silence register) are zeroed (STEPS 297 & 298) to remove any now unnecessary voicing pauses when control is resumed by the interrupted routine. The REPEAT MESSAGE lamp is turned off (299) and a Return From Interrupt (RTI) is executed (300).

Returning to STEP 287, if the PLAOLD bit is set, a REPEAT MESSAGE must already be in progress (see STEP 290). The REPEAT MESSAGE button must have been pushed and should be ignored, which is done by terminating the interrupt by a Return From Interrupt (RTI).

Returning to STEP 286, if SWOLD is not a 1, one of the other selection buttons must have been pressed for a switch to a fresh teaching routine; there will be no Return From Interrupt (RTI) to the interrupted routine. Since there will be no return from the interrupt, a Reset Stack Pointer (RSP) instruction is executed (STEP 301). As housekeeping measures before executing the new routine, the microcomputer's flags are cleared (STEP 302), and the byte ALLBIT and a byte called RAMBIT are cleared (STEP 302), the carotid pulse driver 92 is turned of (should it be on), and a service routine LAMPS is called to turn off the READY (also called "WAIT[ING]") or REPEAT MESSAGE lamps.

STEPS 305, 306 load a 2 into Accumulator A and compare it with SWOLD. If SWOLD is 2, there is a jump to the Heimlich Thrusts teaching routine (STEP 307). Otherwise, STEPS 308, 309 increment Accumulator A from 2 to 3 and compare it with SWOLD. If SWOLD is 3, there is a jump to the Chest Compression Rhythm routine (STEP 310). Otherwise, STEPS 311, 312 increment Accumulator A from 3 to 4 and compare it with SWOLD. If SWOLD is 4, there is a jump to the Single Chest Compression teaching routine (STEP 313).

Similarly in STEPS 314, 315, if SWOLD is 5, there is a jump to the Hand Position teaching routine (STEP 316). In STEPS 317, 318, if SWOLD is 6, the jump is to the Carotid Pulse teaching routine (STEP 319). In STEPS 320, 321 if SWOLD is 6, there is a jump to the Ventilation teaching routine (STEP 322). Otherwise, at STEP 323 a jump is made to the Shallow Breathing routine.

Thus the Interrupt Routine acts as the central routine by which the student, or the instructor by intervention, can select the next routine to be run, or interrupt a currently running routine for a quick repeat of the last message or a pause of up to four minutes.

3. Ventilation Teaching Routine

Figure 13B:
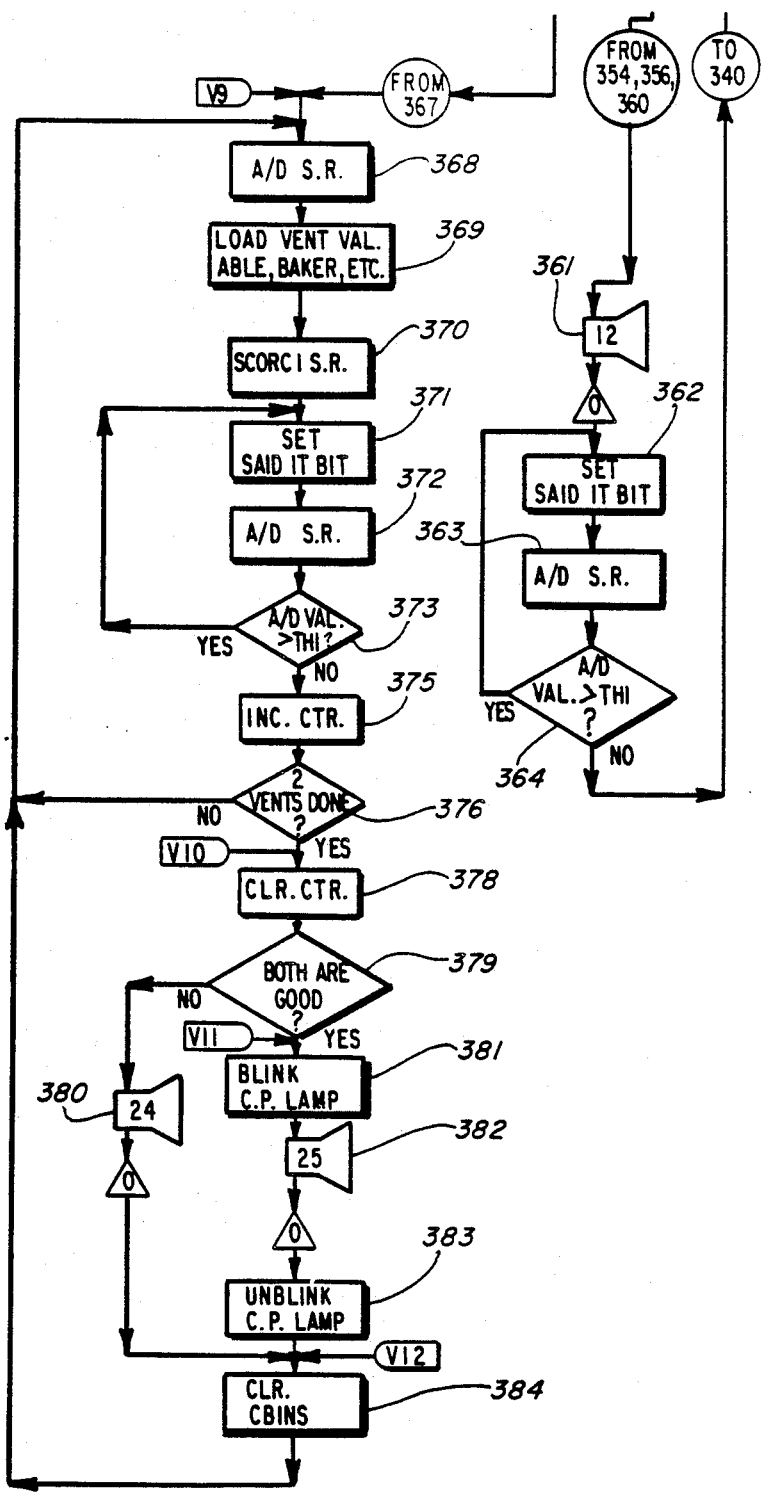
FIG. 13 is a flow chart for an embodiment of the Ventilation Teaching Routine incorporated in the Control Program of FIG. 11.

FIG. 13 shows a flow chart of an embodiment of the Ventilation Teaching Routine for practice of artificial respiration. The purpose of the routine is to have the student practice blowing air into the manikin's artificial lung until the student can do two successive correct single ventilations. Then the student practices multiple ventilations, two at a time.

The Ventilation routine begins by clearing the microcomputer's RAM 82 (STEP 330) and setting a noise reducing threshold value TH1 which a given ventilation sensor measurement must reach before being recognized as an effort by the student. The threshold TH1 is set to hex 32, which corresponds to threshold of 0.49 liters of air in the manikin's lung 184. Values in Range A of FIG. 9B and Table 2 are below the threshold. To show which routine is running, the AIRWAY VENTILATION lamp 58 is turned on (STEP 331).

To indicate various messages which are voiced by the Message routine, the flow chart of FIG. 13 includes a speaker symbol for each message, on which appears the number of the message. A complete listing of the messages by message number appears in Appendix I. Pauses introduced between the messages by the delay subroutine called WAIT are indicated by a triangle symbol, on which is written the number of seconds of delay. Since these pause symbols are self-explanatory, they will not be explicitly mentioned as numbered steps in the following description of the Ventilation and other routines.

STEPS 332–338 voice Messages 2–8 as instructions to the student for beginning artificial respiration. The result is as follows:

Ventilation. Open the airway by gently tilting the head way back. Press down on the manikin's forehead with the palm of one hand. With your other hand, lift either under the neck, near the base of the head, or with the fingertips, under the bony part of the jaw near the chin. Pinch off the manikin's nostrils. Open your mouth wide, take a deep breath, and make a tight seal with the manikin's mouth and blow. Try a single ventilation. I will tell you how you did.

A bit called the ADC bit is cleared to 0 (STEP 340) to indicate that the A/D Conversion utility subroutine should read in analog data from the ventilation sensor 118 rather than the chest compression sensor 116. Then the A/D subroutine is called (STEP 341). Whenever the A/D subroutine is called to take data, it begins by turning on READY lamp 65 on control panel 53 (FIG. 2), so the student will know the system is ready to monitor his efforts When the student then tries blowing into the manikin's lung, the A/D subroutine quickly takes a series of sample readings of the ventilation sensor 118. When the student's effort has peaked, the A/D subroutine sets a variable called MAXVAL equal to the A/D converted peak or maximum value and returns control to the Ventilation routine.

If STEP 342 determines that MAXVAL is less than hex 7d (1.23 liters), the student's attempt lies in Range B and is too weak. If STEP 343 determines (from a counting variable called BADC1) that it is not yet the third time the student's attempt was in Range B, the counting variable BADC1 is incremented by 1 (STEP 344) and coaching Message 11 is voiced: Blow Harder. Then the routine proceeds to STEP 353.

On the other hand, if the student's attempts repeatedly fall in Range B, variable BADC1 will soon be incremented to a 2. In this case, after the third such weak attempt STEP 343 switches control to STEP 346. The variable BADC1 is cleared to zero and coaching messages 9 and 10 are voiced: "More air. Be sure that you're taking a deep breath and keeping a tight seal with the manikin's nostrils." Then the routine proceeds to STEP 353.

The coaching messages are voiced promptly after the student's attempt has peaked, with a natural timing, inflection, tone, and volume that simulates human coaching.

If STEP 342 finds that MAXVAL is equal to or greater than hex 7d, STEP 349 determines if MAXVAL is greater than hex 96. If it isn't, the student's effort lies in Range C (1.23–1.46 liters), still too little. Therefore, at STEP 350 Message 14 is voiced: "Close, but blow harder." Then the routine proceeds to STEP 353.

If STEP 349 determines that MAXVAL exceeds hex 96, STEP 351 determines if MAXVAL is greater than hex C8 (1.96 liters). If it is, the student's attempt lies in Range E or F and is too strong. Therefore, STEP 352 voices Message 17: Good, but blow less forcefully. Then the routine proceeds to STEP 353.

The acceptable range for the student's efforts is 1.47-1.96 liters, Range D. Efforts in Range A will be below threshold. Efforts in Ranges B, C, E, and F all lead to STEP 353, which increments a counter variable BADC (bad count). Because the student has produced a bad ventilation, STEP 353 also penalizes him by setting to zero a counter variable GOODC (good count) used to count any acceptable ventilations in Range D.

STEP 354 checks variable BADC to see if 5 bad ventilations have accumulated. If BADC is currently less than 5, the routine jumps to STEP 361. But if 5 bad ventilations have accumulated, the student needs a fresh start with special instructor coaching. STEP 355 clears counter variables BADC1 and BADC and STEP 356 voices Message 13: "Please ask the instructor for help." Then the routine proceeds to STEP 361.

If STEP 351 determines that MAXVAL is not greater than C8, then the student's attempt lies in Range D and is acceptable. STEP 358 increments counter variable GOODC (good count). Because the student has now produced a good ventilation, STEP 358 also erases his past learning errors by setting to zero the "bad count" counter variable BADC. If STEP 359 determines that two good ventilations have not yet been produced, the student is praised at STEP 360, "Excellent", but the routine proceeds for more practice to STEP 361.

STEP 361 uses Message 12 to direct the student to "Try it again." STEP 362 sets a bit called SAIDIT to 1 to indicate that a maximum of the student's effort has already been determined and a critique voiced.

The microcomputer's response may be so prompt that the student is still in the process of blowing into the manikin, though the peak of his effort has passed. Therefore, STEP 363 calls the A/D subroutine to read and convert the current instantaneous value of the ventilation sensor, and set the variable ADVAL equal to it. Because the SAIDIT bit is set, the A/D subroutine will just give the instantaneous reading ADVAL and not try to determine a maximum from a series of readings as before. The A/D subroutine also clears the SAIDIT bit to 0.

STEP 364 determines if ADVAL exceeds the threshold TH1. If it does, the student is not through blowing and the routine loops to STEP 362 to again set the SAIDIT bit and take another instantaneous reading.

When ADVAL falls below the threshold TH1, the student is finished and ready to make a fresh effort. The routine loops back to STEP 340 to find the maximum of the student's fresh effort via the A/D subroutine.

Eventually the student will achieve two good ventilations in a row. The counter variable GOODC will become 2 and at STEP 359 the routine will go to STEPS 366 and 367, which respectively voice Messages 16 and 18: Perfect, now try giving two slow breaths. Blow into the manikin's mouth with complete refilling of your lungs after each breath.

STEP 368 calls the A/D subroutine to get the peak or maximum value of the first of the student's two efforts and store it as the variable MAXVAL. The ranges above threshold, B, C, D, E, and F, have the respective maximum hex values 7C, 95, C8, and E1. These are respectively stored under the variable names ABLE, BAKER, CHUCK, and DOG (STEP 369), and then the scoring subroutine SCORC1 is run. Depending on the value of MAXVAL, SCORC1 will voice one of the following brief words of criticism or praise, and increment one of the following counter variables:

TABLE 3

| MAXVAL (HEX) | RANGE | OUTPUT OF SCORC1 | | INCREMENT COUNTER |
| --- | --- | --- | --- | --- |
| | | BRIEF CRIT. | MESS. # | |
| 32-7C | B | MORE! | 19 | CBIN1 |
| 7D-95 | C | MORE | 20 | CBIN1 |
| 96-C8 | D | GREAT | 21 | CBIN2 |
| C9-E1 | E | LESS | 22 | CBIN3 |
| E2-FF | F | LESS! | 23 | CBIN3 |

The single short word of praise or criticism MORE!, MORE, GREAT, LESS, OR LESS!, is an important feature of the invention since it can be voiced in the brief time between the student's efforts, yet gives immediate aural feedback, including inflection, tone, volume, and urgency. This feedback technique is also used in the chest compression rhythm sequence, where typically there is only about 0.6 seconds between chest compressions. Because such short words can be voiced in about 0.3 seconds, they are effective in giving immediate feedback and advice after each compression.

Then STEPS 371 AND 372 wait for the student to finish the current attempt in same manner as STEPS 362 and 363 described above. A counter CTR is incremented (STEP 375) to keep track of the number of attempts by the student. If the count in counter CTR is not equal to or greater than two, the routine loops back to STEP 368 for the second of the student's two efforts.

When counter CTR shows that two efforts have been processed in this manner, the counter CTR is cleared (STEP 378). The number of good ventilations will be in CBIN2. If this number is not two, STEP 380 voices Message 24: Try giving two breaths again. Then STEP 384 clears the counter variables CBIN1, CBIN2, and CBIN3 and the routine loops back to STEP 368 for the student to try again.

If at STEP 379 the number in CBIN2 was two (both ventilations good), the student is ready to try the next teaching routine. The lamp 57a for the Carotid Pulse routine is blinked (STEP 381), and STEP 382 voices Message 25: 'Excellent ventilation. If you feel confident, practice checking the carotid pulse. If you don't, try giving two breaths again.'

STEP 383 stops the blinking of the Carotid Pulse lamp, and STEP 384 clears the counter variables CBIN1, CBIN2, and CBIN3. Although the routine loops back to STEP 368 for the student to try again, he can break out of the ventilation routine by pressing the selection button for another routine, such as the following.

Carotid Pulse Teaching Routine

Figure 14:
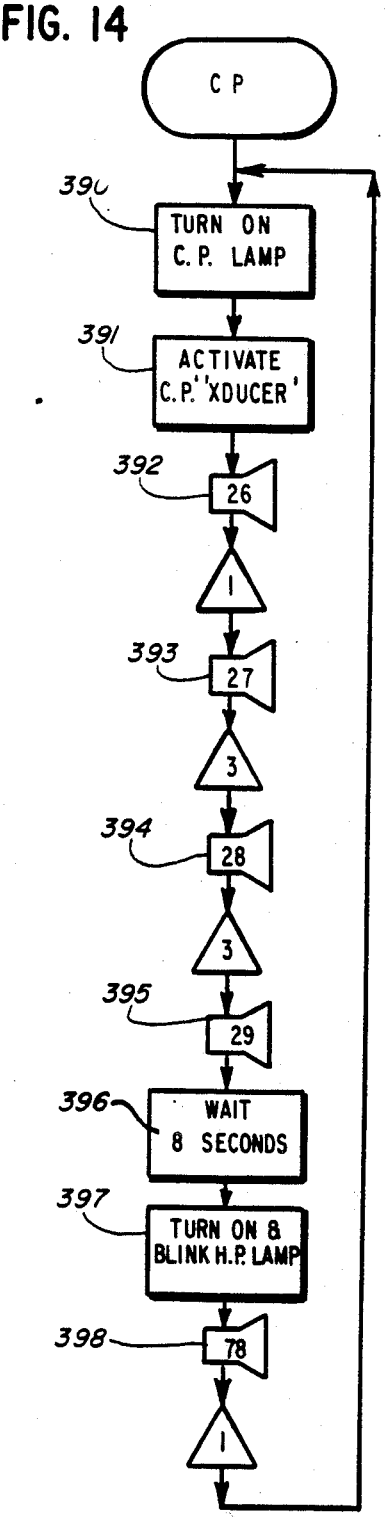
FIG. 14 is a flow chart for an embodiment of the Carotid Pulse Teaching Routine incorporated in the Control Program of FIG. 11.

FIG. 14 shows a flow chart of an embodiment of the Carotid Pulse Teaching Routine for practice in locating and feeling the carotid pulse simulated in the manikin's neck by the carotid pulse transducer 91. STEPS 390 and 391 turn on the Carotid Pulse lamp 57a and activate the carotid pulse transducer 91. STEPS 392-395 respectively voice Messages 26-29, with the following result: Carotid pulse. The carotid pulse is located on either side of the Adam's Apple. Gently, try to sense it with the index and middle fingers of one hand. Maintain the head tilt with the palm of your other hand. If you have difficulty checking it, please ask the instructor for help.

STEP 396 provides about an eight-second pause for the student to carry out the procedure. The Hand Position lamp 56a is blinked (STEP 397) and Message 78 is voiced (STEP 398): Now practice the correct hand position. Although the routine loops back to STEP 390 for the student to try again, he can break out of the carotid pulse routine by pressing the selection button for another routine, such as the Hand Position routine.

Hand Placement Teaching Routine

Figure 15:
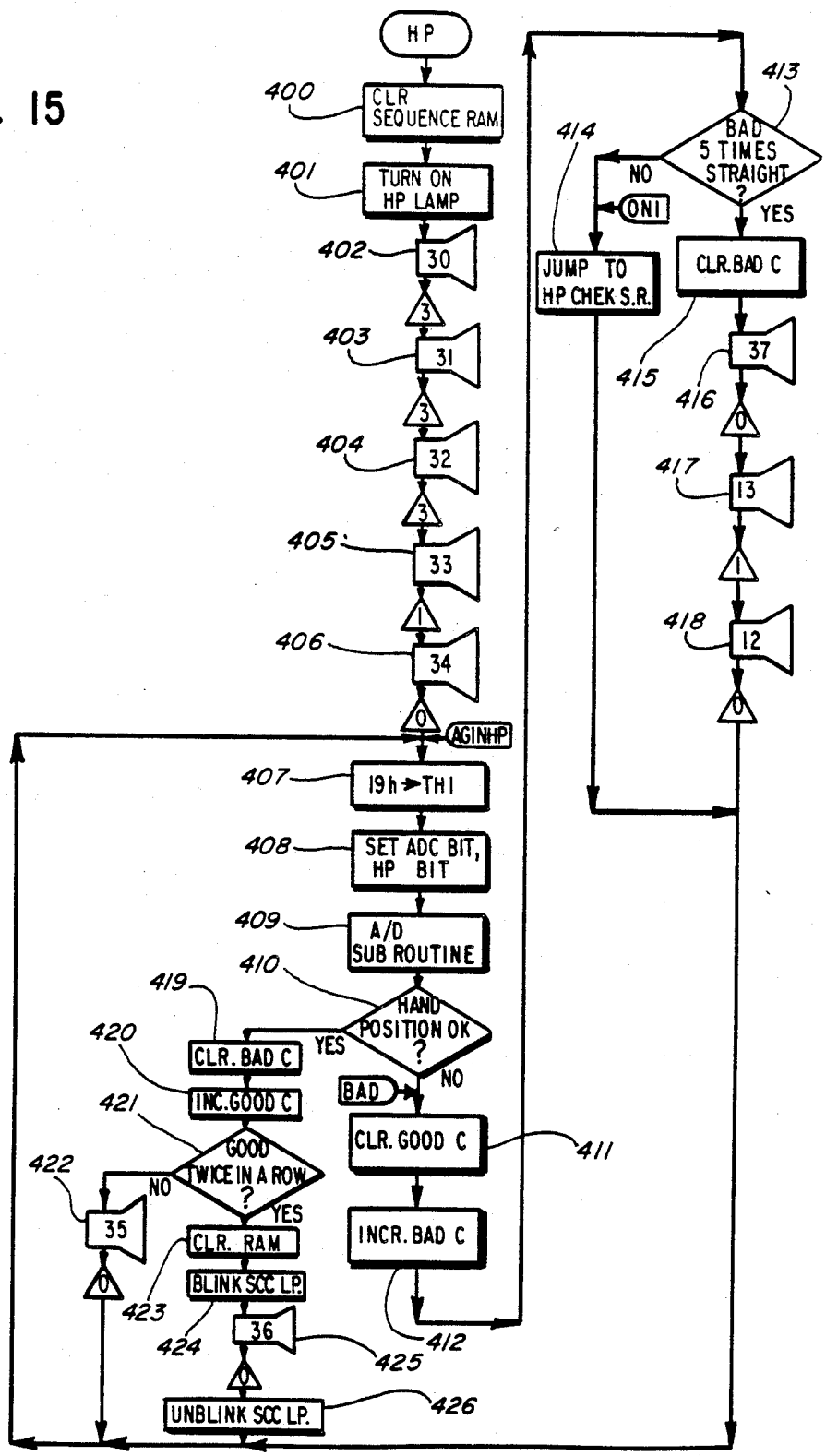
FIG. 15 is a flow chart for an embodiment of the Hand Placement Teaching Routine incorporated in the Control Program of FIG. 11.

FIG. 15 shows a flow chart of an embodiment of the Hand Placement Teaching Routine for practicing the correct position for the hand in chest compressions to restore circulation. The routine has the student reposition his hand and press down as many times as are needed to learn the correct location, giving feedback and advice each time. When the student can push down on the chest in the correct position twice in succession, he is encouraged to proceed to the Single Chest Compression routine.

The Hand Placement routine begins by clearing the microcomputer's RAM 82 (STEP 400) and turning on the Hand Placement lamp 56a. Then STEPS 402–406 voice Messages 30–34 which instruct the student how to position his hand on the manikin's chest as follows:

Hand position. Feel for the border of the manikin's ribs with the index and middle fingers of the hand closest to the manikin's waist. Move them upward along the rib cage until you reach the ribcage notch. Place the heel of your other hand just above the two fingers. Then place the first hand on top of it. Keep your fingers off the manikin's ribs. Push down, I will check your hand position.

STEP 407 sets a threshold value TH1 which a given chest compression sensor measurement must reach in order to exceed a background noise level before being recognized as an effort by the student. This threshold TH1 for practicing hand placement is set to hex 19 (decimal 25), corresponding to about 0.25 inches, which is about half the threshold used in practicing chest compressions, hex 32, corresponding to about 0.49 inches.

A bit called the ADC bit is set to 1 (STEP 408) to indicate that the A/D Conversion utility subroutine should read in analog data from the chest compression sensor 116 rather than the ventilation sensor 118. STEP 408 also sets a bit called the HP bit to 1 to indicate to the upcoming A/D utility subroutine that only hand position data (HPSTORE) is needed, not a maximum of chest compression (MAXVAL).

Then the A/D subroutine is called (STEP 409). When the A/D subroutine lights READY lamp 65, the student places his hand on the manikin's chest and tries pushing down. The A/D subroutine quickly takes a series of sample readings until the threshold TH1 has been exceeded. When the threshold has been passed, the A/D subroutine reads the positions of normally closed hand position switches S3, S6, S9, S12 of FIGS. 4 and 8C. Then it adjusts the four least significant bits HS0, HS1, HS2 and HS3 of a byte in memory called HPSTORE in accordance with the switch positions:
If S3 is CLOSED, HS0=1; otherwise HS0=0
If S6 is CLOSED, HS1=1; otherwise HS1=0
If S12 is CLOSED, HS2=1; otherwise HS2=0
If S9 is CLOSED, HS3=1; otherwise HS3=0

If STEP 410 determines that any of bits HS0, HS1, HS2, HS3 is a 0, the student's hand position is not acceptable. The routine goes to STEP 411 where the counter variable GOODC is cleared to zero and the counter variable BADC is incremented by 1 (STEP 412). If STEP 413 determines that there have not yet been five successive bad attempts at hand position (BADC is less than five), STEP 414 calls the utility subroutine Hand Position Check. The Hand Position Check subroutine immediately voices one or more corrective messages about the student's hand position:

| HPSTORE BIT | (CAUSED BY) | MESS # | MESSAGE |
| --- | --- | --- | --- |
| HS0 = 0 | (S3 OPEN) | 40 | Off Center |
| HS1 = 0 | (S6 OPEN) | 39 | Too Low! |
| HS2 = 0 | (S12 OPEN) | 38 | Too High |
| HS3 = 0 | (S9 OPEN) | 40 | Off Center |

Then STEP 414 voices Message 41: 'Release compression! Try it again!' The routine then loops back to STEP 407 so the student can try positioning his hand again.

If at STEP 413 it is found that five bad attempts have accumulated in BADC, the student needs a fresh start with special instructor coaching. Counter variable BADC1 is cleared and Messages 37, 13, and 12 are voiced as follows:
Your hand position is not quite right. Please ask the instructor for help. Try it again.

Then the routine loops back to STEP 407 so the student can try positioning his hand again.

When STEP 410 determines that the student's hand position is acceptable, the routine goes to STEP 419 where the student's past mistakes are erased by clearing the counter variable BADC to zero. Then the counter variable GOODC is incremented by 1 (STEP 420). If STEP 421 determines that there have not yet been two successive acceptable attempts at hand position (GOODC is less than two), STEP 422 voices Message 35: 'Fine. Remove and reset your hands. Try it again.' Then the routine loops back to STEP 407 for a new try.

When STEP 421 determines that the student has achieved two successive acceptable hand position efforts (GOODC=2), STEP 423 clears the RAM. The Single Chest Compression lamp 59a is blinked (STEP 424) and Message 36 is voiced as follows (STEP 425):
Good, if you feel confident, you should now practice a single chest compression. If you don't, try it again.

STEP 426 then turns off the blinking Single Chest Compression lamp. Although the routine next loops back to STEP 407 for the student to try again, he can break out of the hand placement routine by pressing the selection button for another routine, such as the Single Chest Compression routine.

6. Single Chest Compression Routine

Figure 16:
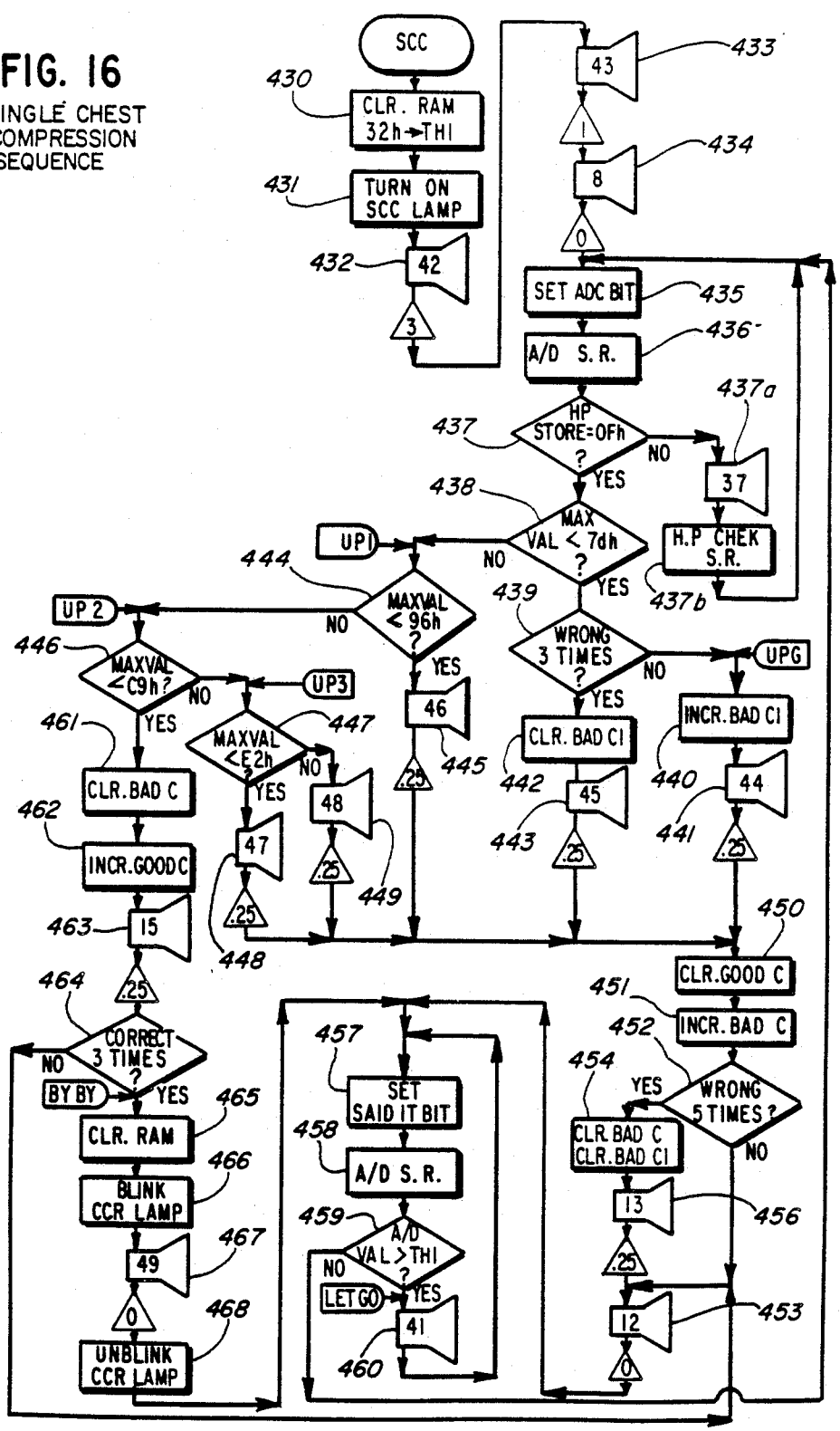
FIG. 16 is a flow chart for an embodiment of the Single Chest Compression Teaching Routine incorporated in the Control Program of FIG. 11.

FIG. 16 shows a flow chart of an embodiment of the Single Chest Compression (SCC) Teaching Routine for practice of chest compressions to restore circulation during cardiac arrest. The routine has the student practice doing single chest compressions of the correct depth, giving feedback and advice each time until the student can do three successive correct single compressions.

The SCC routine begins (STEP 430) by clearing the microcomputer's RAM 82 and setting a noise reducing threshold value TH1 which a given chest compression sensor measurement must reach before being recognized as an effort by the student. The threshold TH1 is set to hex 32, which corresponds to threshold of 0.49 inches. Values in Range A of FIG. 9B and Table 2 are below the threshold. To show which routine is running, the CHEST COMPRESSION DEPTH lamp 59a of FIG. 2 is turned on (STEP 431).

STEPS 432–434 voice Messages 42, 43, and 8 as follows, as instructions to the student for beginning chest compressions:

Single chest compression. Take the correct hand position, your elbows locked and your shoulders directly over the sternum. The chest should be compressed smoothly one and one half to two inches. Try a single chest compression. I will tell you how you did.

The ADC bit is set to 1 (STEP 435) to indicate that the A/D Conversion utility subroutine should read in analog data from the chest compression sensor 116 rather than the ventilation sensor 118. Then the A/D subroutine is called (STEP 436). The A/D subroutine turns on READY lamp 65 on control panel 53 (FIG. 2) so the student will know the system is ready to monitor his efforts.

When the student places his hands on the manikin's chest and tries a chest compression, the A/D subroutine quickly takes a series of sample readings of the chest compression sensor 116. When the student's chest compression has reached its maximum, the A/D subroutine sets a variable called MAXVAL equal to the A/D converted maximum value.

As described in connection with the Hand Placement Routine, the A/D subroutine also reads hand position switches S3, S6, S9, S12 and stores a hand position report in the four least significant bits of the byte in memory called HPSTORE. The A/D subroutine then returns control to the SCC routine.

If the student's hand position is correct, the four least significant bits of HPSTORE will all be 1's. Because the (unused) four most-significant bits of HPSTORE are kept 0, HPSTORE will be hex 0F (binary 00001111) when the hand position is correct. If STEP 437 determines that HPSTORE is not hex 0F, STEP 437a voices Message 37: 'Your hand position is not quite right.' Then STEP 437b calls the Hand Position Check subroutine. As described in connection with the Hand Placement Routine, the Hand Position Check (HPCHEK) subroutine verbally reports what is wrong with the student's hand position (Too High, Too Low!, or Off Center). After the HPCHEK routine winds up with Message 41 ('Release compression! Try it again!'), the SCC routine loops back to STEP 435 for the student to try again until he gets the correct hand position.

When STEP 437 finds that HPSTORE is hex 0F, the hand position is correct and STEP 438 determines if MAXVAL is less than hex 7d (1.23 inches). If it is, the student's compression lies in Range B and is too shallow. If STEP 439 determines (from checking counting variable BADC1) that it is not yet the third time the student's attempt was in Range B, the counting variable BADC1 is incremented by 1 (STEP 440) and coaching Message 44 is voiced: 'Too shallow.' Then the routine proceeds to STEP 450.

On the other hand, if the student's attempts repeatedly fall in Range B, BADC1 will soon be incremented to a 2. In this case, after the third such shallow attempt STEP 439 switches control to STEP 442. Because of the successive errors, the student needs a fresh start and some advice. The variable BADC1 is cleared to zero and STEP 443 voices Message 45:

Too shallow! Be sure that you're pressing straight down, your elbows locked and your shoulders directly over the sternum.

Then the routine proceeds to STEP 450.

Should STEP 438 find that MAXVAL is equal to or greater than hex 7D, STEP 444 then determines if MAXVAL is less than hex 96. If it is, the student's effort lies in Range C (1.23–1.46 inches), still too little. Therefore, at STEP 445 Message 46 is voiced: 'Close, but too shallow.' Then the routine proceeds to STEP 450.

If instead STEP 444 determines that MAXVAL is equal to or greater than hex 96, STEP 446 determines if MAXVAL is less than hex C9 (1.96 liters). If it isn't, STEP 447 determines if MAXVAL is less than hex E2. If it is, the student's compression lies in Range E and is too deep. Therefore, STEP 448 voices Message 47: 'Close but too deep.' Then the routine proceeds to STEP 450.

But if STEP 447 determines that MAXVAL is greater than or equal to hex E2, the student's compression lies in Range F and is much too deep. Therefore, STEP 449 voices Message 48: 'Too deep.' Then the routine proceeds to STEP 450.

The acceptable range for chest compressions is 1.47–1.96 inches, Range D. Efforts in Range A will be below threshold. Efforts in Ranges B, C, E, and F all lead to STEPS 450 and 451, which clear counter variable GOODC (good count) and increment counter variable BADC (bad count).

STEP 452 checks variable BADC to see if 5 bad compressions have accumulated. If BADC is currently less than 5, the routine jumps to STEP 453. But if 5 bad ventilations have accumulated, the student needs a fresh start with special instructor coaching. STEP 454 clears counter variables BADC1 and BADC and STEP 456 voices Message 13: 'Please ask the instructor for help.' Then the routine proceeds to STEP 453.

If STEP 446 determines that MAXVAL is less than hex C9, then the student's attempt lies in Range D and is acceptable. Because the student has now produced a good compression, STEP 461 also erases his past learning errors by setting to zero the 'bad count' counter variable BADC. STEP 462 increments counter variable GOODC (good count), and the student is praised at STEP 463: Excellent.

If STEP 464 determines from counter variable GOODC that three good ventilations have not yet been produced, the routine proceeds to STEP 453 for more practice.

STEP 453 uses Message 12 to direct the student to 'Try it again.' Then STEP 457 sets a bit called SAIDIT to 1 to indicate that a maximum of the student's effort has already been determined and a critique voiced.

The microcomputer's response may be so prompt that the student is still in the process of pressing on the manikin's chest, though the maximum of the compression has already occurred. Therefore, STEP 458 calls the A/D subroutine to read and convert the current instantaneous value of the compression sensor, and set the variable ADVAL equal to it. Because the SAIDIT bit is set, the A/D subroutine will just give the instantaneous reading ADVAL and not try to determine a maximum from a series of readings as before. The A/D subroutine also clears the SAIDIT bit to 0.

STEP 459 determines if ADVAL exceeds the threshold TH1. If it does, the student is not through compressing the manikin's chest. STEP 460 voices Message 41, 'Release compression! Try it again!'. Then the routine loops to STEP 457 to again set the SAIDIT bit and take another instantaneous reading.

When ADVAL falls below the threshold TH1 at STEP 459, the student is finished and ready to make a fresh effort. The routine loops back to STEP 435 to have the student do another compression.

Eventually the student will achieve three good compressions in a row. The counter variable GOODC will become 3 and at STEP 464 the routine will go to STEPS 465 and 466, which respectively clear the microcomputer's RAM 82 and blink the CHEST COMPRESSION RHYTHM lamp 60a. STEP 467 voices message 49: 'Great, now practice chest compression rhythm or try it again.' STEP 468 stops the blinking of lamp 60a.

The routine then proceeds to STEP 457 in case the student is still pressing on the manikin's chest. After clearing STEP 459, the routine loops back to STEP 435 for the student to try again But the student can break out of the SCC routine by pressing the selection button for another routine, such as the Chest Compression Rhythm routine.

7. Chest Compression Rhythm Routine

Figure 17B:
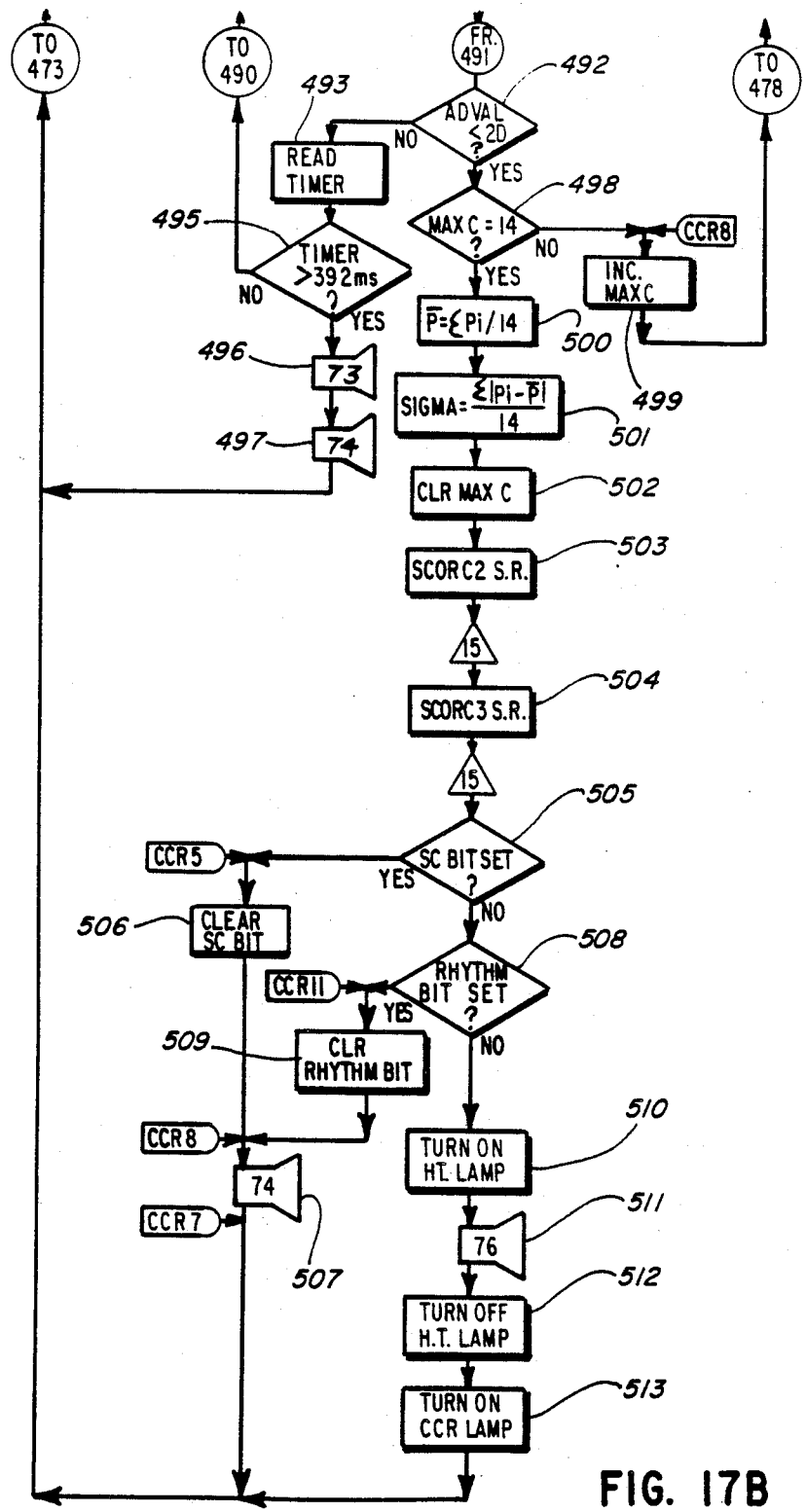
FIG. 17 is a flow chart for an embodiment of the Chest Compression Rhythm Teaching Routine incorporated in the Control Program of FIG. 11.

FIG. 17 shows a flow chart of an embodiment of the Chest Compression Rhythm (CCR) teaching routine for practicing fifteen successive chest compressions at about 80–100 compressions per minute. The student is forced to restart if during any compression he uses an incorrect hand position or fails to come all the way up from the compression. As each chest compression passes its maximum, the student gets a word of praise or criticism. As soon as the fifteen compressions are completed the student receives a voice summary of how many compressions were excellent, too shallow, or too deep. The student is also told if the rhythm of his fifteen chest compressions was excellent, too fast or slow, or irregular.

The CCR routine begins (STEP 470) by turning on the CHEST COMPRESSION RHYTHM lamp 60a. STEPS 471, 472 voice Messages 50 and 8 as follows, as instructions to the student for beginning this routine: Chest compression rhythm. Give fifteen chest compressions smoothly, no bouncing, using a one and two and three and four . . . - to fifteen cadence. Come all the way up between compressions. I will tell you how you did.

The microcomputer's RAM 82 is cleared (STEP 473) and the threshold value for the chest compressions TH1 is set to hex 32, corresponding to 0.49 inches (STEP 474). Values in Range A of FIG. 9B will below the threshold.

The ranges above threshold, B, C, D, E, and F, have the respective maximum hex values 7C, 95, C8, and E1. These are respectively stored under the variable names ABLE, BAKER, CHUCK, and DOG (STEP 475), and then the ADC bit is set to 1 (STEP 476) to indicate that the A/D Conversion utility subroutine should read in data from the chest compression sensor 116. Then to tag the first chest compression, a bit 1STCC is set to 1 (STEP 477), and STEP 478 calls the A/D subroutine to get data on the student's hand position in HPSTORE and the maximum of the converted compression in MAXVAL.

As in the Single Chest Compression (SCC) routine (see STEP 437), the correct hand position is confirmed if HPSTORE is hex 0F (STEP 479). If it is not, a counter variable MAXC used to count which compression is currently being processed is cleared to 0 (STEP 480), and STEP 481 voices Message 37: 'Your hand position is not quite right.' STEP 482 calls the Hand Position Check (HPCHEK) utility subroutine 400, which verbally reports what is wrong with the student's hand position. After the HPCHEK routine winds up with Message 41 ('Release compression! Try it again!'), the CCR routine loops back to STEP 473 for the student to begin again with the correct hand position.

If the hand position is correct at STEP 479, an eight-bit timer mechanism on board microcomputer 80a is configured or initialized (STEP 483) so when started it will use the 125 HZ timer clock input at the microcomputer's TIMER input from frequency divider 113 of FIG. 4. In FIG. 4 the timer mechanism in microcomputer 80a is represented by its eight bit timer data register TDR, which can be read for the current value of the on board timer.

If the 1STCC bit is set (STEP 484), the current compression is the first of the 15 and STEPS 486 and 487 can be omitted. The 1STCC bit is cleared, and the routine proceeds to STEP 488, where the microcomputer's timer is started. Just a few steps earlier, the A/D subroutine called by STEP 478 will have returned immediately after finding a maximum in the depth of the student's compression. Microcomputer 80a is running at 8.0 MHz. Therefore, to a good approximation in determining the period of the compression, STEP 488 starts the microcomputer's timer immediately after a compression has reached its maximum depth.

In a manner similar to that used in the Ventilation routine (see STEP 370), STEP 489 now calls scoring subroutine SCORC1 to immediately comment on the value of MAXVAL (compression maximum) obtained by the A/D subroutine at STEP 478:

TABLE 4

| | | OUTPUT OF SCORC1 | | | |
|---|---|---|---|---|---|
| MAX-VAL (HEX) | RANGE | CHEST COMPRES-SION (INCHES) | BRIEF CRIT. | MESS. # | COUNT-ER INCRE-MENTED |
| 32–7C | B | 0.49–1.22 | MORE! | 19 | CBIN1 |
| 7D–95 | C | 1.23–1.46 | MORE | 20 | CBIN1 |
| 96–C8 | D | 1.47–1.96 | GREAT | 21 | CBIN2 |
| C9–E1 | E | 1.97–2.21 | LESS | 22 | CBIN3 |
| E2–FF | F | 2.22–2.50 | LESS! | 23 | CBIN3 |

As can be seen in Table 4, the SCORC1 subroutine also accumulates the number of compressions that are too shallow, acceptable, and too deep by incrementing corresponding counter variables CBIN1, CBIN2, and CBIN3.

The student will now be occupied in trying to maintain a steady rhythm for 15 successive chest compressions at a rate that may leave as little as 0.6 second for each compression. It is an important feature of the invention that the one word brief criticisms of Table 4 can be voiced in about 0.3 second, enabling feedback by a prestored natural human voice having inflection, tone, volume and urgency.

As in the Single Chest Compression routine (see STEPS 457–460), the student must come up all the way from each compression. STEPS 490–493, 495–497 verify this using the A/D subroutine. The SAIDIT bit is set to 1 (STEP 490), enabling the A/D subroutine to determine ADVAL, the current instantaneous value of the compression sensor (STEP 491). The A/D subroutine also clears the SAIDIT bit to 0. STEP 492 determines if ADVAL is less than a Release Level of hex 2D (decimal 45), slightly less compression than the Threshold TH1. If ADVAL is not less than the Release Level, the timer data register TDR is read (STEP 493) to determine the interval since the last maximum of compression.

Table 5 is a Timer Conversion Table for the timer data register TDR. The microcomputer's timer receives a 125 kHz timer clock signal (clock pulse every 8 ms). This decrements the timer data register TDR every 8 ms from an initial value of hex 00 (interpreted as decimal 256). For example, it takes 49 clocks to decrement register TDR from hex 00 to hex CF, measuring an interval of 392 ms (49×8 ms).

TABLE 5
TIMER CONVERSION TABLE

| TIMER DATA REGISTER (HEX) | TIMER READING (DEC) | ELAPSED 8 MS CLOCKS | ELAPSED TIME MS | COMPRESSION FREQUENCY PER/MIN |
|---|---|---|---|---|
| 00 | 256 | 0 | 0 | — |
| FF | 255 | 1 | 8 | — |
| CF | 207 | 49 | 392 | 153 |
| B5 | 181 | 75 | 600 | 100 |
| A2 | 162 | 94 | 752 | 79.8 |
| 83 | 131 | 125 | 1000 | 60 |
| 40 | 64 | 192 | 1536 | 39 |
| 00 | 0 | 256 | 2048 | 29 |

At the lowest acceptable rate, 80 compressions/minute, the peak-to-peak period for one compression will be 750 ms, and the time from a maximum to a minimum will be a half period of 375 ms. STEP 495 uses a reading of timer data register TDR (STEP 493) to determine if the interval since the last maximum of compression is greater than a Cutoff of 392 ms (a Cutoff interval slightly more than the 375 ms half period associated with 80 compressions per minute.) This is equivalent to asking, 'Is register TDR less than hex CF?'

If more than 392 ms have not elapsed since the last compression maximum, the routine loops back to STEP 490 for a new reading of ADVAL. If STEP 495 determines that more than 392 ms have elapsed, the student is not coming up all the way in releasing the compression. STEPS 496, 497 then voice Messages 73 and 74: Come all the way up between compressions. Give fifteen chest compressions again.

Then the CCR routine loops back to STEP 473 for the student to restart the series of fifteen compressions.

If the student is coming up all the way between chest compressions, at STEP 492 ADVAL will become less than hex 2D before 392 ms have elapsed. The routine will proceed to STEP 498, which determines, from the value of a counter variable MAXC, if there have been 14 previous compressions. If there haven't, the counter variable MAXC is incremented at STEP 499, and the routine loops back to STEP 478 so the student's next compression can be processed.

After the first compression, bit 1STCC will not be set to 1 when STEP 484 is reached. Therefore, STEP 486 will read register TDR to determine a compression period in accordance with Table 5. For example, at STEP 486 the TDR register might be found to have been decremented to hex B5. In such case, 600 ms would have elapsed between the previous maximum (when the timer was started) and the current maximum. In a series of fifteen compressions, the peak-to-peak period can be measured fourteen times in this way. Each measured compression period is stored in memory in one of 14 bytes called PERIOD(MAXC), where MAXC is an index integer incremented from 1 to 14 as the routine repeatedly passes through STEP 499 for successive compressions.

As each successive measured period is determined at STEP 486, a running total is calculated at STEP 487 in the form:

Let TOTAL=TOTAL+PERIOD (MAXC)

where the expression on the right is evaluated first and then replaces TOTAL, and MAXC is the previously mentioned integer index variable indicating the most recently measured period.

Eventually, index variable MAXC will be incremented to 14. Then the next (15th) time a compression maximum is measured and the routine executes STEP 498, the CCR routine will proceed to step 500. Beginning at this step some elementary statistics are calculated for the 14 measured compression periods, here denoted as $P_i$. A simple mean of P is computed (STEP 500) as follows:

$$\bar{P} = \frac{\sum_{i=1}^{14} P_i}{14} \quad \text{(Eq. 1)}$$

In fact, $\bar{P}$ can be calculated by dividing the variable TOTAL, which already equals the sum of the fourteen measured periods, by fourteen.

Then STEP 501 makes a computation, somewhat like that used for calculating the standard deviation, to determine SIGMA, an estimate of how much the 14 individual measured periods differ from the average:

$$\text{SIGMA} = \frac{\sum_{i=1}^{14} |P_i - \bar{P}|}{14} \quad \text{(Eq. 2)}$$

Equation 2 is introduced for computational simplicity, since only an estimate of the standard deviation is needed. However, if desired, microcomputer 80a can be suitably instructed to calculate the precise mathematical standard deviation, since it has sufficient computational power. As a housekeeping measure, the index variable MAXC is set to zero (STEP 502).

As mentioned in connection with STEP 489, during the fifteen compressions the SCORC1 subroutine accumulates the number of compressions that are too shallow, acceptable, and too deep by incrementing corresponding counter variables CBIN1, CBIN2, and CBIN3 (Table 4). Now STEP 503 calls the SCORC2 utility subroutine to select from among Messages 51-66 to report the results as follows:

(CBIN1) were too shallow.
(CBIN2) were great.
(CBIN3) were too deep.

where the appropriate number stored in the counter variable is voiced. Of course, if the number for any category is zero, there is no message about it.

Similarly, at STEP 504 the SCORC3 subroutine is called to report on the speed and evenness of the student's compression rhythm, based on the computations of STEPS 500 and 501. In fact, since the readings of the timer data register TDR at STEP 486 have a linear relationship to the compression period, the computations of Equations 1 and 2 (which are also linear) can be done on the TDR readings themselves. These can then be interpreted by Table 6:

TABLE 6

| INTERPRETATION OF AVERAGE TDR READING | | |
|---|---|---|
| AVERAGE PERIOD (MS) | AVERAGE TDR READING | WORDS USED IN MESSAGE |
| <600 | >B5 | Rhythm is too fast. |
| 600-752 | B5-A2 | Excellent rhythm. |
| >752 | <A2 | Rhythm is too slow. |

When Equation 2 is applied to the TDR readings themselves, if the resulting SIGMA is equal to or greater than hex 5 the compression rhythm is voiced as 'Irregular'. Since the timer clock pulses are spaced 8 ms apart, this corresponds to a SIGMA equal to or greater than 40 ms.

As can be seen from Messages 67-72, SCORC3 reports about the rhythm speed and regularity together in a single appropriately selected combined message. A typical message used by SCORC3 that combines the speed and rhythm comments is Message 67:
Rhythm is too fast and irregular.

SCORC2 sets a bit called SCBIT to 1 if CBIN2<10, i.e., less than 10 of the 15 compressions have the proper depth. If STEP 505 finds this bit is 1, the bit is cleared to 0 (STEP 506) and STEP 507 voices Message 74: 'Give fifteen chest compressions again.' Then the routine loops back to STEP 473 for the student to redo the fifteen compressions. Similarly, SCORC3 sets a bit called RHYTHM BIT to 1 if the rhythm is slow, fast, or irregular. If STEP 508 finds this bit is 1 the bit is cleared to 0 (STEP 509) and the routine proceeds to STEP 507.

If neither the SCBIT nor the RHYTHM BIT is set, the student's performance is satisfactory. The routine proceeds from STEP 508 to turn on the HEIMLICH THRUST lamp 61a (STEP 510), and STEP 511 voices Message 76:
If you feel confident, practice clearing the airway. If you don't, give fifteen chest compressions again.

Then the HEIMLICH THRUST lamp is turned off (STEP 512), and the CHEST COMPRESSION RHYTHM lamp is turned back on (STEP 513). Although the routine loops back to STEP 473 for the student to try again, he can break out of the CCR routine by pressing the selection button for another routine, such as the Heimlich Thrust routine.

8. Heimlich Thrust Teaching Routine

Figure 18:
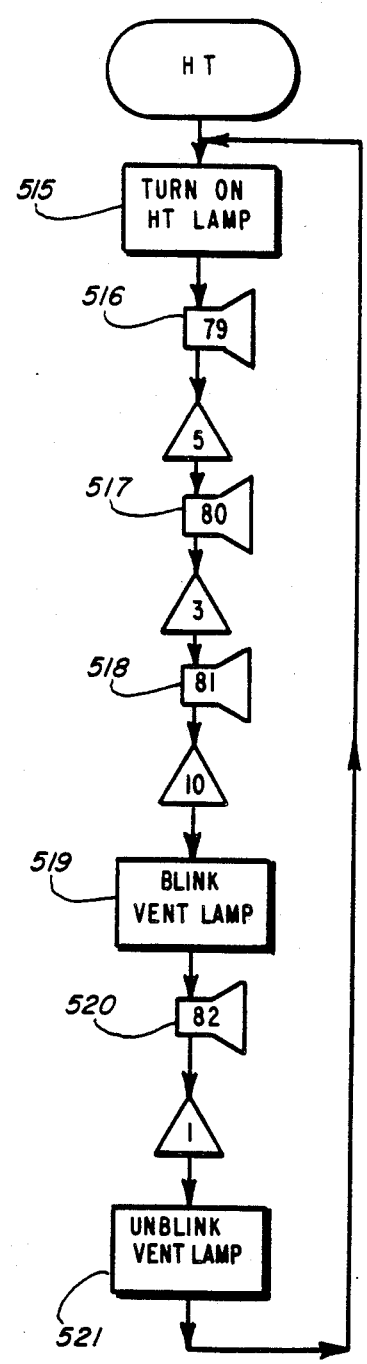
FIG. 18 is a flow chart for an embodiment of the Heimlich Thrust Teaching Routine incorporated in the Control Program of FIG. 11.

FIG. 18 shows a flow chart of an embodiment of the Heimlich Thrust Teaching Routine for practice in clearing the manikin's airway of an obstruction, such as a piece of food. No measurements are made in this routine, but the student practices abdominal (Heimlich) thrusts on the manikin. However, if desired, the manikin can be fitted with suitable sensors for this routine, such as strain gages just above the navel. If such sensors are installed, the teaching routine can be elaborated to use and report the sensor data in a manner similar to the other teaching routines.

STEPS 515-518 respectively turn on the Heimlich Thrust lamp 61a and voice Messages 79-81 :
Clearing the airway. Kneel astride the manikin's thighs.
 Place the heel of one hand slightly above the navel.
 Place the other hand on top of it. Press into the abdomen with quick upward thrusts. Each thrust should be distinct and delivered with the intent of clearing the airway. Do it ten times.
Then the AIRWAY VENTILATION lamp 58a is blinked (STEP 519) and STEP 520 voices Message 82: 'When you feel confident, practice ventilating the manikin.' Then the blinking of the AIRWAY VENTILATION lamp is halted. Although the routine loops back to STEP 515 for the student to try abdominal thrusts again, he can break out of the Heimlich Thrust routine by pressing the selection button for another routine, such as the Airway Ventilation routine.

9. Storage of Messages and Phrases a. Message Coding and Storage

Figure 19:
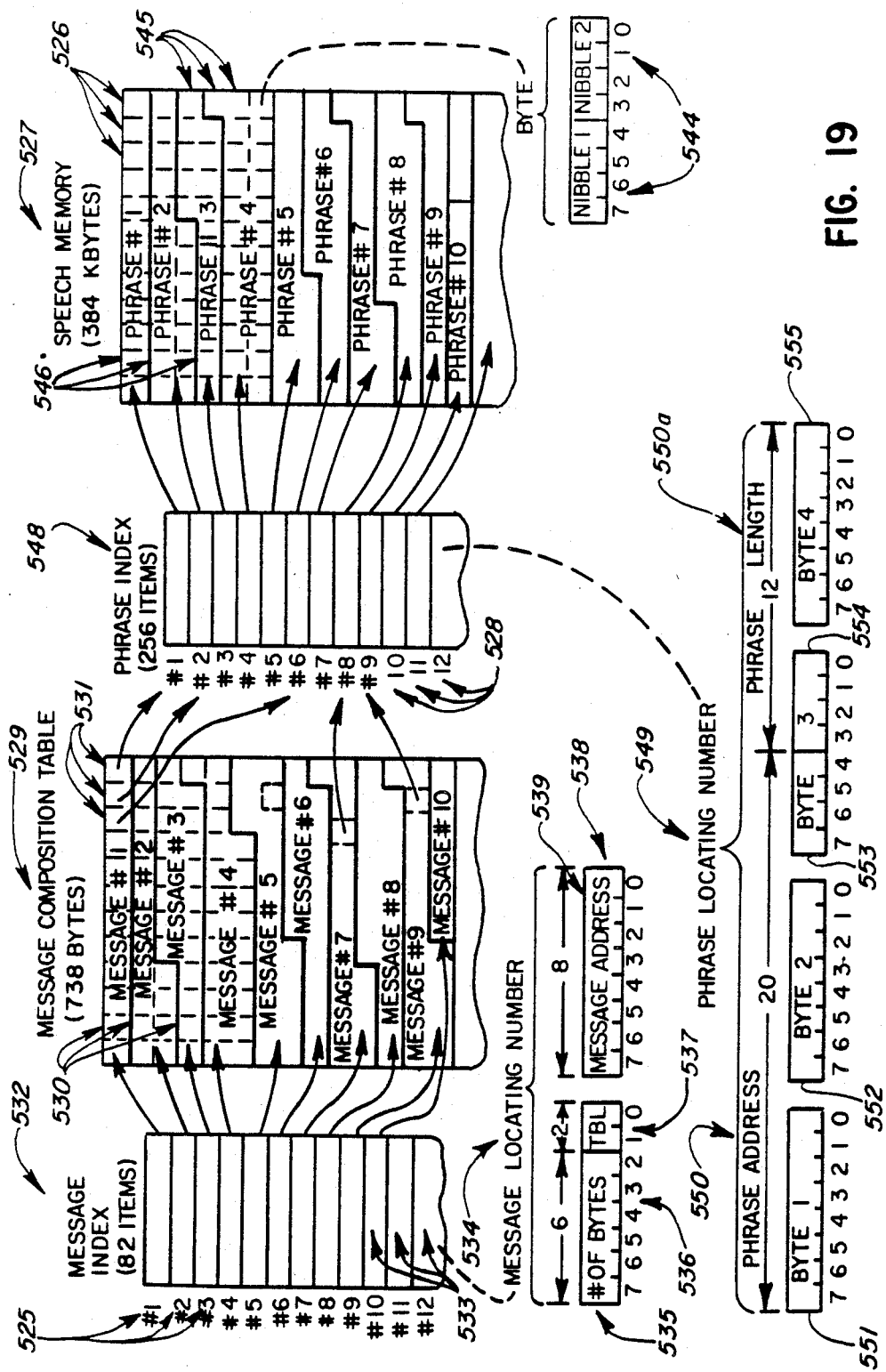
FIG. 19 is map showing how voice messages and phrases are stored in memory.
Figure 20:
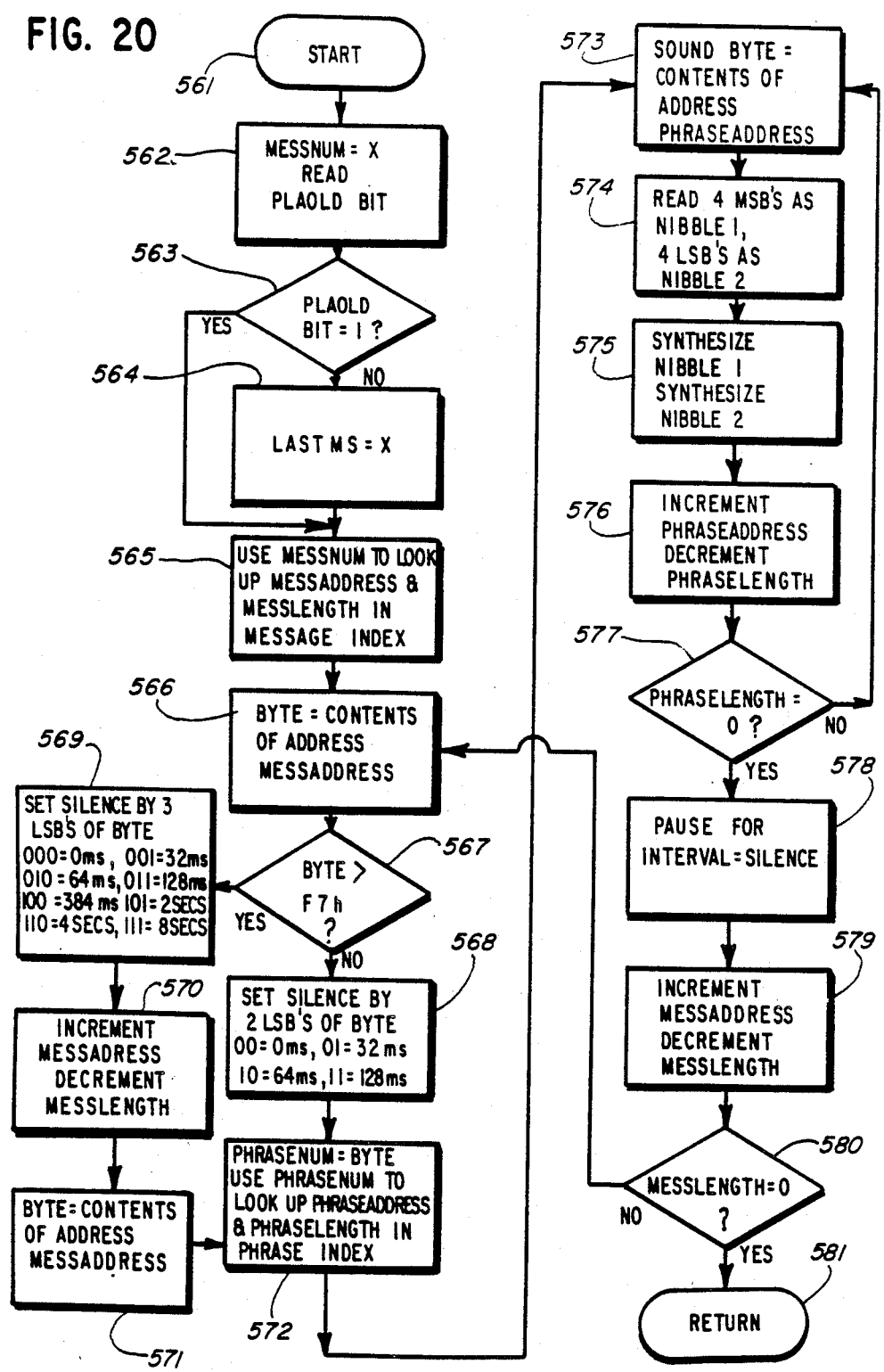
FIG. 20 is a flow chart for an embodiment of the Message Subroutine incorporated in the Control Program of FIG. 11.

FIG. 19 shows how voice messages and phrases are stored in memory. Each voice message is identified by a sequential message identification number 525 (Message Nos. 1, 2, 3, . . . ,). A message 530 is composed of a series of short (less than 1 second) preselected phrases 546. The preselected phrases 546 are stored in a speech memory 527, external to the microcomputer unit. The speech memory can be implemented by a read only memory (ROM), such as a ROM semiconductor memory. In practice, a programmable read only memory (PROM) that can be programmed once, or an erasable programmable read only memory (EPROM) can be used for the speech memory.

By 'phrase' is meant not the conventional linguistic unit, but any short sequence of sound which is, from an engineering point of view, convenient for encoding and storage. Thus, as used here a 'phrase' may be a part of a word, a whole word, a linguistic phrase, or any portion of a linguistic phrase. Examples of such phrases are 'PINCH_OFF', 'THE_MANIKIN'S', 'NOSTRIL', and 'S'.

For message coding purposes, each phrase is uniquely identified by an 8-bit (1 byte) phrase identification number 528. An eight-bit identification number provides for up to 256 different preselected phrases.

A message is specified by the particular series of 1-byte phrase identification numbers designating the phrases making up the message. For example, the message 'PRESS DOWN' is composed of the phrases 'PRESS' and 'DOWN'. If the phrase identification number for 'PRESS' is 01110101 and the phrase identification number for 'DOWN' is 11111001, the message 'PRESS DOWN' is specified by the two bytes 01110101, 11111001 .

A Message Composition Table 529, in which the messages 530 are sequentially stored, is provided in memory to hold the make-up of each message in terms of a series of 1-byte entries 531, each a phrase identification number, designating the phrases in the appropriate sequence to compose the message. The present embodiment provides for about 82 different messages, though this number can be increased if desired. Although the messages are of various different lengths, the capacity of the Message Composition Table 529 is sufficient to allow for an overall average length of up to 9 phrases per message. Since it takes 1 byte (8 bits) to identify each phrase in a message, the entire Message Composition Table can be only 738 (82×9) bytes long, enabling the Table to be stored in the onboard EPROM memory of the microcomputer unit.

A Message Index 532 is provided in memory to help locate the bytes composing a particular message stored in the Message Composition Table. The Message Index has 82 entries, corresponding to the 82 possible message identification numbers. The index entry 533 corresponding to a particular message number is a 16-bit (2 byte) message locating number 534. Thus, the entire Message Index is only 164 (82×2) bytes long, enabling it also to be stored in the onboard EPROM memory of the microcomputer unit.

In the first byte 535 of the message locating number, the six most significant bits (MSB's) 536 are read as a binary number indicating how many 1-byte phrase identification numbers compose the message. The six bits provide for messages composed of as many as $2^6=64$ preselected phrases.

To facilitate addressing with an 8-bit address bus, the 768 bytes of the Message Composition Table are subdivided into three smaller 256 byte Tables L, M, and N. The two least significant bits (LSB's) 537 of the first byte are read as a code indicating which of the Tables L, M, or N holds the message in question. The two-bit code is 00=L Table, 01=M Table, 10=N Table.

The second byte 538 of the message locating number is read as an 8-bit number 539 indicating the address location, in the appropriate table L, M, or N, where the first phrase identification number (a 1 byte number) of the message is stored. The remaining phrase identification numbers of the message follow in sequence.

In sum, given a message number, the Message Index gives the location and length of that message as encoded in the Message Composition Table. At the specified location in the Message Composition Table is a series of phrase identification numbers, each entry one byte long, which compose the message.

b. Phrase Coding and Storage

As each phrase is identified by a 1-byte phrase identification number, this provides for up to 256 preselected phrases. Each phrase is composed of a series of audio nibbles 544 stored in the speech memory. A nibble is a binary number of four bits, i.e. one-half byte long. It is convenient to use a speech memory that stores a byte (an 8-bit number) at each address. Therefore, the audio nibbles are grouped in pairs so that they can be stored and retrieved in bytes 545.

These audio nibbles are obtained by sampling an actual voice input signal for the phrase concerned and converting the sampled values to digital nibbles for later reproduction by a suitable speech synthesizer. Special equipment (not shown) for coding speech as binary numbers is commercially available, such as the SAS-1 Real-Voice Memory Processor sold by OKI Semiconductor of Santa Clara, California. In effect, such a speech encoder makes it possible to digitally prerecord sounds as nibbles, storing them in the speech memory for later reproduction.

The speech encoder of the OKI Processor (not shown) uses adaptive differential pulse-code modulation (ADPCM), a very efficient method of analog-to-digital conversion of a sampled analog signal. The OKI processor can be configured to take 8,000 samples per second of an input real voice audio signal. This permits the frequency of the sampled and stored voice audio to be as high as 4,000 Hz, i.e. half the sampling frequency, which is adequate to provide very natural-sounding voice reproduction.

In response to each sample, the speech encoder of the OKI Processor outputs a 4-bit (1 nibble) binary number. Since a nibble is one half byte, the sampling produces 4,000 bytes each second for storage in the speech memory 527. In other words, it takes 4,000 bytes stored in the speech memory to digitally store a phrase 1 second long.

In dealing with computer memories, it is common to work with a unit of measure equal to 1024 bytes, called a 'kilobyte' or 'KB' of memory. Therefore, a one-second phrase, when sampled, takes up about 4 KB (4 kilobytes) in the speech memory.

There are about 256 phrases 546 of different lengths stored in the speech memory 527. Although any one phrase can be as long as 4 KB (1 second), overall average duration is no more than 1.5 KB (0.375 seconds) per phrase. Therefore, the speech memory need have a capacity of only 384 KB (256×1.5K) to hold all the sampled phrases, which is a total of about 96 seconds of voice sounds.

Such a speech memory can be conveniently and inexpensively implemented from EPROM chips that have a 16-bit address input and that store 64 KB each. Such EPROM chips are commercially available from Fujitsu (its memory chip 27C512) and others. The 16-bit address line provides for $2^{16}$ (64×1024) different address locations, each of which can store 1 byte of information. Six of these commercially available 64 KB EPROM chips will provide the 384 KB speech memory capacity needed to store all the sampled phrases.

To play back the recording of a particular phrase, the audio nibbles making up the phrase are read from the speech memory and inputted one at a time to a digital-to-analog (D/A) speech synthesizer matched to reproduce the phrase as an audio signal. For this purpose, a matching ADPCM speech synthesizer integrated circuit chip is available from Oki Semiconductor: speech synthesizer chip MSM 5218.

The output of the speech synthesizer chip is passed through a low-pass filter having a high-frequency cutoff of about 4 kHz, amplified, and passed to an output speaker. For example, the low-pass filter can be conveniently implemented from a digital low-pass filter integrated circuit chip, such as National Semiconductor's MF6CN100, and the audio amplifier can also be any suitable amplifier circuit, such as National Semiconductor's LM388N2 integrated circuit amplifier chip.

A Phrase Index 548 is provided in memory to help locate the nibbles composing a particular phrase stored in the speech memory. The Phrase Index has 256 entries, corresponding to the 256 possible phrase identification numbers. The index entry corresponding to a particular phrase number is a 32-bit phrase locating number 549 occupying four successive bytes. Thus, the entire Phrase Index is only 1024 (256×4) bytes long, enabling it to be stored in the onboard EPROM memory of the microcomputer unit.

The 32-bit (4 bytes long) phrase-locating number 549 has two parts, a 20-bit phrase address 550 and a 12-bit phrase-length indicator 550a. In other words, given an 8-bit phrase identification number, of value 0–255, the Phrase Index gives the location and length of that phrase as stored in the speech memory. At the specified location in the speech memory is a series of bytes that contain the nibbles which store the phrase.

The 20-bit phrase address enables 550 up to $2^{20}$ addresses, a million memory addresses, to be individually specified. This is more than adequate to address any of the 384 kilobytes of speech memory. To facilitate addressing memory chips having a 16-bit address bus, the first 16 bits of the phrase address are interpreted as a 16-bit address in one of the six 64-KB speech memory chips. These 16 bits of the phrase address are found in the first two bytes 551, 552 of the phrase-locating number.

The remaining 4 bits of the phrase address are interpreted as a binary number, starting with zero, indicating the particular chip (0, 1, 2, 3, 4, 5) in which the phrase is stored. In the embodiment described, these 4 bits are the four least significant bits 553 of the third byte of the phrase-locating number.

Even though the phrases are stored as audio nibbles, the 12-bit phrase-length indicator 550a specifies the phrase length in bytes. That is, the phrase length is specified to the nearest byte. A 12-bit phrase-length indicator number enables a phrase as long as 4 KB ($2^{12}$ bytes) to be specified. In the embodiment described, the four most significant of these 12 bits are the four most significant bits 554 of the third byte of the phrase-locating number. The eight least significant of these 12 bits are the fourth byte 555 of the phrase-locating number.

In sum, given an 8-bit phrase-identification number, of decimal value 0–255, the Phrase Index gives the location and length of that phrase as stored in the speech memory. At the specified location in the speech memory is a series of bytes that contain the nibbles from which the phrase can be reproduced by the speech synthesizer chip.

c. Pause Coding

In natural speech, there are pauses (silence periods) between adjacent syllables or words that must be accounted for in coding the messages and the phrases used to form the messages. For example, the word 'WELCOME' may be pronounced with a short pause, on the order of 60 milliseconds, between the syllables 'WEL' and 'COME'. IF such a 60-millisecond pause is inputted to a speech encoder outputting 4 kilobytes of speech code per second, the 0.060 second pause would cause the output of 240 bytes of 'pause' (no sound) nibbles for storage in the speech memory. This would be a very inefficient way to encode a 'no sound' interval or pause. Therefore, three more efficient ways are used to encode pauses in the stored messages and phrases.

First, the 8-bit phrase-identification numbers are assigned to phrases in a way that indicates if there is normally a pause after the phrase. The two least significant bits (LSB's) of the 8-bit phrase-identification number are used as a code to assign the phrase to one of four subdivisions of the Phrase Index, called the S, T, U and V Tables. This 2-bit code is as follows:

| 2 LSB's | Table | Pause |
|---|---|---|
| 00 | S | none |
| 01 | T | 32 ms |
| 10 | U | 64 ms |
| 11 | V | 128 ms |

First, when processing a phrase for reproduction, the two least significant bits of the phrase-identification number can be used as a control code to turn off the speech synthesizer for a suitable number of milliseconds after the phrase is synthesized, creating the desired pause.

The remaining six bits (six most significant bits) of the phrase-identification number enable up to 64 different phrases to be specified in each table.

Second, eight of the 8-bit phrase identification numbers are not used to identify phrases, and instead these eight numbers are reserved as pause-control codes. When a pause-control code is inserted in the message composition table before a phrase-identification number, the control code modifies the pause interval following the phrase represented by the phrase-identification number. For example, if a phrase-identification number belongs to Table S above, normally there is no pause after the phrase it identifies. But if a control code (e.g., 11111001) is inserted before the phrase-identification number, a 32-ms pause specified by the control code follows the phrase.

The pause control codes are inserted as needed before phrases when messages are encoded in the Message Composition Table. As the phrase-identification numbers composing a message are read out of the Message Composition Table, each control code is detected by the message processor, which then effectuates the necessary pause after the phrase which follows the control code.

The following phrase-identification numbers are reserved as pause control codes:

| Binary Number | Hex Value | Decimal Value | Pause Length |
|---|---|---|---|
| 11111000 | F8 | 248 | none |
| 11111001 | F9 | 249 | 32 ms |
| 11111010 | FA | 250 | 64 ms |
| 11111011 | FB | 251 | 128 ms |
| 11111100 | FC | 252 | 384 ms |
| 11111101 | FD | 253 | 2 sec |
| 11111110 | FE | 254 | 4 sec |
| 11111111 | FF | 255 | 8 sec |

The third method of adding or increasing pauses is to insert wait instructions in the control programs for the microcomputer unit before or after instructions calling for message reproduction. For example, a program instruction might call for Message #5, 'PINCH OFF THE MANIKIN'S NOSTRILS,' to be voiced by the speech synthesizer. Suppose a pause is needed after this message to allow the student time to respond before voicing the next coaching message. The pause can be introduced by following the instruction to voice Message #5 with an instruction to wait a predetermined number of milliseconds or seconds.

The wait instruction can be a suitable WAIT subroutine called whenever a pause is needed, provided that for the subroutine's reference a number indicating the desired length of the pause is first inserted in a suitably accessible register or memory location before calling the WAIT subroutine.

In sum, the identification number of a phrase indicates if the speech synthesizer should normally add a preselected pause after reproducing the phrase. In addition, some of the bytes composing a message in the Message Composition Table may be pause control codes for modifying the normal pause of the phrase that follows them. Pauses may also be introduced between messages by inserting a WAIT instruction in the microcomputer unit's control program.

10. Message Subroutine a. General Flow

This subroutine plays a message whose message number is held in the X register when the subroutine is called. If the PLAOLD bit has been set, the message is a repeat of the previously played message.

To play a message, first, the preselected phrases which compose the message are determined. Then for each phrase, the encoded audio nibbles of the phrase prestored in the speech memory must be read out as input to the speech synthesizer chip. The synthesizer chip uses this input to reproduce each phrase as an audio output signal for the amplifier and speaker.

To determine which phrases compose the message, the message number in the X register is used to compute an input address in the Message Index. The entry at that address gives the starting location add length of the message as encoded in the Message Composition Table. At the specified location in the Message Composition Table is a series of phrase identification numbers and pause control codes, each one byte long, which are read out of memory to indicate which phrases compose the message.

As each byte of a message is read out of the Message Composition Table, it is examined to determine whether it is a pause-control code or a phrase-identification number. If it is a pause-control code, the normal pause of the phrase that follows, represented by its phrase identification number, will be accordingly altered.

If the byte read out of the Message Composition Table is a phrase-identification number, it is used to determine where the audio nibbles of that phrase are located in the speech memory. It is also used to determine if after reproducing the phrase the speech synthesizer should normally be turned off for a specified interval to add a preselected pause.

An input address to the Phrase Index is computed from the phrase-identification number. The entry at that input address gives the starting address and number of bytes in the speech memory of the series of bytes which store the phrase. Each byte in the speech memory holds an adjacent two of the audio nibbles which compose the phrase. After each byte of the phrase is read out from the speech memory, the two nibbles it contains are inputted in message order, one at a time, to the speech synthesizer.

b. Detailed Operation

The subroutine is entered (STEP 561) with the number of the message to be played held in the X register. This number is read and stored as MESSNUM (STEP 562). Next a bit called PLAOLD BIT (play old message) is read (STEP 562) and checked (STEP 563). If the PLAOLD BIT is 0, the message is a new message. To enable the message to be repeated at a subsequent time (by pressing the REPEAT MESSAGE button on the control panel of FIG. 2), the variable LASTMS (last message) is set equal to the message number in the X register (STEP 564), and the routine proceeds to STEP 565.

If at STEP 563 the PLAOLD BIT is found to be 1, the message is a repeat of the last message, and there is no need to update the variable LASTMS, so there is a jump to STEP 565.

In either case, based on the message number MESSNUM a table look-up is performed using the Message Index to obtain the starting message address MESSADDRESS and the number of bytes (or message length MESSLENGTH) of the message as stored in the Message Composition Table (STEP 565).

The first byte of the message is then read from the Message Composition Table at the address MESSADDRESS and the variable BYTE is set to that value (STEP 566). As stored in the Message Composition Table, each byte of a message is either a phrase identification number or a pause control code.

If at STEP 567 the number BYTE is determined to not be greater than the hex number F7 (decimal 247), it is interpreted as a phrase-identification number. The two least significant bits of BYTE are then read (STEP 568) as a binary code indicating the pause length SILENCE that should follow the phrase in question when reproduced by the speech synthesizer:

| CODE | SILENCE |
|------|---------|
| 00   | 0 ms    |
| 01   | 32 ms   |
| 10   | 64 ms   |
| 11   | 128 ms  |

The routine then proceeds to STEP 572.

On the other hand, if at STEP 567 the number BYTE is determined to be greater than hex F7, it is interpreted as a pause-control code. The three least significant bits of BYTE are then read (STEP 569) as a binary code indicating the pause length SILENCE that should follow the phrase whose identification number comes next after the pause-control code:

| CODE | SILENCE | CODE | SILENCE |
|------|---------|------|---------|
| 000  | 0 ms    | 100  | 384 ms  |
| 001  | 32 ms   | 101  | 2 secs  |
| 010  | 64 ms   | 110  | 4 secs  |
| 011  | 128 ms  | 111  | 8 secs  |

If the number BYTE is a control code, then in order to indicate the address of the phrase identification number which follows it, the variable MESSADDRESS is incremented (STEP 570). At the same time, the variable MESSLENGTH, which keeps track of the number of bytes remaining in the coded message, is decremented.

The next byte of the message is then read from the Message Composition Table using the current value of MESSADDRESS as the address. The variable BYTE is set to that value (STEP 571), and the routine proceeds to STEP 572.

At STEP 572 the current value of BYTE is interpreted as a phrase identification number, and the variable PHRASENUM (phrase identification number) is set equal to it. Based on the phrase identification number PHRASENUM a table look-up is performed using the Phrase Index to obtain the starting phrase address PHRASEADDRESS and the number of bytes (or phrase length PHRASELENGTH) of the message as stored in the Speech Memory.

The first byte of the phrase is then read from the Speech Memory at the address PHRASEADDRESS and the variable SOUNDBYTE is set to that value (STEP 573). As the sounds of a phrase are coded in nibbles, the 4 most significant bits of SOUNDBYTE are read as NIBBLE1 and the 4 least significant bits as NIBBLE2 (STEP 574. Each of these nibbles is fed in turn to the sound synthesizer and the sampled sound corresponding to each nibble synthesized as the manikin's voice output for the speaker 66 (STEP 575).

The variable PHRASEADDRESS is incremented (STEP 576). At the same time, the variable PHRASELENGTH, which keeps track of the number of bytes remaining in the coded phrase, is decremented. If the current value of PHRASELENGTH is not yet zero, the routine jumps back to STEP 573 to read and synthesize the next coded byte of the phrase (STEP 577).

If, on the other hand, PHRASELENGTH has been reduced to zero by STEP 577, all coded bytes of the phrase have been read and synthesized. The routine moves to STEP 578 and a sound pause or interval of silence is maintained for the interval specified by variable SILENCE.

To move on to the next byte of the message in the MESSAGE COMPOSITION TABLE, the variable MESSADDRESS is incremented (STEP 579). At the same time, the variable MESSLENGTH, which keeps track of the number of bytes remaining in the coded message, is decremented (STEP 580).

If the current value of MESSLENGTH is not yet zero, the routine jumps back to STEP 566 to read and synthesize the next coded byte of the message. On the other hand, if MESSLENGTH has been reduced to zero by STEP 580, the subroutine has completed playing the MESSAGE indicated in the X register, and a RETURN to the routine which called it is executed at STEP 581.

11. A/D Conversion Subroutine

Figure 21A:
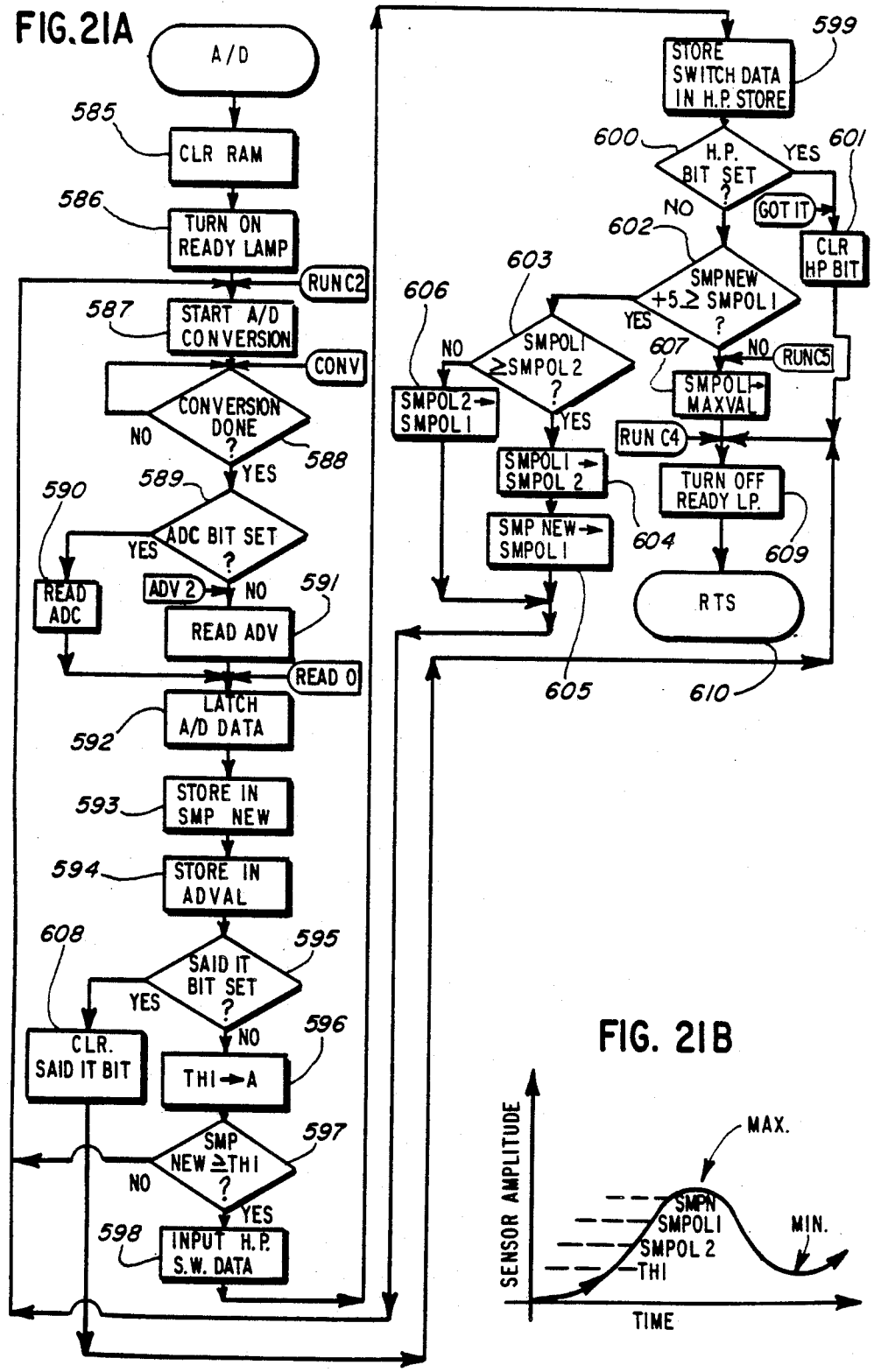
FIG. 21A is a flow chart for an embodiment of the A/D Conversion Subroutine incorporated in the Control Program of FIG. 11.

FIG. 21A shows a flow chart for an embodiment of the A/D Conversion Subroutine. This combined utility subroutine reads and converts to digital format the analog signals from the ventilation sensor 118 or chest compression sensor 116, as well as reading data from hand position switches S3, S6, S9, and S12. Before calling the subroutine, a variable TH1 is set to a noise threshold for the sensor signal.

The states of three reference bits, ADC, SAIDIT, and HPBIT at the time the subroutine is called determine which functions the A/D subroutine performs. The ADC bit determines whether chest compression sensor data (ADC=1) or ventilation sensor data (ADC=0) is read and converted. The SAIDIT bit determines whether the current instantaneous value (SAIDIT=1) or a local maximum (SAIDIT=0) of the sensor signal is to be provided. The instantaneous value is returned in a variable ADVAL (A/D value) and the local maximum is returned in a variable MAXVAL (maximum value). If HPBIT is 1, hand position switch data is to be returned, in a variable HPSTORE (hand position store).

The microcomputer's RAM 82 (STEP 585) is cleared, and READY lamp 65 on control panel 53 of FIG. 2 is turned on (STEP 586) to prompt the student to begin his efforts. The conversion is begun (STEP 587), and continued until data from both the ventilation sensor 118 and chest compression sensor 116 is separately converted by respective A/D converters 119 and 117 (STEP 588). If the ADC bit is a 1, the output of compression A/D converter 117 is read in to microcomputer 80a (STEPS 589, 590); otherwise, the output of ventilation A/D converter 119 is read in (STEP 591).

The sensor data which has been read in is latched (STEP 592), and then stored in two variables, SMPNEW (sample new) (STEP 593) and ADVAL (STEP 594). If the SAIDIT bit is not set, the threshold value TH1 is loaded in the accumulator (STEP 596) and compared with SMPNEW (STEP 597). If SMPNEW (the student's sampled effort) does not yet equal or exceed TH1, the subroutine loops back to STEP 587 to begin another conversion.

Figure 21B:
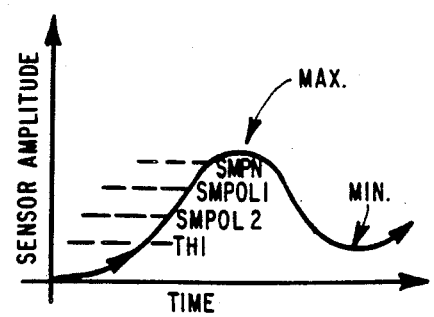
FIG. 21B is a graph of a typical sensor signal as a function of time.

FIG. 21B shows a typical sensor signal as a function of time in the case where SMPNEW exceeds the threshold TH1. Although the microcomputer actually deals with a quantized digitally converted sensor signal, since the quantization is relatively fine (256 levels), this detail is not shown in FIG. 21B.

When SMPNEW is equal to or greater than TH1 at STEP 597, data from the hand position switches S3, S6, S9, S12 is read in (STEP 598), and stored (STEP 599) in the four least significant bits HSO, HS1, HS2, HS4 of an eight-bit variable HPSTORE as follows:
If S3 is CLOSED, HSO=1; otherwise HS0=0
If S6 is CLOSED, HS1=1; otherwise HS1=0
If S12 is CLOSED, HS2=1; otherwise HS2=0
If S9 is CLOSED, HS3=1; otherwise HS3=0
The four most significant bits of HPSTORE remain zero.

If HPBIT is 1 at STEP 600, the routine calling the A/D subroutine only needs the current value of HPSTORE. Therefore, READY lamp 65 is turned off (STEP 609), and a Return from Subroutine RTS is executed.

If neither the SAIDIT bit (STEP 595) nor HPBIT (STEP 600) is a 1, the routine calling the A/D subroutine wants it to monitor SMPNEW until the sensor signal reaches a maximum. As shown in FIG. 21B, to keep track of changes in SMPNEW on successive readings, the A/D subroutine uses two variables SMPOL1 (sample old 1) and SMPOL2 (sample old 2); initially these two variables are cleared to zero.

To avoid false detection of a maximum, a little hysteresis or delay is built into the test (STEP 602) for whether SMPNEW has begun to fall compared its value on prior readings (SMPOL1). Thus, at STEP 602 only if the quantity SMPNEW + 5 is not equal to or greater than SMPOL1 will the subroutine jump to STEP 607, in effect ending the search for a maximum.

Before the sensor signal maximum is reached, at STEP 602 SMPNEW + 5 will be equal to or greater than SMPOL1. Then at STEP 602, usually SMPOL1 will be equal to or greater than SMPOL2. If it is, the value of SMPOL1 is stored in SMPOL2 (STEP 604) and SMPOL1 itself updated to equal SMPNEW (STEP 605). The subroutine then loops back to STEP 587 to read the sensor for a fresh value of SMPNEW.

STEP 602 determines when the peak has been reached. Just past the peak of the sensor, SMPNEW + 5 can be greater than SMPOL1 and at the same time SMPOL2 can be greater than SMPOL1. This will cause the flow to move from 602 to 603. In order to freeze SMPOL1 to the maximum value of the waveform, so that a maximum value is used for SMPOL1 the next time the comparison of STEP 602 is made, SMPOL1 is made equal to SMPOL2 at 606.

Eventually, at STEP 602 SMPNEW + 5 will not exceed SMPOL1; i.e. SMPNEW will be at least 5 less than SMPOL1. This is taken as an indication that a maximum of the ventilation or compression has just been passed. The output variable MAXVAL is set equal to SMPOL1 (STEP 607). The READY lamp is turned off (STEP 609), and a Return from Subroutine RTS is executed (STEP 610).

If STEP 595 finds the SAIDIT bit set, the routine that called the A/D subroutine has already reported (said it) the maximum of a ventilation or compression to the student. The calling routine is only monitoring the sensor to determine when it falls back to the threshold value, indicating completion of the current ventilation or compression. Therefore, the calling routine only wants the instantaneous sensor value ADVAL of STEP 594. STEP 608 clears the SAIDIT bit to 0, and the subroutine jumps to ending STEPS 609, 610.

12. Hand Position Check Subroutine

Figure 22A:
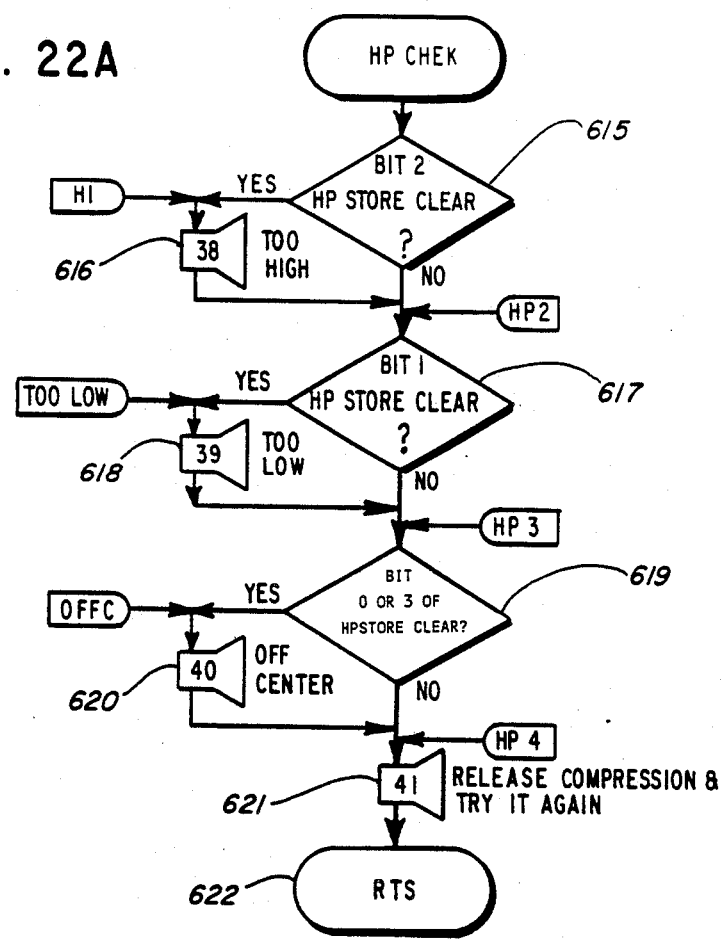
FIG. 22A is a flow chart for an embodiment of the Hand Position Check Subroutine incorporated in the Control Program of FIG. 11.
Figure 22B:
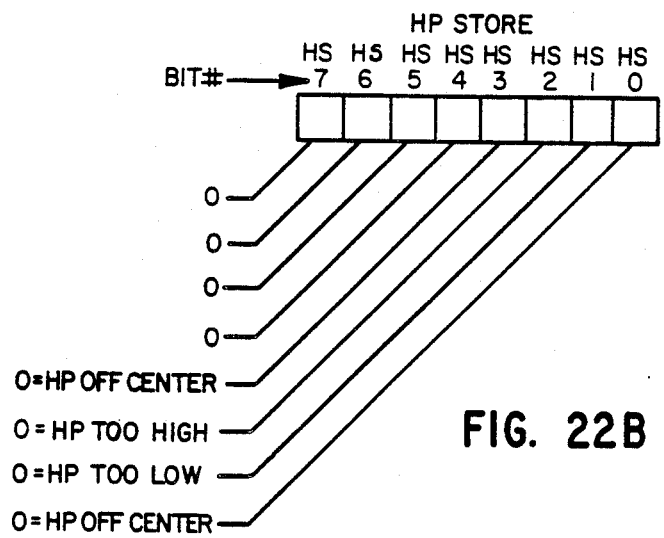
FIG. 22B is a map of the bits in a variable word HPSTORE used therein.

FIG. 22A shows a flow chart for an embodiment of the Hand Position Check Subroutine. This subroutine is called by the Hand Placement Routine, Single Chest Compression Routine, or the Chest Compression Rhythm Routine whenever they detect that the student's hand position is incorrect. FIG. 22B shows the bits of variable HPSTORE as set by the A/D Conversion subroutine from the hand position switches S3, S6, S9, S12. For a correct hand position HPSTORE is hex 0F. A "0" in any of the four least significant bits of HPSTORE indicates a corresponding open hand position switch because of incorrect hand position. If the calling routine determines that HPSTORE is not hex 0F, it promptly calls the Hand Position Check subroutine to voice a message telling the student what is wrong with his hand position.

If STEP 615 detects that bit 2 of HPSTORE is 0, STEP 616 voices Message 38: 'Too high.' Next, when STEP 617 detects that bit 1 of HPSTORE is 0, STEP 618 voices Message 39: 'Too low.' Finally, if STEP 619 detects that bit 0 or 3 of HPSTORE is 0, STEP 620 voices Message 40: 'Off center.' STEP 621 concludes the subroutine with Message 41: 'Release compression! Try it again!' A Return from Subroutine is then executed at STEP 622.

13. Scoring Subroutines a. SCORC1 Subroutine

Figure 23:
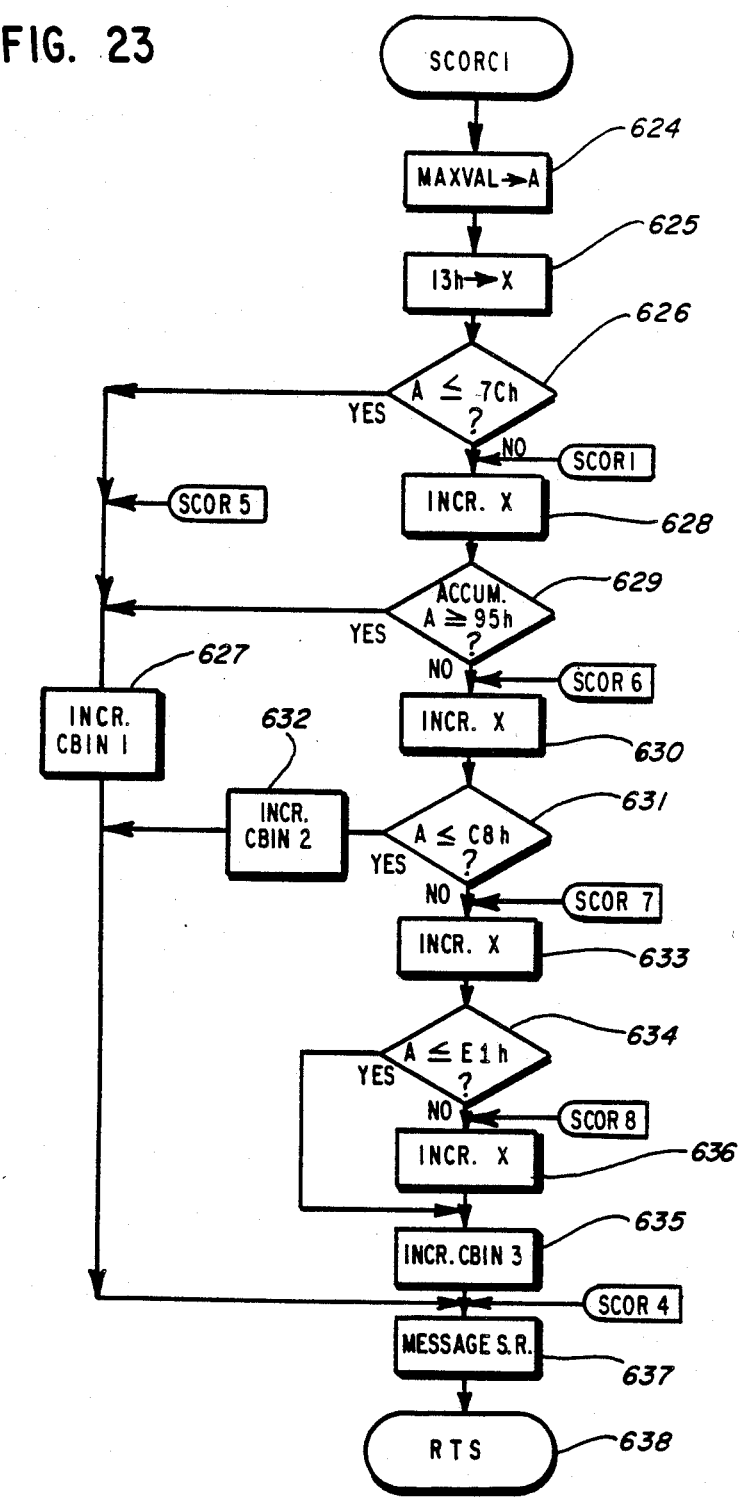
FIG. 23 is a flow chart for an embodiment of the scoring subroutine SCORC1 incorporated in the Control Program of FIG. 11.

FIG. 23 shows a flow chart of an embodiment of the SCORC1 subroutine. The Ventilation and Chest Compression Rhythm teaching routines call the SCORC1 subroutine to promptly voice a brief coaching comment on the maximum value of each ventilation or chest compression in a series as it occurs. This maximum is passed to the SCORC1 subroutine as the variable MAXVAL. To voice a coaching comment, the SCORC1 subroutine puts the appropriate Message number in register X of the microcomputer and calls the Message subroutine. SCORC1 also uses counter variables CBIN1, CBIN2, and CBIN3 to keep a running tally of how many ventilations or compressions were too shallow, acceptable, or too great.

An appropriate coaching comment is made promptly after a maximum of the ventilation or compression has been determined and stored in a variable MAXVAL by the A/D Conversion subroutine. The comment must be brief because of the short time between the maximums of successive ventilations or compressions. For example, the acceptable chest compression rhythm may be as fast as 100 compressions per minute, which leaves only 600 ms between successive compression maximums. Therefore, the preselected coaching words, see Table 3 above, can each be voiced in about one third of a second (333 ms).

Table 3 above shows the relationship between the input MAXVAL and the messages voiced and counter variables incremented by the SCORC1 subroutine. The subroutine begins by loading the value of MAXVAL in the microcomputer's accumulator register A (STEP 624), and loading the number hex 13 (decimal 19) in another register, the X register (STEP 625).

If STEP 626 determines that the value (MAXVAL) in register A is less than or equal to hex 7C, the student's effort is a very shallow one in Range B and counter variable CBIN1 is incremented (STEP 627). A jump is made to STEP 637, which calls the Message Subroutine to voice the message whose number is in register X, in this case Message 19: 'MORE!'

If STEP 626 determines that register A is not less than or equal to hex 7C, register X is incremented to decimal 20 (STEP 628). If STEP 629 next determines that register A is less than or equal to hex 95, the effort is a shallow one in Range C and counter variable CBIN1 is incremented at STEP 627. Then STEP 637 calls the Message Subroutine to voice the message whose number is in register X, Message 20: 'MORE'.

If STEP 629 determines that register A is not less than or equal to hex 95, register X is again incremented, to decimal 21 (STEP 630). If register A is less than or equal to hex C8 (STEP 631), the effort is an acceptable one in Range D and counter variable CBIN2 is incremented (STEP 632). Then STEP 637 calls the Message Subroutine to voice the message whose number is in register X, Message 21: 'GREAT'.

If A is not less than or equal to hex C8 at STEP 631, register X is again incremented, to decimal 22 (STEP 633). Then if register A is less than or equal to hex E1 (STEP 634), the effort is a too deep one belonging in Range E and counter variable CBIN3 is incremented (STEP 635). Then STEP 637 calls the Message Subroutine to voice the message whose number is in register X, Message 22: 'LESS'.

If STEP 634 determines that A is not less than or equal to hex E1, register X is again incremented, to decimal 23 (STEP 636). The effort is very much too deep and belongs in Range F. Counter variable CBIN3 is incremented (STEP 635). Then STEP 637 calls the Message Subroutine to voice the message whose number is in register X, Message 23: 'LESS!'.

After the appropriate message is voiced at STEP 637, a Return from Subroutine is executed at STEP 638.

b. SCORC2 Subroutine

Figure 24:
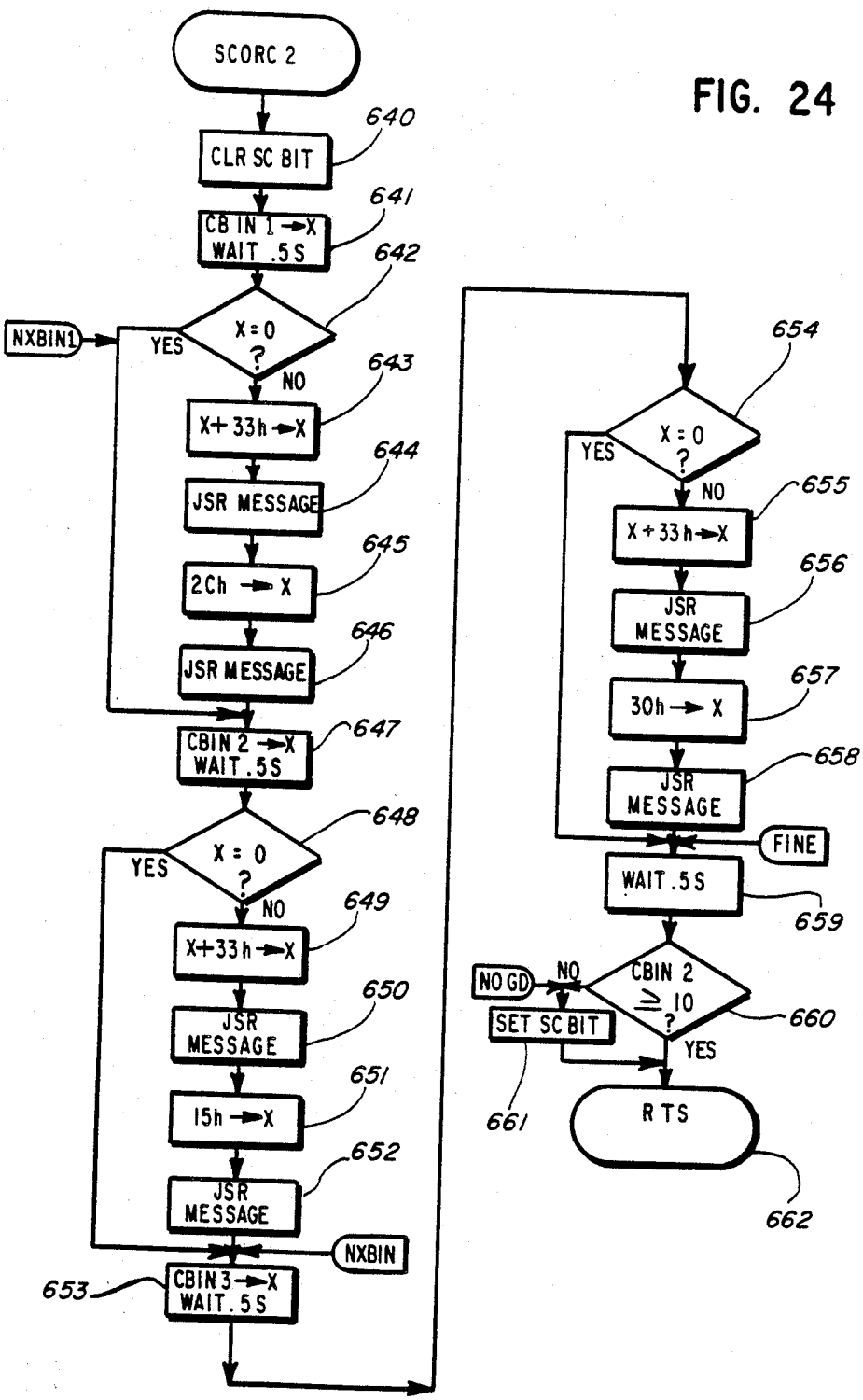
FIG. 24 is a flow chart for an embodiment of the scoring subroutine SCORC2 incorporated in the Control Program of FIG. 11.

FIG. 24 shows a flow chart of an embodiment of the scoring routine SCORC2 for use with the Chest Compression Rhythm (CCR) teaching routine of FIG. 17. After the CCR routine uses the SCORC1 subroutine to brief coaching comment on each chest compression as it occurs, it uses the SCORC2 subroutine to voice a summary and judgment of the student's performance of the whole series of 15 chest compressions.

When the subroutine is called, the number of shallow, acceptable, and too deep compressions are respectively stored in counter variables CBIN1, CBIN2, and CBIN3. If there have not been at least 10 acceptable compressions in the series of fifteen, the subroutine sets a bit called SCBIT. When control returns from the SCORC2 subroutine to the CCR routine, if the SCBIT is set the student will be told 'Give fifteen chest compressions again' (see FIG. 17, STEPS 505-507).

The SCORC2 subroutine begins by clearing SCBIT (STEP 640) and reading the value of CBIN1, the number of too-shallow compressions, into register X. After a brief half-second wait, if STEP 642 finds that register X is 0, the subroutine skips to STEP 647. But if register X is not zero, a message for the number of shallow compressions must be voiced by the Message subroutine.

As described above, the Message subroutine is a general utility that voices the prestored message whose number is stored in register X. For example,

| REG. X | MESSAGE | REG. X | MESSAGE |
|---|---|---|---|
| 21. | Great | 58. | Seven were . . . |
| 44. | Too Shallow | 59. | Eight were . . . |
| 48. | Too deep. | 60. | Nine were . . . |
| 52. | One was . . . | 61. | Ten were . . . |
| 53. | Two were . . . | 62. | Eleven were . . . |
| 54. | Three were . . . | 63. | Twelve were . . . |
| 55. | Four were . . . | 64. | Thirteen were . . . |
| 56. | Five were . . . | 65. | Fourteen were . . . |

| REG. X | MESSAGE | REG. X | MESSAGE |
| --- | --- | --- | --- |
| 57. | Six were... | 66. | Fifteen were... |

Suppose register X contains (from CBIN1) the number of too-shallow compressions (a number 1-15). By increasing register X by decimal 51 (hex 33), the Message routine can voice the corresponding message (messages 52-66). For example, suppose X equals 6, the number of shallow compressions Increasing X by 51 makes register X=57. If the Message subroutine is called with register X=57, numerical Message 57 will be voiced: 'Six were...,'

Therefore, at STEP 643 register X is increased by hex 33 (decimal 51), and then the Message subroutine is called to voice the message whose number is stored in register X. To complete the summary message, at STEP 645 register X is loaded with hex 2C (decimal 44), and the Message subroutine is called again to voice Message 44: 'too shallow.'

Next, STEP 647 reads the value of CBIN2, the number of acceptable compressions, into register X, and pauses for half a second. If STEP 648 finds that register X is 0, the subroutine skips to STEP 653. But if register X is not zero, STEP 649 prepares for voicing the appropriate message by increasing register X by hex 33 (decimal 51), and then the Message subroutine is called (STEP 650). The summary message is completed by loading a hex 15 (decimal 21) into X and again calling the Message subroutine to voice Message 21: 'great'.

Next, STEP 653 reads the value of CBIN3, the number of too-deep compressions, into register X and pauses for half a second. If STEP 654 finds that register X is 0, the subroutine skips to STEP 659. But if register X is not zero, STEP 655 prepares for voicing the appropriate message by increasing register X by hex 33 (decimal 51), and then the Message subroutine is called (STEP 656). The summary message is completed by loading a hex 30 (decimal 48) into X and again calling the Message subroutine to voice Message 48: 'Too deep.'

After another half-second pause (STEP 659), STEP 660 determines if CBIN2 indicates that there have been at least 10 acceptable compressions in the series of fifteen. If there have, a Return from Subroutine (RTS) is executed (STEP 662). If not, the SCBIT is set to 1 (STEP 661) before executing the RTS.

c. SCORC3 Subroutine

Figure 25:
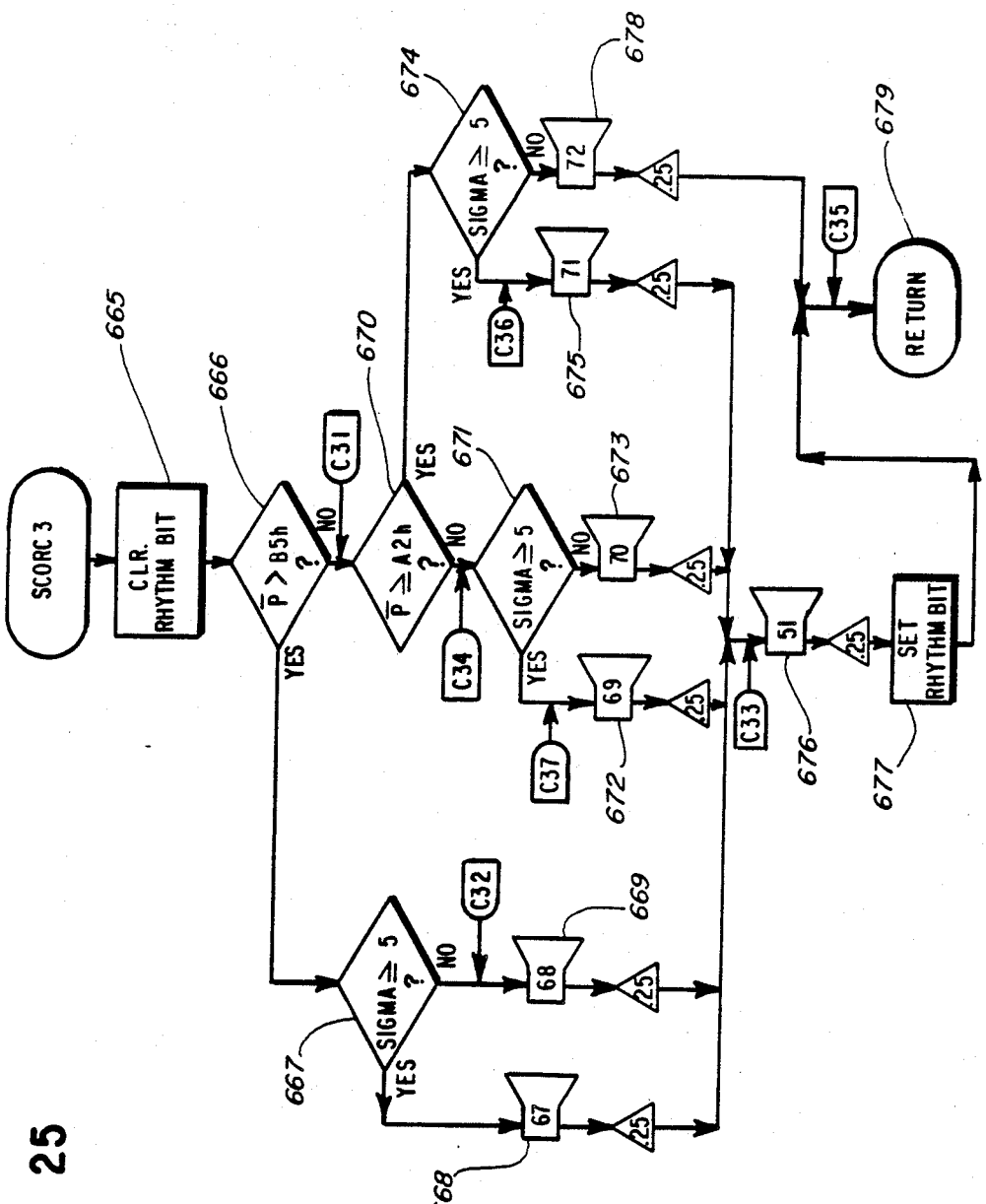
FIG. 25 is a flow chart for an embodiment of the scoring subroutine SCORC3 incorporated in the Control Program of FIG. 11.

FIG. 25 shows a flow chart of an embodiment of the scoring routine SCORC3 for use with the Chest Compression Rhythm (CCR) teaching routine of FIG. 17. When the series of fifteen chest compressions is completed, the CCR routine uses the SCORC3 subroutine to voice a judgment of the speed and regularity of the student's rhythm in performing the compressions.

When the subroutine is called, the average period $\overline{P}$ and the estimate SIGMA in terms of Timer Data Register TDR readings respectively determined at STEPS 500 and 501 of the CCR routine are available in RAM.

If the student's chest compression rhythm is the wrong speed or irregular, the subroutine sets a bit called RHYTHM. When control returns from the SCORC3 subroutine to the CCR routine, if the RHYTHM bit is set the student will be told 'Give fifteen chest compressions again.' (see FIG. 17, STEPS 508, 509, 507).

Table 6 above shows how the average period of the student's compressions can be interpreted from the average of the Timer Data Register TDR readings. After the RHYTHM bit is cleared (STEP 665), STEP 666 determines if $\overline{P}$ is greater than hex B5, which is equivalent to asking if the average compression period is less than 600 ms. If it is, the student's rhythm is too fast. STEP 667 then determines if SIGMA is equal to or greater than 5.

Since the TDR readings relate to timer clock pulses spaced 8 ms apart, this corresponds to an estimate of irregularity equal to or greater than 40 ms. If SIGMA is that large, STEP 668 voices Message 67, 'Rhythm is too fast and irregular,' and proceeds to STEP 676. If SIGMA is not equal to or greater than 5, STEP 669 just voices Message 68, Rhythm is too fast,' and proceeds to STEP 676.

If STEP 666 determines that $\overline{P}$ is not greater than hex B5, the rhythm is not too fast. STEP 670 then determines if $\overline{P}$ is greater than or equal to hex A2, which is equivalent to asking if the average compression period is less than or equal to 752 ms. If it isn't, the rhythm is too slow. STEP 671 then determines if SIGMA is equal to or greater than 5 (equivalent to 40). If SIGMA is that large, STEP 672 voices Message 69, 'Rhythm is too slow and irregular,' and proceeds to STEP 676. If SIGMA is not equal to or greater than 5, STEP 673 just voices Message 70, 'Rhythm is too slow,' and proceeds to STEP 676.

If STEP 670 determines that $\overline{P}$ is greater than or equal to hex A2, the compression period is in the acceptable range 600-752 ms. STEP 674 then determines if SIGMA is equal to or greater than 5 (equivalent to 40). If SIGMA is that large, STEP 675 voices Message 71: 'Rhythm is irregular,' and proceeds to STEP 676.

If at STEP 674 SIGMA is not equal to or greater than 5, both speed and regularity are acceptable. STEP 673 voices Message 72, 'Excellent rhythm,' and a Return from Subroutine is executed (STEP 679).

If the rhythm has the wrong speed or is irregular, the student needs help in establishing his beat. STEP 676 voices Message 51: 'Set the cadence switch for a cadence.' The RHYTHM bit is set to 1 (STEP 677) before executing the Return from Subroutine (STEP 679).

The many advantages of this inexpensive manikin system are now apparent. The components are easily made and assembled, and operate under flexible programmable control; the purchased electronic parts are readily available commercial components. The synthesized voice coaching makes excellent use of the sensor data to realistically simulate the timing, judgment, and encouraging advice o human coaching. It can be easily operated by the student with little or no preparation. Finally, there is no heavy, bulky, or complicated apparatus that must be transported, interconnected or managed by the user.

While the principles of the invention have been described above in connection with specific apparatus and applications, it is to be understood that this description is only an example and is not intended as a limitation on the scope of the invention.

APENDIX I

Messages By Message Number

1. Welcome to Coach Andy (TM).
2. Ventilation. Open the airway by gently tilting the head way back.
3. Press down on the manikin's forehead with the palm of one hand.

4. With your other hand, lift either under the neck, near the base of the head, or with the fingertips, under the bony part of the jaw near the chin.
5. (none)
6. Pinch off the manikin's nostrils.
7. Open your mouth wide, take a deep breath, and make a tight seal with the manikin's mouth and blow. Try a single ventilation.
8. I will tell you how you did.
9. More air.
10. Be sure that you're taking a deep breath and keeping a tight seal with the manikin's nostrils.
11. Blow harder.
12. Try it again.
13. Please ask the instructor for help.
14. Close, but blow harder.
15. Excellent.
16. Perfect. Now try giving two slow breaths.
17. Good, but blow less forcefully.
18. Blow into the manikin's mouth with complete refilling of your lungs after each breath.
19. More!
20. More.
21. Great.
22. Less.
23. Less!
24. Try giving two breaths again.
25. Excellent ventilation. If you feel confident, practice checking the carotid pulse. If you don't, try giving two breaths again.
26. Carotid pulse. The carotid pulse is located on either side of the Adam's Apple.
27. Gently, try to sense it with the index and middle fingers of one hand.
28. Maintain the head tilt with the palm of your other hand.
29. If you have difficulty checking it, please ask the instructor for help.
30. Hand position. Feel for the border of the manikin's ribs with the index and middle fingers of the hand closest to the manikin's waist.
31. Move them upward along the ribcage until you reach the ribcage notch.
32. Place the heel of your other hand just above the two fingers. Then place the first hand on top of it.
33. Keep your fingers off the manikin's ribs.
34. Push down. I will check your hand position.
35. Fine, remove and reset your hands. Try it again.
36. Good, if you feel confident, you should now practice a single chest compression. If you don't, try it again.
37. Your hand position is not quite right.
38. Too high.
39. Too low.
40. Off center.
41. Release compression! Try it again!
42. Single chest compression. Take the correct hand position, your elbows locked and your shoulders directly over the sternum.
43. The chest should be compressed smoothly one and one half to two inches. Try a single chest compression.
44. Too shallow.
45. Too shallow! Be sure that you're pressing straight down, your elbows locked and your shoulders directly over the sternum.
46. Close, but too shallow.
47. Close but too deep.
48. Too deep.
49. Great. Now practice chest compression rhythm or try it again.
50. Chest compression rhythm. Give fifteen chest compressions smoothly, no bouncing, using a one and two and three and four . . . - to fifteen cadence. Come all the way up between compressions.
51. Set the cadence switch for a cadence.
52. One was . . . -
53. Two were . . . -
54. Three were . . . -
55. Four were . . . -
56. Five were . . . -
57. Six were . . . -
58. Seven were . . . -
59. Eight were . . . -
60. Nine were . . . -
61. Ten were . . . -
62. Eleven were . . . -
63. Twelve were . . . -
64. Thirteen were . . . -
65. Fourteen were . . . -
66. Fifteen were . . . -
67. Rhythm is too fast and irregular.
68. Rhythm is too fast
69. Rhythm is too slow and irregular.
70. Rhythm is too slow.
71. Rhythm is irregular.
72. Excellent rhythm.
73. Come all the way up between compressions.
74. Give fifteen chest compressions again.
75. Not quite right.
76. If you feel confident, practice clearing the airway. If you don't, give fifteen chest compressions again.
77. Replace battery.
78. Now practice the correct hand position.
79. Clearing the airway. Kneel astride the manikin's thighs.
80. Place the heel of one hand slightly above the navel. Place the other hand on top of it.
81. Press into the abdomen with quick upward thrusts. Each thrust should be distinct and delivered with the intent of clearing the airway. Do it ten times.
82. When you feel confident, practice ventilating the manikin.

The invention claimed is:

1. Control means for monitoring a cardiopulmonary resuscitation (CPR) function including a read-out for lung expansion and chest compression used in a training system including a manikin, said control means including detecting means for detecting the lung expansion and chest compression and generating a data-representing input signal, said read-out comprising a plurality of visible display indicators arranged to form a line simulating a bar graph, and divided into a plurality of groups positioned at respective successive positions along the length of said bar graph, the color of the indicators being uniform within each group, and readily distinguishable from the color of the indicators in each of the other groups for representing a range of lung expansion and chest compression values, and means responsive to the data-representing input signal to activate each individual indicator along the length of the bar graph in succession as the magnitude of the data-representing input signal varies, whereby the read-out indicates both a progression from one to another of the individual values represented by respective indicators and a progression from one color-coded range of values to another.

2. A read-out as in claim 1 wherein one of said groups positioned at one extreme of the bar graph includes a plurality of lamps colored red to indicate a reading which is in a value range located at a dangerous end of a spectrum of possible readings.

3. A read-out as in claim 2 wherein another of said groups positioned prior to said red-colored group in the bar graph includes a plurality of lamps colored green to indicate a reading which is in a value range located in an acceptable region of the spectrum.

4. A read-out as in claim 3 wherein one of said groups positioned at the other extreme of the bar graph includes a plurality of lamps colored yellow to indicate a reading which is in a value range located at an insufficient end of the spectrum.

* * * * *